United States Patent [19]

Wong-Chong

[11] Patent Number: 4,537,682

[45] Date of Patent: Aug. 27, 1985

[54] ACTIVATED SLUDGE WASTEWATER TREATING PROCESS

[75] Inventor: George M. Wong-Chong, Allison Park, Pa.

[73] Assignee: Environmental Research & Technology, Concord, Mass.

[21] Appl. No.: 460,090

[22] Filed: Jan. 21, 1983

Related U.S. Application Data

[63] Continuation-in-part of Ser. No. 344,165, Jan. 29, 1982.

[51] Int. Cl.³ .................................................. C02F 3/12
[52] U.S. Cl. ...................................... 210/611; 210/614; 210/626; 210/903
[58] Field of Search ............... 210/610, 611, 903, 612, 210/614, 624–628, 904

[56] References Cited

U.S. PATENT DOCUMENTS

| | | | |
|---|---|---|---|
| 3,915,854 | 10/1975 | Torpey | 210/903 X |
| 3,964,998 | 6/1976 | Barnard | 210/903 X |
| 3,994,802 | 11/1976 | Casey et al. | 210/903 X |
| 4,132,636 | 1/1979 | Iwase et al. | 210/903 X |
| 4,271,013 | 6/1981 | Bhattacharyya | 210/903 X |
| 4,376,701 | 3/1983 | Kubota | 210/614 |
| 4,437,992 | 3/1984 | Saito et al. | 210/614 X |

FOREIGN PATENT DOCUMENTS 55177395 11/1982 Japan .

*Primary Examiner*—Thomas G. Wyse
*Attorney, Agent, or Firm*—Sughrue, Mion, Zinn Macpeak & Seas

[57] ABSTRACT

This invention provides an activated sludge process for treating wastewater containing ammonia as a contaminant and further for treating wastewater containing ammonia as a contaminant and other contaminants which may possibly be present including cyanide, thiocyanate, sulfide and/or organics, wherein the process involves treating wastewater in the presence of an appropriate microorganism population acclimated to the wastewater contaminants and their levels in the wastewater, this microorganism population including (1) nitrifying microorganisms capable of converting ammonia to nitrite, (2) optionally, nitrifying microorganisms capable of converting nitrite to nitrate, and (3) facultative microorganisms capable of denitrifying nitrite and/or nitrate by oxidizing organic material and converting nitrite and/or nitrate to free nitrogen, with the process being operated under a series of controlled conditions to ultimately achieve in the activated sludge process a microbial conversion of ammonia to nitrite and/or nitrate and then to free nitrogen. The conditions controlled in the process of this invention include control of the sludge wastage rate, hydraulic residence time, dissolved oxygen level (DO), sludge mixing rate, biological oxygen demand (BOD), pH and temperature, as described hereinafter. Optionally, (4) other microorganisms capable of converting other contaminants such as cyanide and thiocyanate to ammonia and sulfide to sulfate can also be present.

128 Claims, 17 Drawing Figures

BASIC PROCESSING STEPS IN CONVENTIONAL BIOLOGICAL TREATMENT OF HIGH STRENGTH NH₃ WASTEWATERS

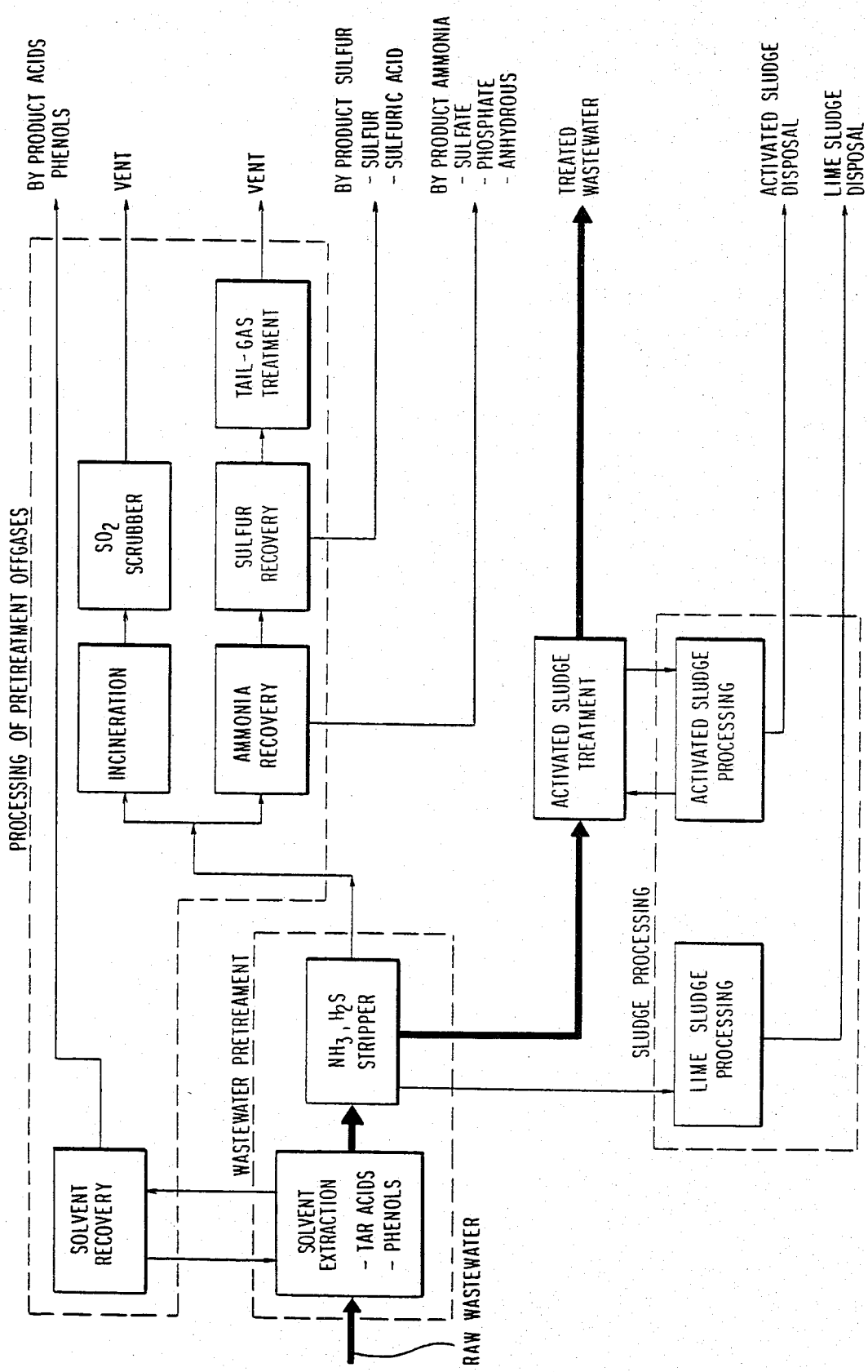
FIG. 1  BASIC PROCESSING STEPS IN CONVENTIONAL BIOLOGICAL TREATMENT OF HIGH STRENGTH NH$_3$ WASTEWATERS

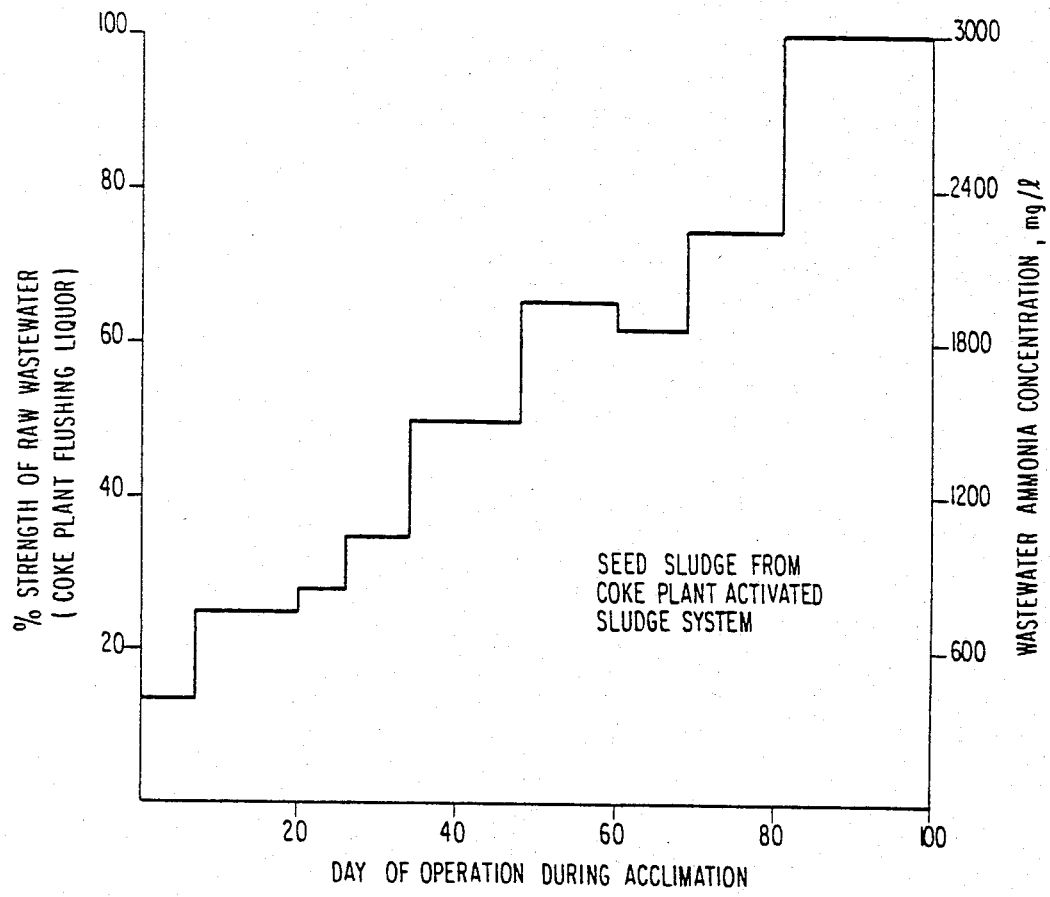
FIG.2 SLUDGE ACCLIMATION SCHEDULE

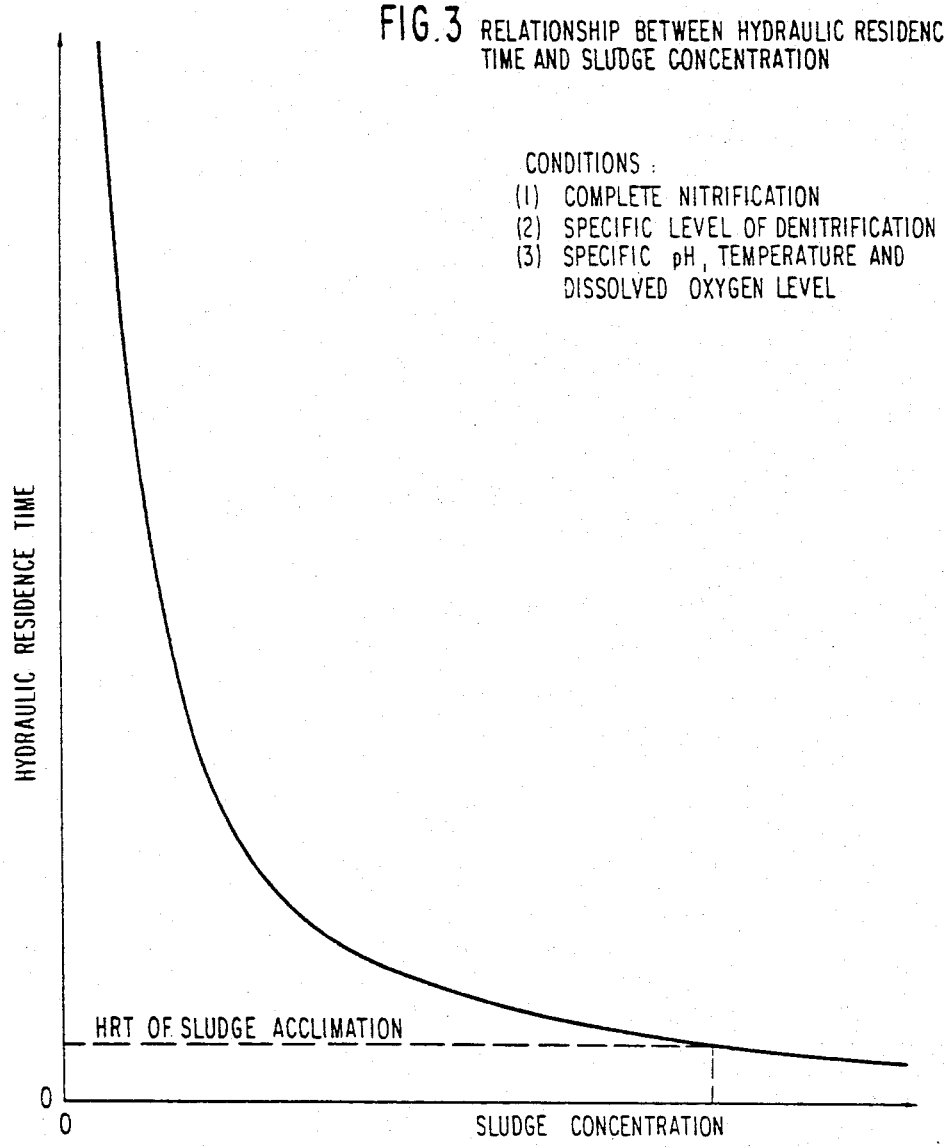
FIG.3 RELATIONSHIP BETWEEN HYDRAULIC RESIDENCE TIME AND SLUDGE CONCENTRATION
CONDITIONS:
(1) COMPLETE NITRIFICATION
(2) SPECIFIC LEVEL OF DENITRIFICATION
(3) SPECIFIC pH, TEMPERATURE AND DISSOLVED OXYGEN LEVEL
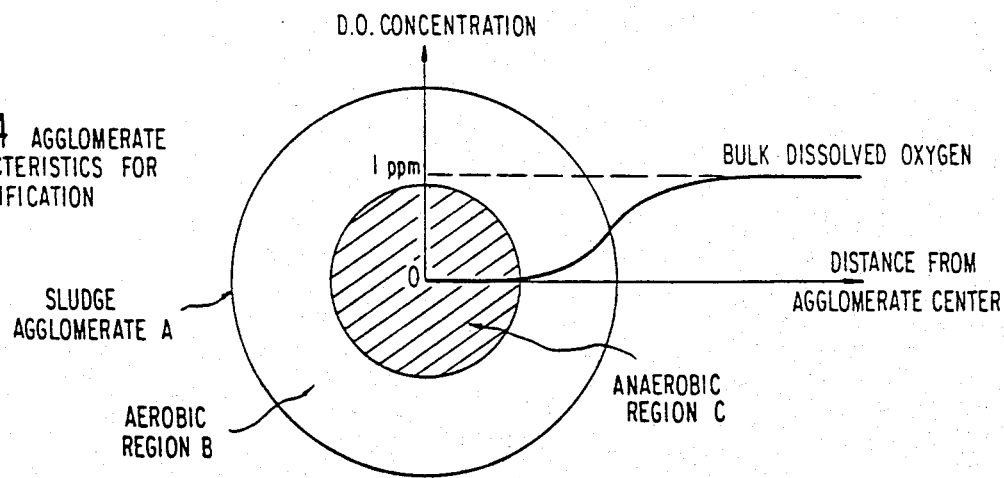
FIG.4 AGGLOMERATE CHARACTERISTICS FOR DENITRIFICATION

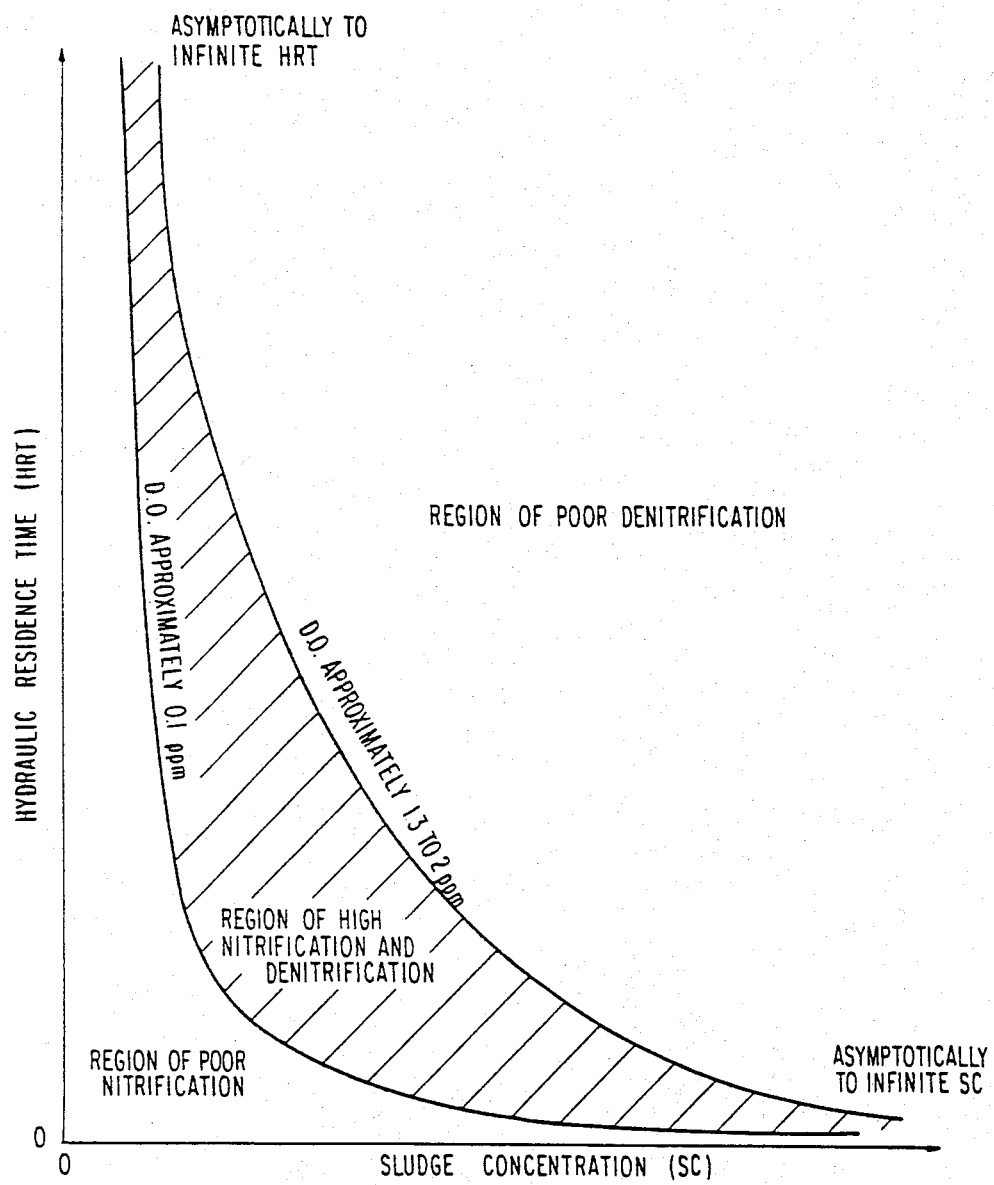

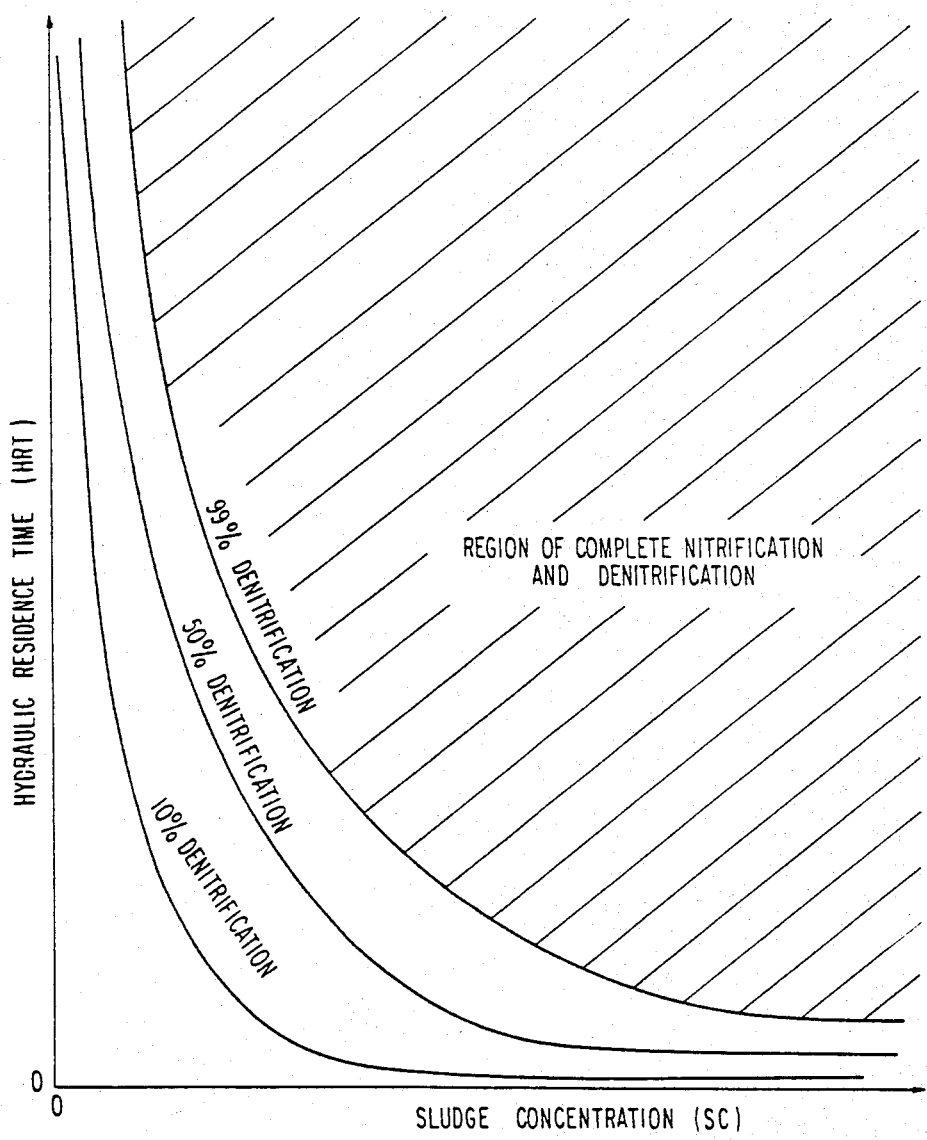

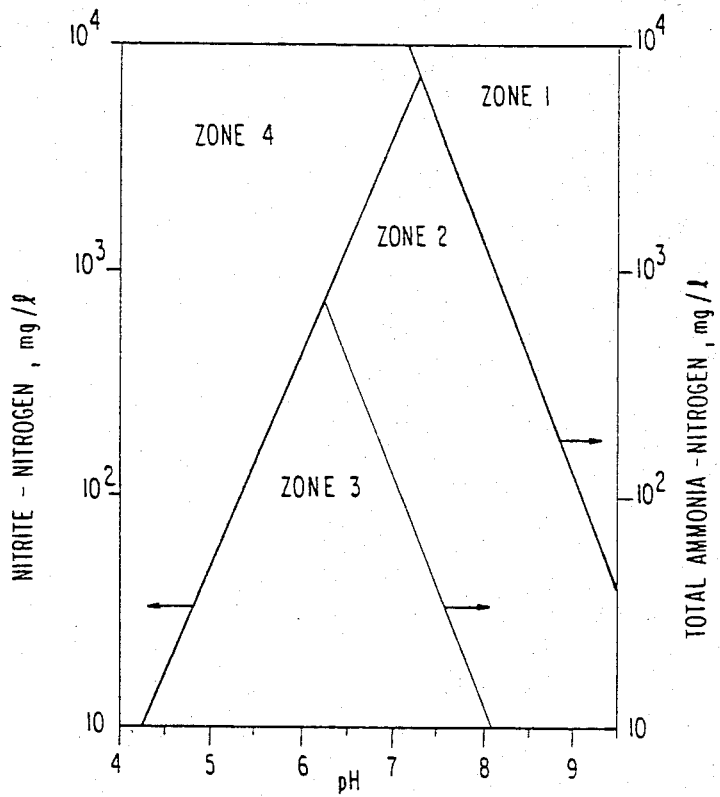
FIG. 7 SLUDGE CONDITIONS BEYOND WHICH MICROORGANISM INHIBITIONS CAN BE EXPECTED AT SYSTEM TEMPERATURE OF 20°C.
NOTE: SYSTEM TEMPERATURE 20°C
ZONE 1: FREE AMMONIA INHIBITION TO NITROBACTER AND NITROSOMONAS
ZONE 2: FREE AMMONIA INHIBITION TO NITROBACTER
ZONE 3: COMPLETE NITRIFICATION
ZONE 4: FREE NITROUS ACID INHIBITION TO NITROBACTER

ACCLIMATION OF SLUDGE ON COKE PLANT
FLUSHING LIQUOR
(DAYS 0 TO 25)

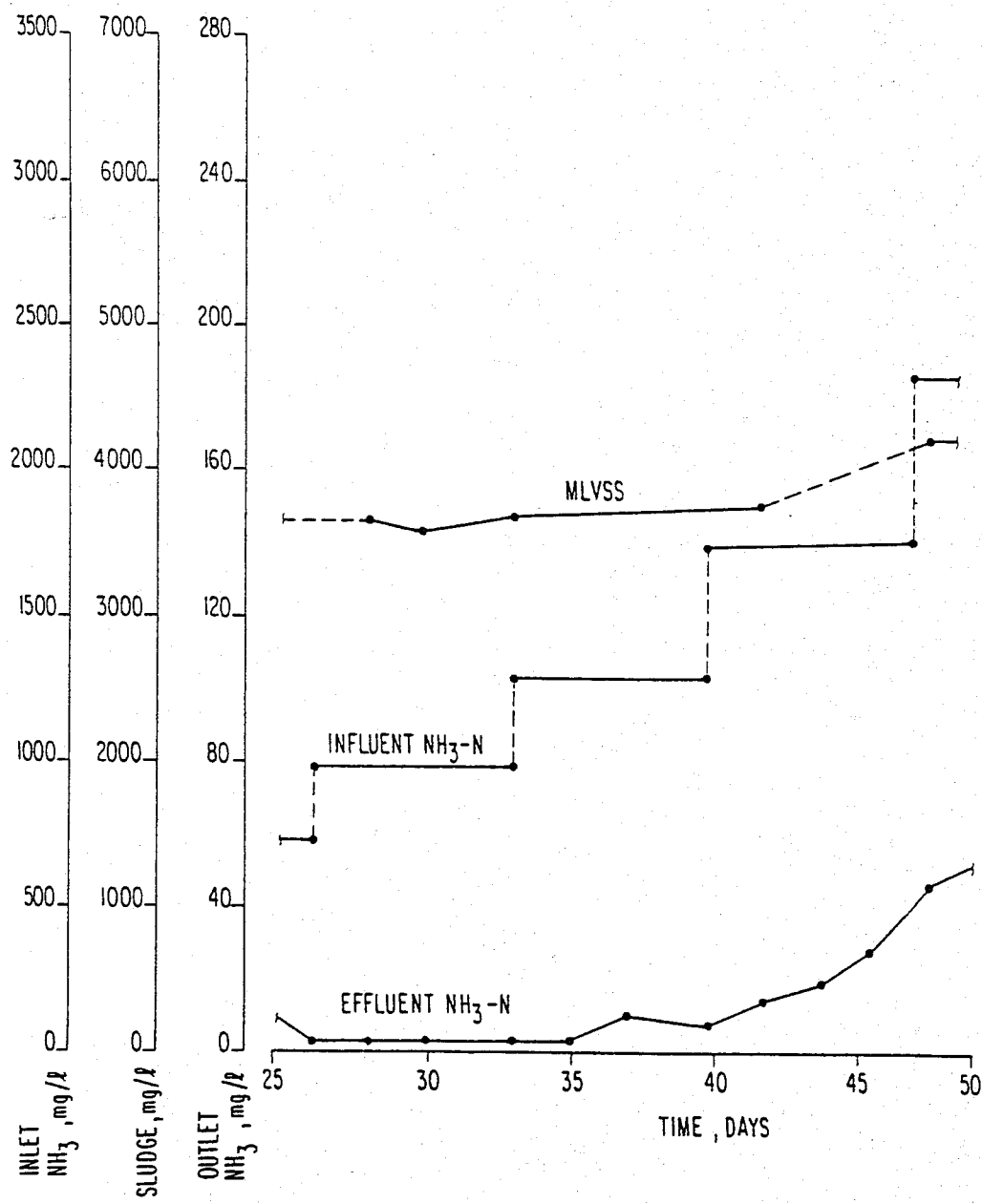

ACCLIMATION OF SLUDGE ON COKE PLANT FLUSHING LIQUOR
(DAYS 50 TO 75)

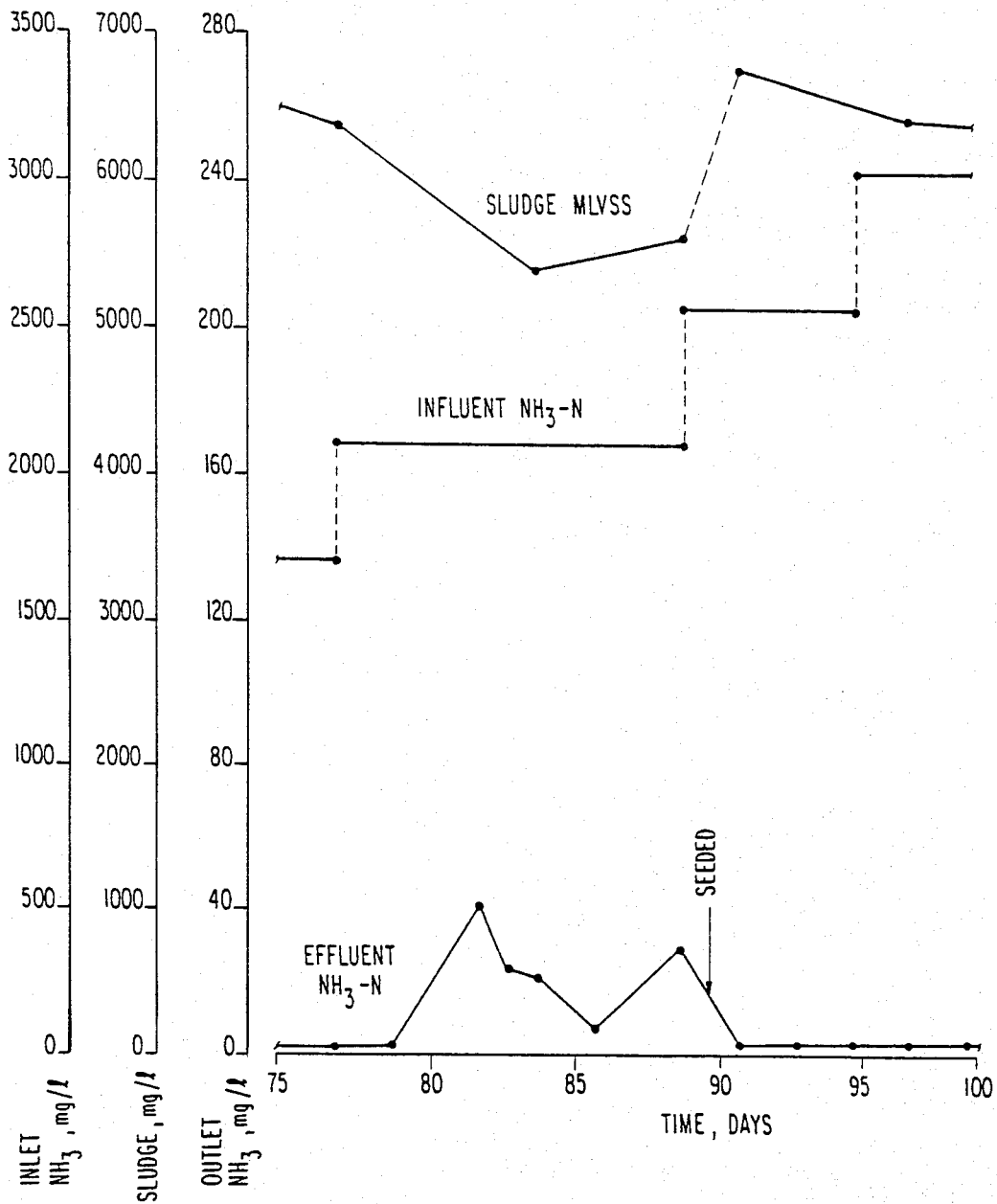
FIG. 8D ACCLIMATION OF SLUDGE ON COKE PLANT FLUSHING LIQUOR (DAYS 75 TO 100)

ACCLIMATION OF SLUDGE ON COKE PLANT FLUSHING LIQUOR
(DAYS 100 TO 125)

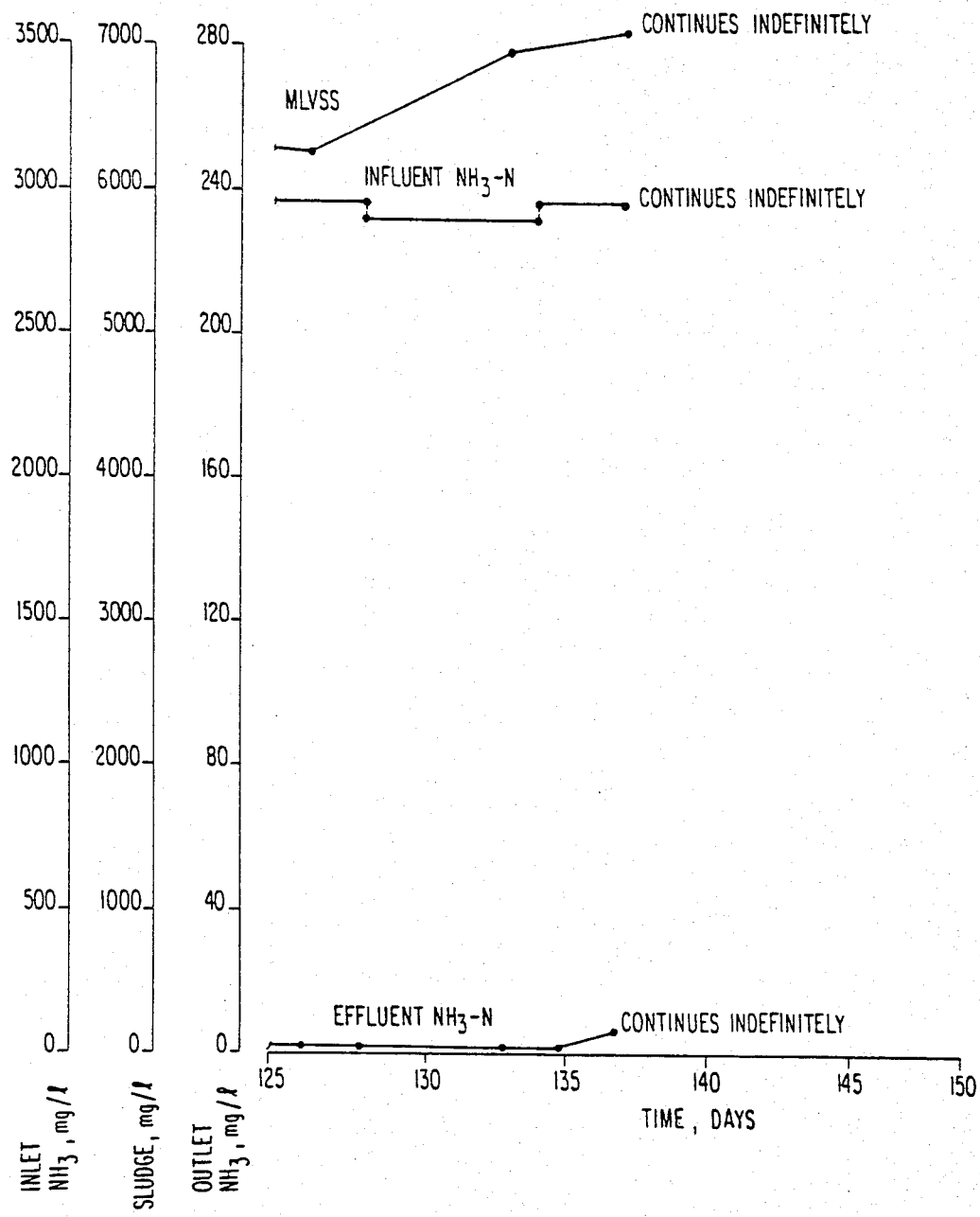

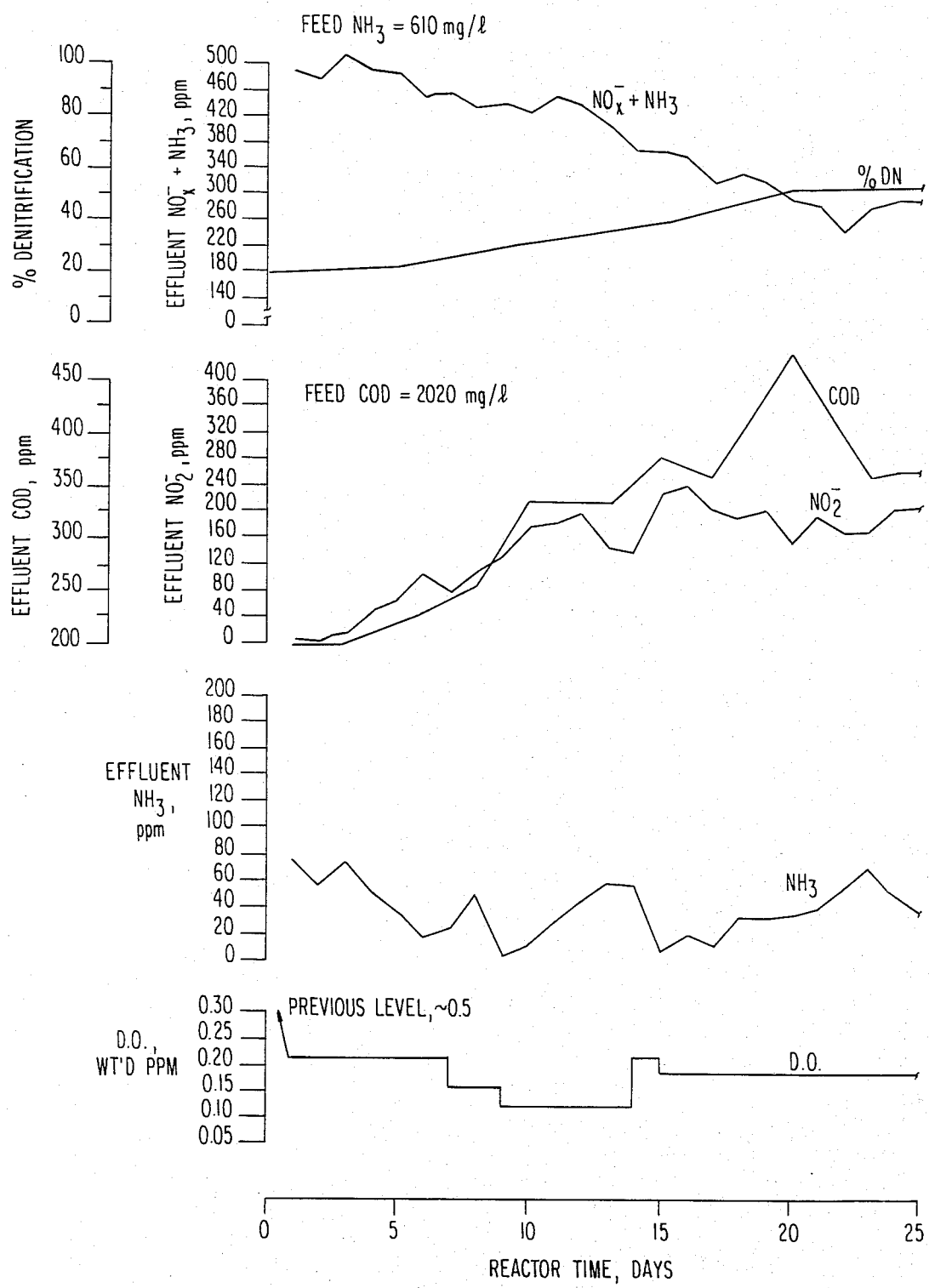

EFFECT OF DISSOLVED OXYGEN LEVEL AND ON/OFF
CYCLING ON REACTOR PERFORMANCE
(DAYS 25 TO 50)

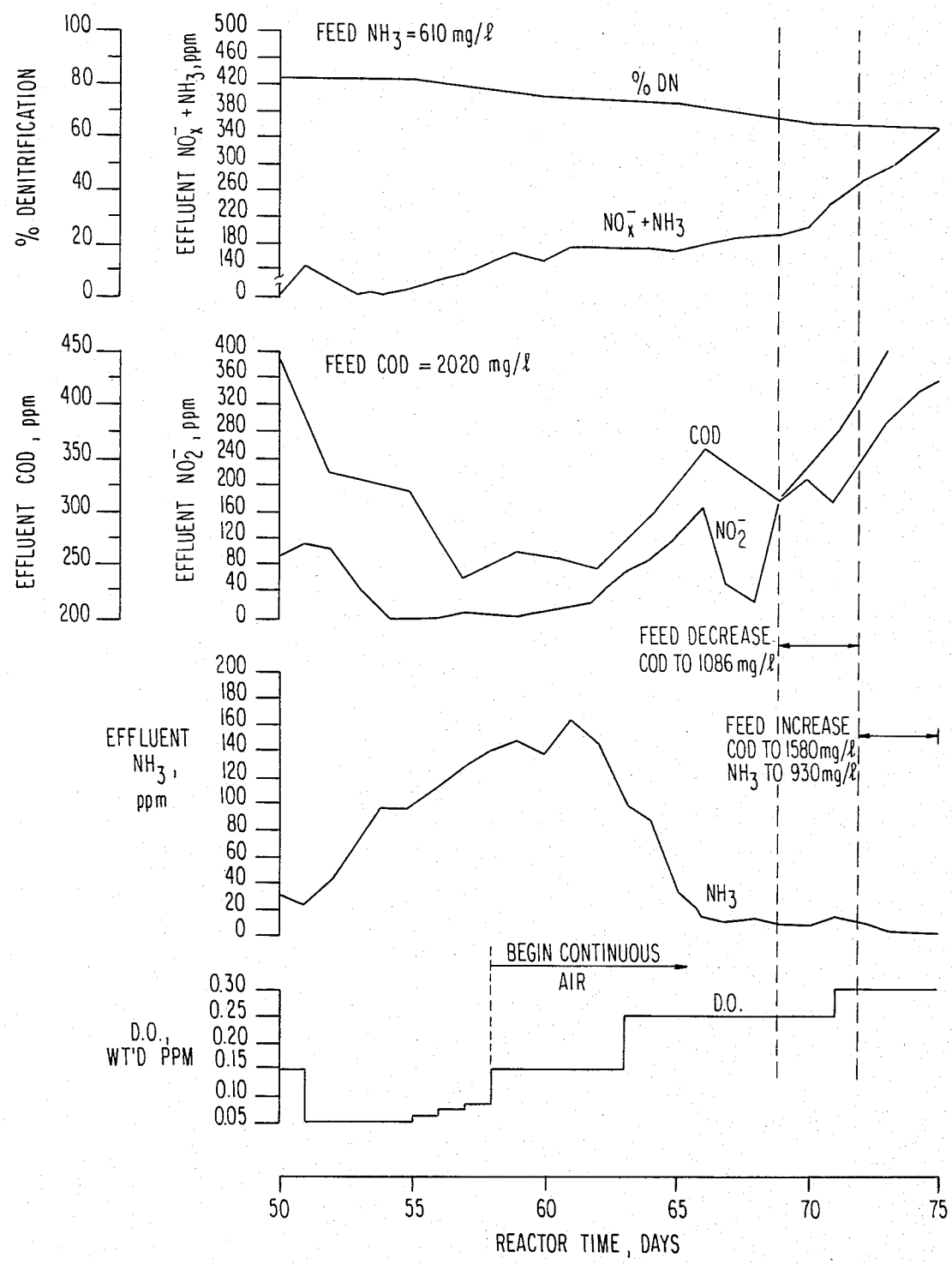

EFFECT OF NITRITE LEVELS ON REACTOR PERFORMANCE. (DAYS 75 TO 125)

ACTIVATED SLUDGE WASTEWATER TREATING PROCESS

CROSS REFERENCE TO RELATED APPLICATIONS

This application is a continuation-in-part application of co-pending application Ser. No. 344,165, filed Jan. 29, 1982.

FIELD OF THE INVENTION

This invention relates to an activated sludge process for treating wastewater. More particularly, this invention relates to an activated sludge process for treating wastewater containing ammonia as a contaminant and further for treating wastewater containing ammonia as a contaminant and other contaminants which may possibly be present including cyanide, thiocyanate, sulfide and/or organics. The activated sludge process of this invention involves treating wastewater in the presence of an appropriate microorganism population acclimated to the wastewater contaminants and their levels in the wastewater. The microorganism population includes (1) nitrifying microorganisms capable of converting ammonia to nitrite, (2) optionally nitrifying microorganisms capable of converting nitrite to nitrate, and (3) facultative microorganisms capable of denitrifying nitrite and/or nitrate by oxidizing organic material and converting nitrite and/or nitrate to free nitrogen. The process is operated under a series of controlled conditions to ultimately achieve in the activated sludge process a microbial conversion of ammonia to nitrite and/or nitrate and then to free nitrogen. Conditions controlled in the process of this invention include control of the sludge wastage rate, hydraulic residence time, dissolved oxygen level (DO), sludge mixing rate, biological oxygen demand (BOD), pH and temperature, as described hereinafter. Optionally, (4) other microorganisms capable of converting other contaminants such as cyanide and thiocyanate to ammonia and sulfide to sulfate can also be present in the microorganism population.

This invention also relates to a process for producing an appropriate microorganism population, including (1) nitrifying microorganisms capable of converting ammonia to nitrite, (2) optionally nitrifying microorganisms capable of converting nitrite to nitrate and (3) facultative microorganisms capable of denitrifying nitrite and/or nitrate by oxidizing organic material and converting nitrite and/or nitrate to free nitrogen, by a controlled development and acclimation of the microorganism population to the nature of the wastewater containing ammonia as a contaminant, particularly at high levels.

BACKGROUND OF THE INVENTION

A large amount of interest has arisen as a result of environmental pollution concerns on treatment of municipal and industrial wastewaters. As a result of federal, state and local regulations as well as concerns on protecting the environment, a large amount of research and development effort has gone into the treatment of wastewater from various sources and particularly wastewater arising from industrial facilities. Often in treatment of wastewater from industrial and municipal sources, the activated sludge process has been employed conventionally for treatment and purification to the extent that the treated water can be reused or returned to the environment. Where wastewater arises from industrial operations, the wastewater can contain problem contaminants, in general not normally found in wastewater from municipal sources, and these include industrial wastewaters containing as contaminants, ammonia, cyanide, thiocyanate, sulfide and organic materials, even of a complex nature. Further, industrial wastewaters can contain contaminants at concentrations which significantly exceed those found in wastewaters from municipal sources.

In particular, wastewaters which contain ammonia as a contaminant are produced in a wide variety of industrial operations and problems presently exist in appropriately treating wastewaters where the wastewater contains a high concentration of ammonia. It is economically advantageous therefore to develop treatment procedures for wastewaters which, in raw form, contain not only ammonia in high concentrations, but typically a wide variety of contaminants other than ammonia. In fact, where wastewaters contain high concentrations of ammonia, state-of-the-art systems conventionally employed to treat these wastewaters to render them environmentally acceptable for discharge into the ecosphere are complex and extremely expensive.

To illustrate this further, raw wastewater containing high concentrations of ammonia can arise in industrial processing in coke plants, petroleum refineries, oil shale retorting, coal gasification processes and coal liquefaction processes. Ammmonia-containing wastewaters can also arise from pharmaceutical processing, munitions manufacture, food processing and fertilizer manufacture. Typical compositions of contaminants present in one illustrative subset of typical wastewaters containing high concentrations of ammonia are shown in Table 1 below.

TABLE 1

TYPICAL CONTAMINATS AND THEIR CONCENTRATIONS IN REPRESENTATIVE INDUSTRIAL WASTEWATERS

| Wastewater Source | Typical Wastewater Composition (mg/l) | | | | | |
|---|---|---|---|---|---|---|
| | $NH_3$ | COD | Phenolic | $CN^-$ | $SCN^-$ | $S^=$ |
| By-product Coking | 1,800 to 6,500 | 2,500 to 10,000 | 400 to 3,000 | 10 to 100 | 100 to 1,500 | 200 to 600 |
| Petroleum Refining | 1,000 to 7,000 | N.A. | 100 to 1,000 | N.A. | N.A. | 275 to 11,000 |
| Oil Shale Retorting | 1,000 to 7,300 | 8,100 to 10,800 | ~45 | 0 to 21 | ~55 | 20 to 220 |
| Coal Gasification Slagging Lurgi Process | 2,000 to 17,000 | 7,000 to 21,000 | 1,400 to 4,000 | 4 to 15 | 15 to 300 | 100 to 500 |
| Hygas Process | 2,600 to 4,600 | 3,000 to 5,000 | 560 to 900 | 0.1 to 0.7 | 17 to 45 | 60 to 220 |
| Grand Forks Energy Tech. Center Gasifier | 4,000 to 7,500 | 21,000 to 30,000 | 3,500 to 6,000 | 1 to 50 | 80 to 200 | 60 to 300 |
| Coal Liquefaction Solvent Ref. Coal-Proc-I | ~13,000 | ~6,000 | ~1,900 | N.A. | N.A. | ~5,000 |

It can be seen from the wastewater compositions shown in Table 1 above, that ammonia concentrations in these raw wastewaters are high and can range from a low of 1,000 to nearly 20,000 mg/l. Typically, these industrial wastewaters also contain significant concentrations of other contaminants, including (1) a range of organics from benzene, toluene, xylenes to phenols to higher molecular weight compounds, (2) cyanide and thiocyanate and (3) various sulfur compounds.

Environmentally acceptable control approaches presently employed in commercial practice are of basically two types—(1) physical/chemical treatment and (2) combined pretreatment and biological processing. A large amount of interest has recently been developed in the biological treatment of these high strength ammoniacal wastewaters.

The approaches conventionally used to treat wastewater containing contaminants as indicated above where treatment by biological processing is involved generally require three major processing steps in addition to a basic biological processing step. Conventional practice and treatment of wastewaters containing contaminants as indicated above are shown schematically in FIG. 1. As can be seen from an examination of FIG. 1 showing conventional practice relating to treatment of wastewaters containing high levels of ammonia as well as other contaminants, the treatment stages include at least: (1) wastewater pretreatment for removal of ammonia, hydrogen sulfide, and possibly phenols, (2) recovery/disposal of ammonia, hydrogen sulfide, and in certain cases, phenols, (3) pretreated wastewater treatment in an activated sludge biological wastewater treatment process, and (4) waste sludge processing, which can include sludge conditioning, microbiological and possibly lime sludge processing, and disposal. The need for expensive pretreatment steps and by-product recovery steps results from the universally accepted conventional thinking that activated sludges cannot treat significant concentrations of ammonia in feed wastewater. Conventional practice also frequently dictates a significant and expensive sludge wastage or discharge rate for proper operation of the activated sludge process. The net result of this conventional thinking is an extremely complex and expensive state-of-the-art system for biologically based treatment of wastewaters containing high concentrations of ammonia and also high concentrations of sulfide.

Although different biological treatment systems have been designed and operated, basically known techniques have not been completely successful in treating, particularly biologically, wastewaters such as those from industrial sources in which hazardous contaminants or contaminants at high levels are present. These techniques, in particular, have not been suitable for treatment of industrial waste-waters containing, particularly, a high concentration of ammonia.

In treating wastewaters containing ammonia, it is known that certain aerobic autotrophic microorganisms can oxidize ammonia to nitrite and that nitrite can be further microbially oxidized to nitrate. This reaction sequence, viz., oxidation of ammonia to nitrate, is known in the art as nitrification and the responsable microorganisms are: Nitrosomonas and Nitrobacter. More specifically, Nitrosomonas, are known to oxidize ammonia to nitrite in aqueous systems in which (1) dissolved oxygen levels are in excess of approximately 0.5 mg/l (as disclosed in H. E. Wild et al, "Factors Affecting Nitrification Kinetics", *J. Water Pollut. Cont. Federation*, 43, 1845–1854 (1971)) and (2) free ammonia in solution is held below about 10 to 150 mg/l (as disclosed in Anthonisen et al, "Inhibition of Nitrification by Ammonia and Nitrous Acid", *J. Water Pollut. Cont. Federation*, 48, 835–852 (1976)). Nitrosomonas microorganisms are ubiquitous in the environment and seed for the development of a Nitrosomonas population in a sludge is therefore available from a wide variety of sources. Both Nitrosomonas growth rates and their ammonia-nitrogen oxidation reaction rates are a function of solution temperature, pH and dissolved oxygen levels. For example, a reaction rate of about 2.4 mg nitrogen oxidation per mg of microorganism per day at a temperature of 20° C., a pH of 7.0 and a dissolved oxygen level of between 1 and 2 ppm has been reported. (See G. M. Wong-Chong, "Kinetics of Microbial Nitrification as Applied to the Treatment of Animal Wastes", Ph.D. Thesis, Cornell University, 1974.)

Further, Nitrobacter are known to oxidize nitrite to nitrate in aqueous systems where the dissolved oxygen level is in excess of approximately 0.5 mg/l (see H. E. Wild et al, supra.) and free ammonia in solution is held below about 0.1 to 10 mg/l and free nitrous acid in solution is held below about 0.2 to 2.8 mg/l (see Anthonisen et al, supra.). Nitrobacter microorganisms are ubiquitous in the environment also and seed for development of a Nitrobacter population in a sludge is therefore available from a wide variety of sources. Both Nitrobacter growth rates and their nitrite reaction rates are a function of solution temperature, pH and dissolved oxygen levels. For example, a reaction rate of about 7.0 mg nitrogen oxidation per mg of microorganism per day at a temperature of 20° C., a pH of 7.0, and a dissolved oxygen level of between 1 and 2 ppm has been reported (see Wong-Chong, supra.).

Complete elimination of ammonia entails the oxidation to nitrite and/or nitrate followed by reduction of the nitrite and/or nitrate to nitrogen gas. This latter reduction of the nitrite and/or nitrate to nitrogen gas is generally known in the art as denitrification and the reaction of reduction of nitrite and/or nitrate to free nitrogen is mediated by facultative heterotrophic microorganisms generally of the genera of Pseudomonas, Achromobacter, Bacillus and Micrococcus. These microorganisms are capable of oxidizing organic matter by utilizing oxygen and, in the absence of oxygen, they can use nitrite and/or nitrate, if present. Facultative heterotrophic microorganisms are further ubiquitous in the environment and seed for development of populations in a sludge is therefore available from a variety of sources. Facultative heterotrophic microorganism growth rates and denitrification reaction rates and a function of solution temperature, pH and ratio of dissolved oxygen to nitrite/nitrate oxygen availability. For example, a denitrification reaction rate of about 0.6 mg nitrogen oxidation per mg of microorganism per day with methanol as an organic at a temperature of 20° C. and a pH of 8 to 9 in the absence of dissolved oxygen has been reported (see R. P. Michael, "Optimization of Biological Denitrification Reactors in Treating High Strength Nitrate Wastewater", M.S. Thesis, University of Vermont, May 1973).

Frequent references are also made in the literature to unexplained nitrogen losses from basically aerobic sludges (e.g., as disclosed in K. Wuhrmann, "Effect of Oxygen Tension on Biochemical Reactions in Sewage Purification Plants" in "Advances in Biological Waste Treatment", W. W. Eckenfelds, Jr. and B. J. McCabe, Eds., Pergamon Press (1963); Barth et al, "Nitrogen Removal by Municipal Wastewater Treatment Plants", *J. Water Pollut. Cont. Federation*, 38, 7 (1966); and D. C. Climenhage, "Nitrogen Removal for Municipal Wastewater", Project No. 72-5-15, Ontario Ministry of the Environment (1975)). It has been speculated that these losses are due either to spurious amounts of "anaerobic" denitrification which occur in random localized "dead spots" in the sludge where dissolved oxygen levels have fallen to zero or to "aerobic" denitrification. In fact, in 1977, the inventor of the invention described and claimed herein speculated that "aerobic" denitrification does occur and is favored by high microbial sludge concentrations, low dissolved oxygen levels of about 1 ppm and a solution pH of 7.0 (see G. M. Wong-Chong et al, "Advanced Biological Oxidation of Coke Plant Wastewaters for the Removal of Nitrogen Compounds", *Carnegie-Mellon Inst. of Research Report to the American Iron and Steel Institute,* (April 1977)). As a theoretical explanation, Wong-Chong, supra, postulated a porous microorganism particle model with oxygen gradients such that some portion of the core of the basically aerobic particle is anoxic. Others have speculated similarly regarding the existence of "aerobic" denitrification. (See, for example, L. B. Wood et al, "Some Observations on the Biochemistry and Inhibition of Nitrification", *Water Research,* 5, 543–551 (1981); I. Murray et al, "Interrelationships between Nitrogen Balance, pH and Dissolved Oxygen in an Oxidation Ditch Treating Farm Animal Waste, *Water Research,* 9, 25–30 (1975); and J. P. Voets, et al, "Removal of Nitrogen from Highly Nitrogenous Wastewaters", *Journal of the Water Pollution Control Federation,* 47, 394–398 (1975)).

The above biologically mediated processes of nitrification and denitrification, and conversion of ammonia to free nitrogen using Nitrosomonas, Nitrobacter and facultative microorganisms are well known. However, there is a large economic incentive for improvements in conventional approaches to treating wastewater containing high levels of ammonia and other contaminants. Research and development to upgrade the performance of biological treatment systems to handle high ammonia strength liquors has been extremely limited and has been basically considered unsuccessful.

With the exception of the speculations discussed above on how "aerobic" denitrification could possibly occur, all of the other prior art basically discredits the serious possibility of controllably achieving simultaneous nitrification and denitrification from a single sludge. In fact, the prior art has basically set forth that nitrification/denitrification conditions are thermodynamically antagonistic and as such, nitrification should be separated from denitrification (see Bishop et al, "Single-stage Nitrification-Denitrification", *J. Water Pollut. Cont. Federation,* 48, 521–531 (1976)).

Numerous possible permutations and combinations, which can be logically considered of multi-reaction step nitrification/denitrification systems, have been postulated in the literature. These, however, have been largely for application to the processing of low ammonia strength municipal sewage waste (see Bishop et al, supra.; Climenhage, supra, Barth et al. "Chemical-Biological Control of Nitrogen and Phosphorus in Wastewater Effluent", *J. Water Pollut. Cont. Federation,* 40, 2040–2054 (1968); and J. L. Barnard, "Biological Nutrient Removal Without the Addition of Chemicals", *Water Research,* 9, 485–490 (1975)). Only two literature references are known (see Barker et al, "Biological Removal of Carbon and Nitrogen Compounds from Coke Plant Wastes", EPA Report EPA R2-73-167 (April 1973); and P. D. Kostenbader et al, "Biological Oxidation of Coke Plant Weak Ammonia Liquor", *J. Water Pollut. Cont. Federation,* 41, 199–207 (1969)) in which high strength ammonia containing wastewater was treated and of these only Barker et al, supra, attempted to achieve nitrification and denitrification. All other attempts to achieve nitrification or a combination of nitrification and denitrification, including that of the inventor herein prior to this invention, have been performed on weak-ammonia coke plant wastewater, i.e., wastewater from a coke plant from which a significant fraction of the ammonia has been stripped. High nitrification efficiencies for ammonia-stripped coke wastewater in a one-stage biological reactor with extended solids residence times has been reported (see A. Bhattacharyya et al, "Solids Retention Time—A Controlling Factor in the Successful Biological Nitrification of Coke Plant Waste", *Proc. 12th Mid-Atlantic Industrial Waste Conference,* Bucknell University, Lewisburg, Pa. (July 1980)).

Further, variable success with a two-stage nitrification-denitrification reactor system on ammonia-stripped coke wastewater has also been reported (T. R. Bridle et al, "Biological Treatment of Coke Plant Wastewaters for Control of Nitrogen and Trace Organics", Presentation at 53rd Annual Water Pollution Control Federation Conference, Las Vegas (September 1980)). Moderate success in nitrifying ammonia-stripped coke wastewater has also been reported by the inventor of the invention described and claimed herein (see Wong-Chong et al, supra.). Variable success has also been reported on a two-stage nitrification-denitrification reactor system on ammonia-stripped coke wastewater (see S. G. Nutt et al, "Two Stage Biological Fluidized Bed Treatment of Coke Plant Wastewater for Nitrogen Control, *"Presentation at the 54th Annual Water Pollution Control Federation Conference,* Detroit (October 1981)).

After experimental attempts to biologically treat coke wastewaters containing high ammonia concentrations directly, Kostenbader et al, supra, in experimental work to establish at what ammonia concentrations performance of microorganisms on wastewaters containing cyanide, thiocyanate and COD was affected, concluded that ammonia concentrations in excess of about 2,000 mg/l seriously inhibited the overall performance of biological sludge. In an extremely complex three-stage reaction system (two aerobic stages in series followed by an anaerobic stage), Barker et al, supra, treated high strength coke plant wastewaters were treated for 352 days. Unfortunately, this program led to unsuccessful results. Typical feed ammonia strengths achieved during these experiments were less than 300 mg/l of ammonia (corresponding to about 12-fold dilution of the raw ammonia-containing feed wastewater to be treated) with substantially less than complete nitrification and denitrification. Highest feed ammonia strengths achieved were about 1200 mg/l ammonia (corresponding to a 3-fold dilution with respect to the raw wastewater feed). Treatment at these levels was sustained only for a single two-week period in the entire test program. Highest nitrification and denitrification rates achieved during this relatively high ammonia strength test period were only between 10% and 50%. In view of the results obtained, the project was abandoned.

SUMMARY OF THE INVENTION

Accordingly, it is an object of this invention to provide a process for treating wastewater containing ammonia as a contaminant.

A further object of this invention is to provide an activated sludge process for treating wastewater containing ammonia as a contaminant and further to provide a process for treating ammonia-containing wastewater where additional contaminants such as cyanide, thiocyanate, sulfide and/or organics are also present in the wastewater.

An even further object of this invention is to provide a biological process for the treatment of wastewater containing ammonia, as well as other contaminants, if present, using an activated sludge process wherein the wastewater can be microbially treated utilizing an appropriate microorganism population acclimated to the ammonia and other contaminants in the wastewater and in particular to the levels of ammonia and other contaminants in the wastewater.

An additional object of this invention is to provide a process for treating wastewater containing contaminants including ammonia, even at high concentration or strength with these two terms being used interchangeably herein to describe the contaminant level, utilizing a microorganism population acclimated to the contaminants present in the wastewater where the microorganism population includes microorganisms capable of converting ammonia to nitrite, optionally microorganisms capable of converting nitrite to nitrate, and microorganisms capable of oxidizing organic material and converting nitrite and/or nitrate to free nitrogen.

Also, an object of this invention is to provide an process for concomitant nitrification/denitrification of ammonia-containing wastewaters utilizing an appropriate, well mixed, stable and acclimated microorganism population to effectively achieve, in a single reactor, a biological conversion of ammonia to free nitrogen wherein pretreatment of raw wastewater feed prior to biological processing can be eliminated.

A further object of this invention is to provide a process for developing a microorganism population appropriately acclimated to treat wastewater containing ammonia, and particularly high levels of ammonia, not previously thought possible to treat in a single reactor treatment.

Also an object of this invention is to provide an activated sludge process for treating wastewater containing ammonia, including ammonia present as a contaminant at high levels, by providing an easily controlled process in which conversion of ammonia to nitrite and/or nitrate and then conversion of nitrite and/or nitrate to free nitrogen, at efficiencies of substantially 100% denitrification to substantially less denitrification to substantially 0% denitrification, can be achieved by controlling the sludge wastage rate, the hydraulic residence time, the dissolved oxygen level, the degree of sludge mixing, the biological oxygen demand (BOD) to nitrogen ratio, the pH and the temperature to achieve conversion of contaminants, including ammonia, in the system and thereby purifying wastewater containing the same to levels acceptable for reuse or release into the environment.

These and other objects set forth above are achieved by the invention described and claimed herein.

One embodiment of this invention provides an activated sludge process for treating wastewater containing ammonia as a contaminant, and further other wastewater contaminants, if present, including cyanide, thiocyanate, sulfide and/or organic materials, comprising microbially treating the wastewater in an activated sludge process in the presence of a microorganism population acclimated to the wastewater contaminants and their levels in the wastewater and including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, under the following conditions:

(1) controlling the sludge wastage rate to the extent that, for the wastewater fed during the treatment and at the conditions at which the treatment is operated, the slude wastage rate
  (i) is low enough to provide and maintain a steady state population of microorganisms capable of converting ammonia to nitrite and/or nitrate yet
  (ii) is high enough to prevent buildup of inert solids in the sludge;

(2) controlling the hydraulic residence time of the wastewater in treatment such that the hydraulic residence time is
  (i) long enough to produce a sludge concentration that can be water/solid separated at the sludge wastage rate of (1) above, and
  (ii) long enough to achieve substantially full sludge performance;

(3) maintaining a dissolved oxygen level
  (i) sufficiently high that microbial conversion of ammonia to nitrite and/or nitrate occurs but
  (ii) lower than the dissolved oxygen level at which microbial conversion of nitrite and/or nitrate to free nitrogen ceases to occur;

(4) mixing the sludge
  (i) to the extent that the sludge mixing rate achieves utilization of sludge present during treatment so as to avoid causing sludge growth which would result in exceeding the maximum allowable sludge wastage rate of (1) above, and
  (ii) to the extent that the sludge mixing rate is large enough to reduce gradients in levels of bulk dissolved oxygen to a level consistent with the denitrification desired for the wastewater treatment, yet
  (iii) to the extent that the sludge mixing rate is below the rate at which microbial cell rupture occurs, irreversible breakup of agglomerates of sludge occurs, and/or sludge/water settleability characteristics are not deteriorated;

(5) controlling the biological oxygen demand during treatment such that at least the stoichiometric amount of biological oxygen demand required to achieve microbial conversion of nitrite and/or nitrate to free nitrogen during treatment at a particular concentration of ammonia in the wastewater fed for treatment is present;

(6) controlling the pH of the treatment
  (i) in a range in which the level of free ammonia inhibitory to microorganism activity during the treatment is avoided, and
  (ii) in a range in which the level of free nitrous acid inhibitory to microorganism activity during treatment is avoided, yet
  (iii) in a hospitable range for microorganism growth and effective treatment of waste in the wastewater is provided; and (7) controlling the temperature of the treatment
   (i) in a range that the level of free ammonia inhibitory to microorganism activity is not present, and
   (ii) in a range that the free nitrous acid inhibitory to microorganism activity is not present, yet
   (iii) in a range that is hospitable for microorganism action on and effective treatment of the waste in the wastewater.

In another embodiment of this invention, the process of this invention comprises a process as described above but with additionally other autotrophic microorganisms capable of converting cyanide, thiocyanate, cyanate and sulfide to ammonia and sulfate present in the microorganism population whereby these additional contaminants, if present in the wastewater, can be treated.

An even further embodiment of this invention provides an activated sludge process for treating wastewater containing ammonia as a contaminant, and further other wastewater contaminants, if present, including cyanide, thiocyanate, sulfide and/or organic materials, comprising microbially treating the wastewater in an activated sludge process in the presence of a microorganism population acclimated to the wastewater contaminants and their levels in the wastewater and including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, under the following conditions (1) controlling the sludge wastage rate to the extent that, for the wastewater fed during the treatment and at the conditions at which the treatment is operated, the sludge wastage rate
   (i) is low enough to provide and maintain a steady state population of microorganisms capable of converting ammonia to nitrite and/or nitrate yet
   (ii) is high enough to prevent buildup of inert solids in the sludge;

(2) controlling the hydraulic residence time of the wastewater in treatment such that the hydraulic residence time is
   (i) long enough to produce a sludge concentration that can be water-solid separated at the sludge wastage rate of (1) above, and
   (ii) long enough to achieve substantially full sludge performance;

(3) maintaining a dissolved oxygen level sufficiently high that microbial conversion of ammonia to nitrite and/or nitrate and of biological oxygen demand to carbon dioxide and water occurs (4) mixing the sludge
   (i) to the extent that the sludge mixing rate achieves utilization of sludge present during treatment so as to avoid causing sludge growth which would result in exceeding the maximum allowable sludge wastage rate of (1) above,
   (ii) to the extent that the sludge mixing rate is large enough to reduce gradients in levels of bulk dissolved oxygen to a level consistent with the level of denitrification desired for the wastewater treatment, yet
   (iii) to the extent that the sludge mixing rate is below the rate at which microbial cell rupture occurs, irreversible breakup of agglomerates of sludge occurs and/or sludge/water settleability characteristics are not deteriorated;

(5) controlling the biological oxygen demand during treatment such that
   (i) at least the stoichiometric amount of biological oxygen demand required to achieve a specified level of denitrification by microbial conversion of nitrite and/or nitrate to free nitrogen during treatment at a particular concentration of ammonia in the wastewater fed for treatment is present; and
   (ii) in the case of substantially no denitrification, controlling the treatment so as to simply provide a source of assimilable carbon for the microorganism population present;

(6) controlling the pH of the treatment
   (i) in a range in which the level of free ammonia inhibitory to microorganism activity during the treatment is avoided, and
   (ii) in a range in which the level of free nitrous acid inhibitory to microorganism activity during treatment is avoided, yet
   (iii) in a hospitable range for microorganism growth and effective treatment of waste in the wastewater is provided; and (7) controlling the temperature of the treatment
   (i) in a range that the level of free nitrous acid inhibitory to microorganism activity is not present, and
   (ii) in a range that the level of free ammonia inhibitory to microorganism activity is not present, yet
   (iii) in a range that is hospitable for microorganism action on and effective treatment of the waste in the wastewater.

Another embodiment of this invention provides a process for developing an acclimated population of microorganisms for treating wastewater containing ammonia as a contaminant, and further other contaminants, if present, including cyanide, thiocyanate, sulfide and/or organic materials, comprising introducing the wastewater into an activated sludge process containing a microorganism population including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, and allowing the nitrifying microorganisms capable of converting ammonia to nitrite, nitrifying microorganisms capable of converting nitrite to nitrate, if present, and facultative microorganisms, each having a different growth rate, to grow and become acclimated to the level of ammonia, and other contaminants if present, by feeding the wastewater to the activated sludge or microorganism population at a rate sufficiently high to stimulate microbial cell division but at a rate insufficiently high that an inhibitory level of ammonia, and other contaminants if present in the wastewater, is not reached, thereby causing the nitrifying microorganisms capable of converting ammonia to nitrite, nitrifying microorganisms capable of converting nitrite to nitrate, if present, and facultative microorganisms to grow relatively such that the microorganism population becomes acclimated to the wastewater contaminants and their levels in the wastewater. In this embodiment, the same parameters (1) to (7), either for complete denitrification or less than complete denitrification as described above, are appropriately controlled as indicated.

BRIEF DESCRIPTION OF THE ACCOMPANYING DRAWINGS

FIG. 1 is a schematic diagram of a conventional treatment process for handling wastewater containing ammonia as a contaminant.

FIG. 2 shows schematically an acclimation embodiment of the process of this invention, where a microorganism population is acclimated to higher contaminant levels over a period of time.

FIG. 3 shows graphically a schematic relationship between hydraulic residence time and sludge concentration.

FIG. 4 shows a cross-sectional view of an idealized sludge agglomerate.

FIG. 5 graphically shows the relationship between hydraulic residence time in relation to sludge concentration to achieve nitrification/denitrification.

FIG. 6 graphically shows hydraulic residence time in relation to sludge concentration to achieve various levels of denitrification.

FIG. 7 shows schematically free ammonia ($NH_3$) inhibition and free nitrous acid ($HNO_2$) inhibition of Nitrosomonas and Nitrobacter action.

FIGS. 8A to 8F show an embodiment of the process of this invention for acclimation of a microorganism population to treat high stength ammonia-containing wastewater as described in Example 1 hereinafter.

Figure 8A:
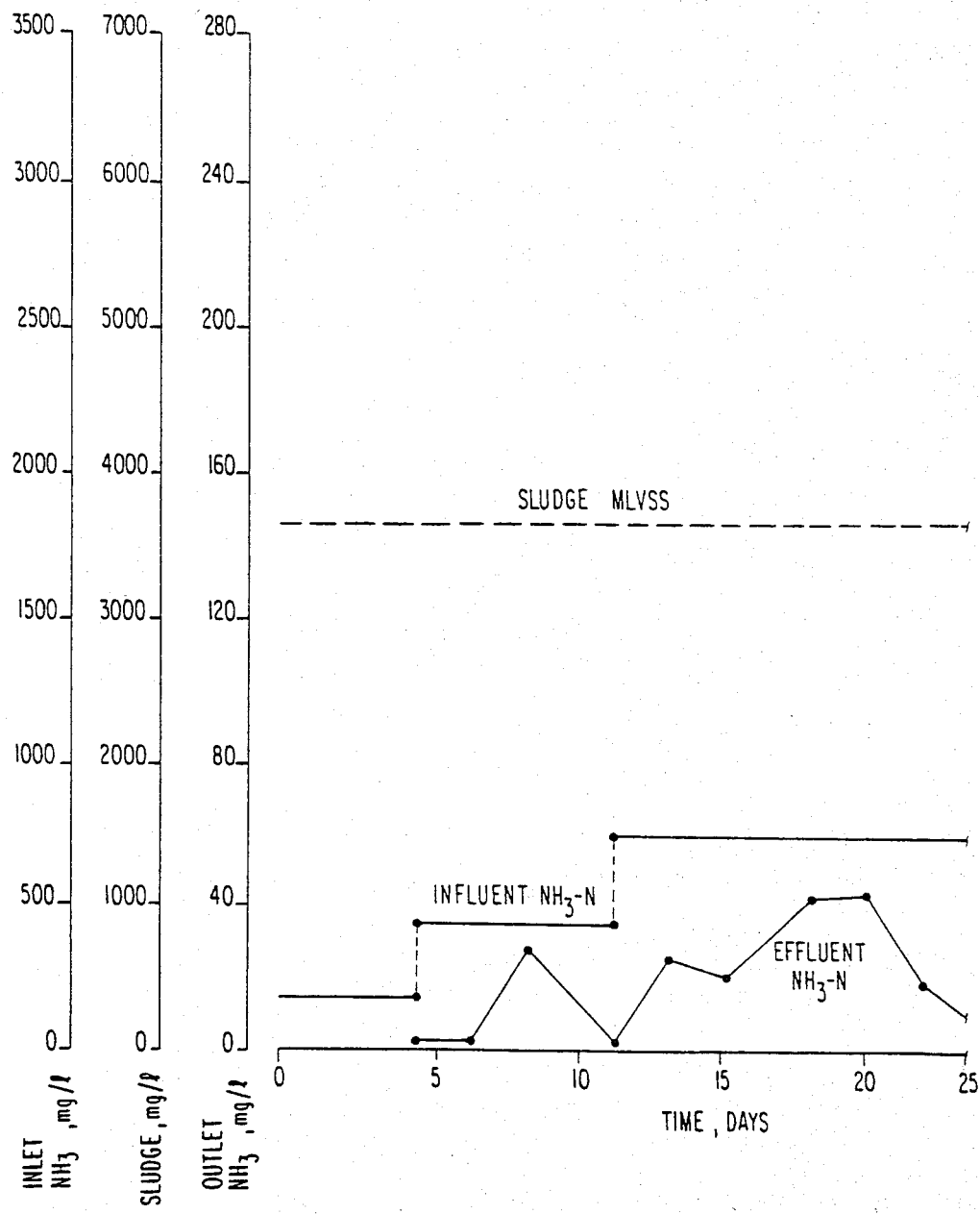
Figure 8C:
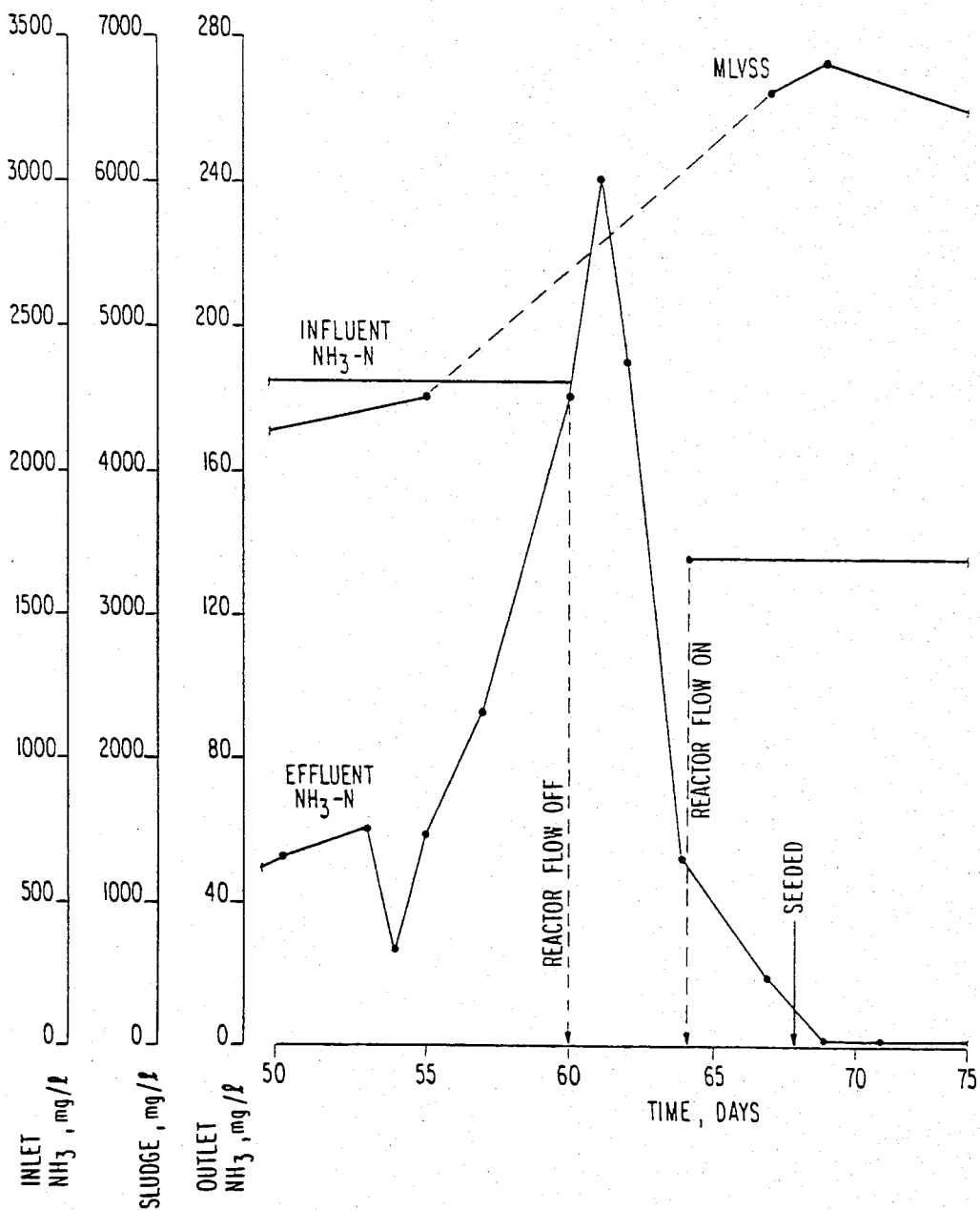
Figure 8E:
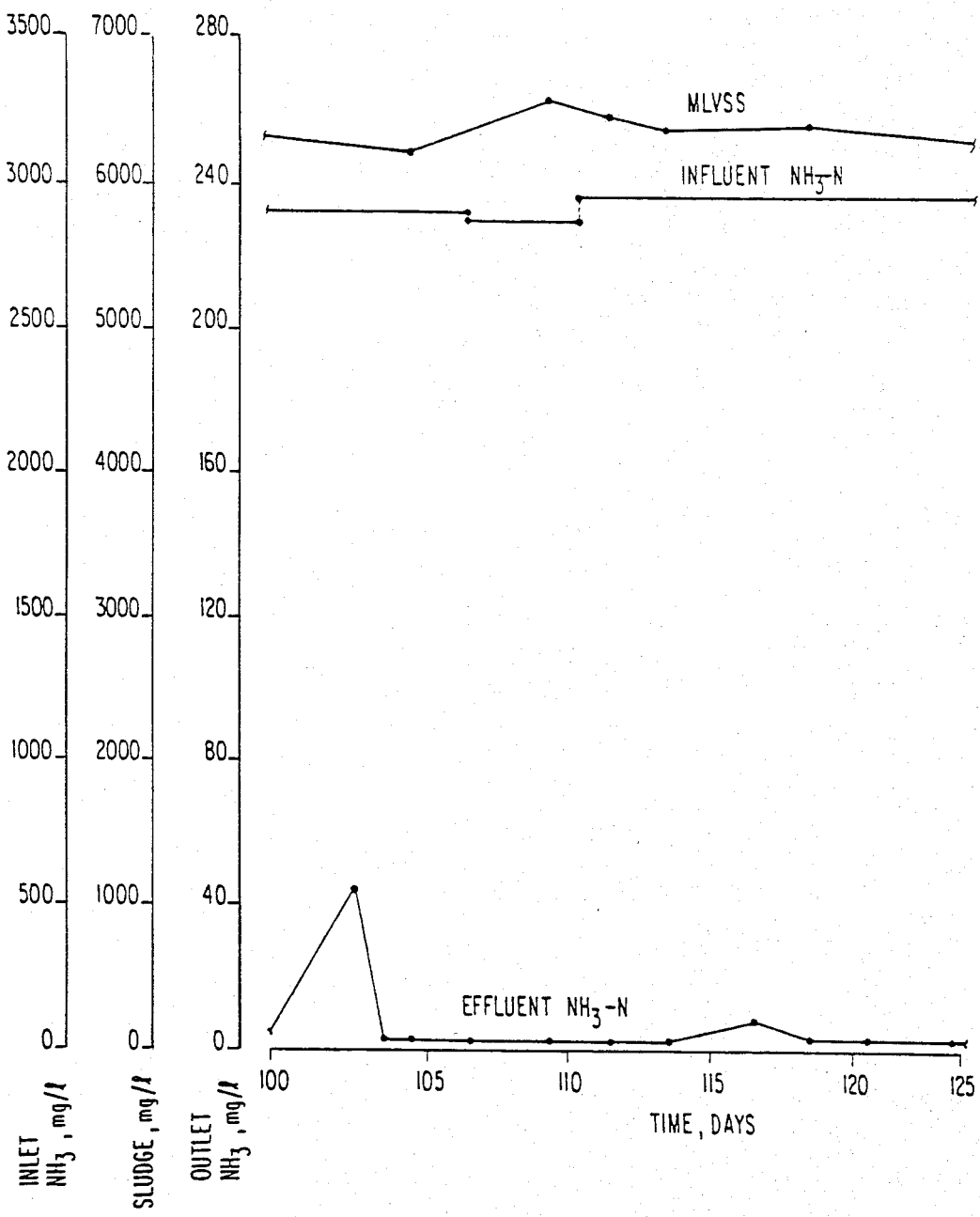
Figure 9B:
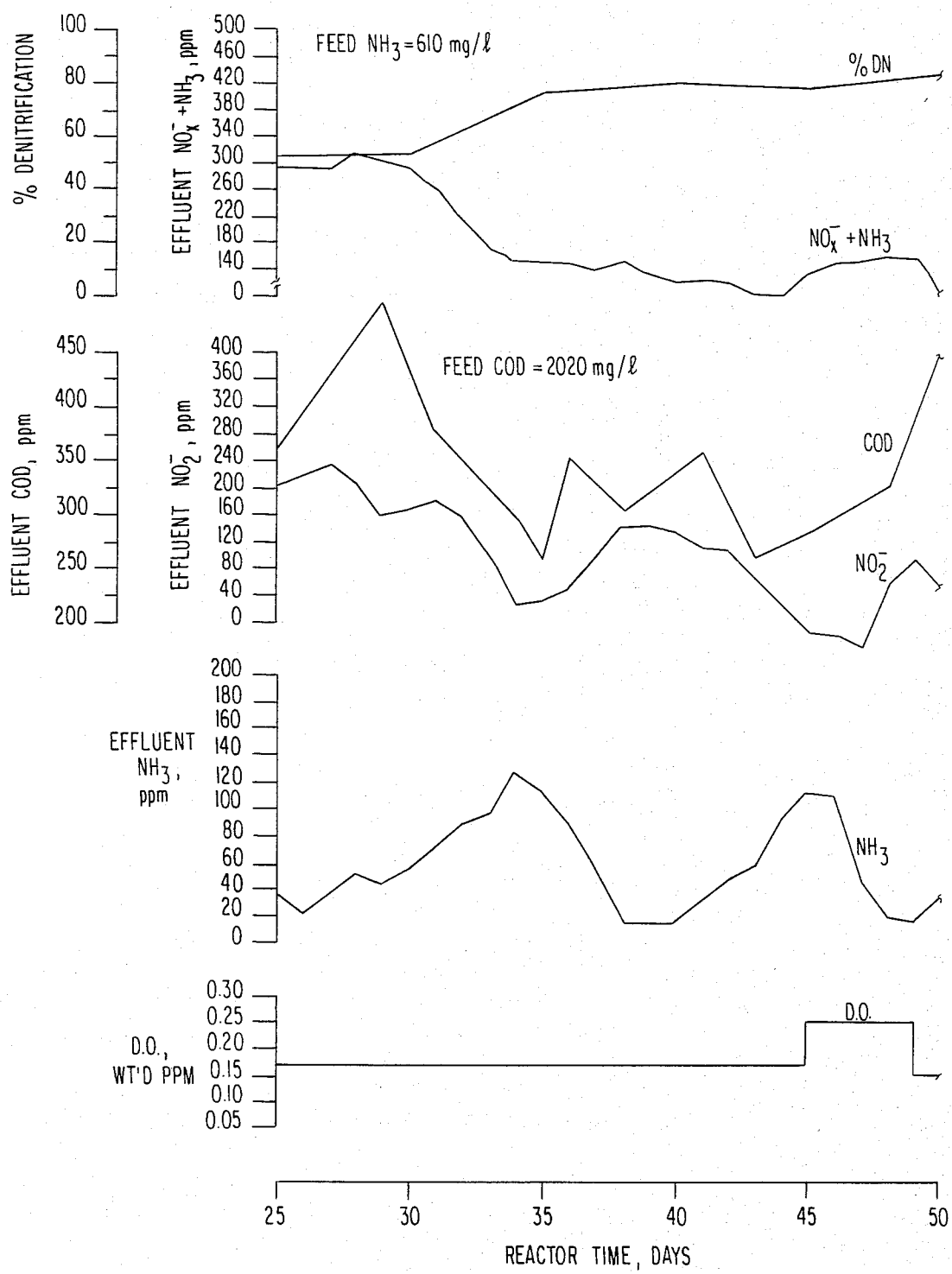

FIGS. 9A to 9C show the effect of dissolved oxygen level and on/off cycling on reactor performance as described in Example 5 hereinafter.

Figure 10:
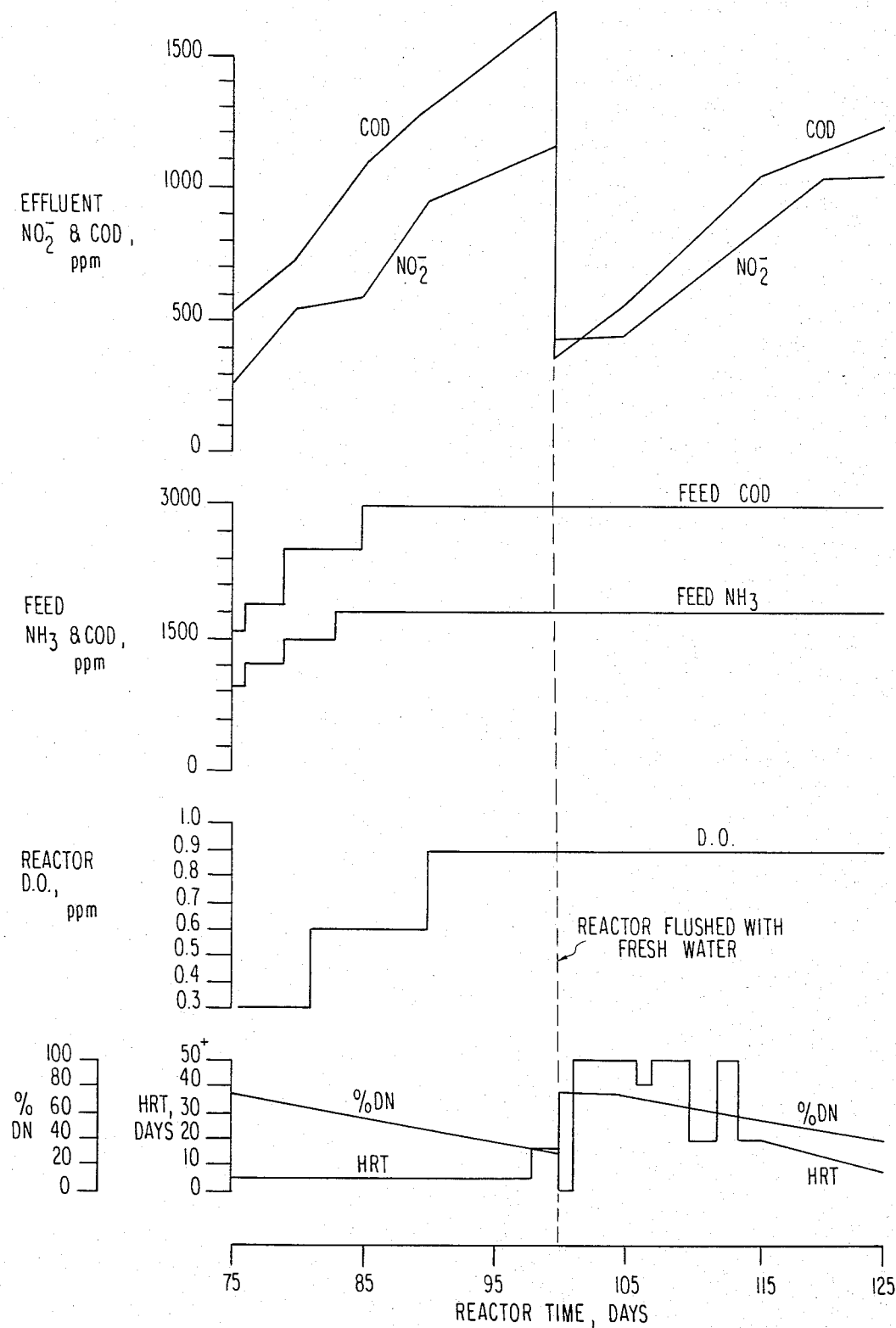

FIG. 10 shows the effects of nitrite concentration on reactor performance as described in Example 5.

DETAILED DESCRIPTION OF THE INVENTION

As described above, this invention provides an activated sludge process for treating wastewater using a microorganism population including nitrifying microorganisms capable of converting ammonia to nitrite, optionally nitrifying microorganisms capable of converting nitrite to nitrate and facultative microorganisms to remove organic contaminants in conjunction with substantially complete denitrification in one embodiment or less than substantially complete denitrification to substantially zero denitrification in another embodiment, both embodiments also optionally including the use of other autotrophic microorganisms capable of acting on other contaminants such as cyanide, thiocyanate and sulfide. This invention in a further embodiment provides the ability to acclimate and develop an appropriate microorganism population including nitrifying microorganisms capable of converting ammonia to nitrite, optionally nitrifying microorganisms capable of converting nitrite to nitrate and facultative microorganisms to remove contaminants including ammonia and other materials, if present, such as cyanide, thiocyanate, sulfide and/or organics, by treatment of wastewater where the microorganism population is acclimated to the contaminants and their levels.

These embodiments of the invention are described in greater detail below.

The activated sludge process for treatment of wastewater from municipal and industrial sources is a well-known process. For example, the activated sludge process and its parameters are described in detail in the literature. More specifically the conventional activated sludge process is an aerobic, biological process which uses the metabolic reactions of microorganisms to remove organic contaminants (measured as biological oxygen demand (BOD) or chemical oxygen demand (COD)) from wastewaters (municipal and industrial). The basic process includes: A stage where a microbial sludge is brought into contact with the wastewater and oxygen at characteristically high dissolved oxygen levels. As a result, the microorganisms absorb and metabolize the contaminants in the wastewater. This stage includes means for mixing the microorganisms with the wastewater and means for oxygenating the wastewater/microorganism mixture. In some cases the mixing and oxygenation are performed by a single device. The contact can be achieved by suspending the sludge in the wastewater or by using a fixed sludge film. Where the sludge is suspended in the wastewater, a sludge clarifying stage is needed where the microorganisms are separated from the treated wastewater. This clarifying stage includes means to return the separated sludge to the aeration stage and to remove any excess microbial sludge generated as a result of the metabolic reactions in the aeration stage or that brought into the system with the raw wastewater.

More detailed descriptions of the activated sludge process can be found in *Wastewater Treatment Plant Design, Water Pollution Control Federation Manual of Practice*, No. 8, (1977); *Biological Treatment of Sewage and Industrial Wastes*, McCabe and Eckenfelchen, Eds., Reinhold Publishing Corp. (1958); L. G. Rich, *Unit Processes of Sanitary Engineering*, Wiley, (1963); and *Wastewater Engineering*, Metcalf and Eddy, Inc., Mcgraw Hill (1972).

The activated sludge treatment process of this invention employs a unique population of microorganism species, the same microorganism species as frequently used in a conventional activated sludge process. This population of microorganisms includes nitrifying microorganisms capable of converting ammonia into nitrite and, optionally, nitrifying microorganisms capable of converting nitrite into nitrate, and facultative microorganisms capable of oxidizing organic material and converting nitrite and/or nitrate into free nitrogen. As a result of the presence of nitrifying and denitrifying-/facultative microorganisms, ammonia as a contaminant in the wastewater can be appropriately treated and removed or the level thereof in the wastewater markedly reduced, and to levels acceptable for reuse or meeting governmental regulations concerning discharge into the environment.

The term "ammonia" is used herein as it is used conventionally in the art to describe ammonia as a contaminant in industrial wastewater. It should be recognized that this term in actuality refers to the $NH_4^+$ ion which exists in aqueous solution and it is this ion which is acted on microbially and used. It should also be recognized that in aqueous solution, a thermodynamic equilibrium exists as follows:

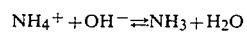

$$NH_4^+ + OH^- \rightleftharpoons NH_3 + H_2O$$

with one species ($NH_4^+$) being favored over the other ($NH_3$) and vice versa depending on the conditions.

Thus, for clarity, the term "ammonia" is used herein to describe the $NH_4^+$ species and the term "free ammonia" is used herein to describe the $NH_3$ species.

Suitable nitrifying microorganisms capable of converting ammonia to nitrite which can be used in this invention include microorganisms such as *Nitrosomonas europea*. These types of microorganisms are generally referred to in the art as Nitrosomonas microorganisms.

Suitable nitrifying microorganisms capable of converting nitrite to nitrate which can be employed optionally in this invention include microorganisms such as *Nitrobacter winnogradski* and *Nitrobacter agilis*. These types of microorganisms are generally referred to in the art as Nitrobacter microorganisms.

Suitable facultative microorganisms which can oxidize organics and convert nitrite and/or nitrate to free nitrogen under anaerobic conditions which can be employed in this invention include a wide variety of species of the genera Pseudomonas, Achromobacter, Bacillus and Micrococcus.

The species and genera shown above are given simply for the purposes of illustration and are not to be considered as limiting this invention. Basically as long as the microorganisms used are capable of functioning as described, i.e., converting ammonia to nitrite, nitrite to nitrate, etc., they can be suitably employed in this invention. These types of microorganisms are well known and readily available in the environment. Accordingly, they can be incorporated into the treatment system using conventional techniques and employing normal sources of supply. Sources of such microorganisms include—soil, other biological treatment facilities (municipal and/or industrial) and the like sources. A particularly preferred source for the microorganisms used in this invention is a seed from a conventional facility treating wastewater containing the same type of contaminants present as in the wastewater to be treated in accordance with this invention. Also a preferred source is a seed from a municipal wastewater treatment facility.

As a result of the presence of these nitrifying and facultative/denitrifying microorganisms present in the system, ammonia as a contaminant in the wastewater is acted upon and removed.

The underlying basic chemistry which occurs as a result of the microbial conversion of ammonia to free nitrogen is shown by the reaction schematics below.

As indicated above, the nitrifying microorganisms such as Nitrosomonas aerobically convert ammonia in the wastewater to nitrite in accordance with the following reaction schematic (I):

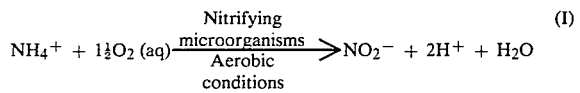
(I)

Once the ammonia has been converted into nitrite, nitrifying microorganisms such as Nitrobacter, if they are present, aerobically act on the nitrite to convert such into nitrate in accordance with the following reaction schematic (II):

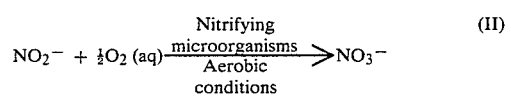
(II)

Aerobic conditions which give rise to the conversions shown in reaction schematics (I) and (II) above are dissolved oxygen levels of at least about 0.5 milligrams of oxygen per liter of wastewater as set forth in the art and, as a result of the invention discovery herein described, at dissolved oxygen levels as low as about 0.1 mg of oxygen per liter of wastewater.

Subsequently, the facultative microorganisms act on the nitrite and/or nitrate in the presence of dissolved biological oxygen demand (BOD) due to the dissolved organics present, either as contaminants in the wastewater or affirmatively added to the wastewater, with the nitrite and/or nitrate being anoxically converted to free nitrogen in accordance with the following reaction schematic (III):

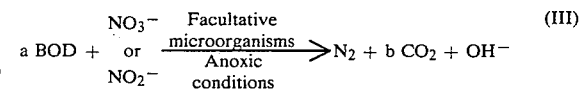
(III)

The conditions under which conversion of ammonia to free nitrogen occurs by the nitrifying and facultative/denitrifying microorganims described above in accordance with the schematics above are described in greater detail hereinafter in the discussion of the parameters controlled in the process of this invention. The schematics given above are basically to provide an understanding of the underlying aerobic and anoxic chemistry in the microbial conversion and removal of ammonia as a contaminant from the wastewater.

As indicated above, contaminants in addition to ammonia may be present in the wastewater and if they are present, wastewater containing such can be treated. Additional pollutants such as thiocyanate, sulfide and cyanide, as well as organics inherently providing the BOD necessary for conversion of nitrite and/or nitrate to free nitrogen, can be treated and removed from the wastewater in the activated sludge process of this invention. The term "biological oxygen demand" or "BOD" as used herein is intended to mean "dissolved biological oxygen demand" or "dissolved BOD".

More specifically, if sulfide is present as a contaminant in the wastewater, the sulfide can be removed by conversion to sulfate in accordance with the following reaction schematic (IV):

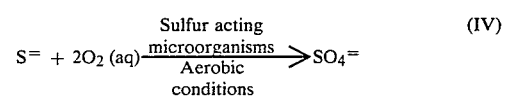
(IV)

These sulfur acting microorganisms are also capable of acting on other forms of sulfur, e.g., thiosulfate, which may be present and converting it to sulfate in accordance with reaction schematic (V) below:

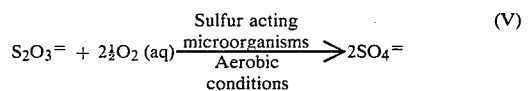
(V)

Further, if thiocyanate is present as a contaminant in the wastewater, thiocyanate can be acted upon by microorganisms capable of converting the thiocyanate to sulfide in accordance with the following reaction schematic (VI).

$$\text{SCN}^- + \tfrac{1}{2} \text{O}_2 \text{(aq)} \xrightarrow[\text{Aerobic conditions}]{\text{Sulfur acting microorganisms}} \text{S}^= + \text{CNO}^- \quad \text{(VI)}$$

In this reaction schematic (VI), it can be seen that thiocyanate is converted into sulfide wherein upon formation of sulfide, in accordance with reaction schematic (IV) above, the sulfide so formed can be converted to sulfate in the same manner that sulfide as a contaminant present originally in the wastewater is converted to sulfate.

Suitable sulfur acting microorganisms which can be employed to convert sulfide or thiosulfate to sulfate in accordance with reaction schematics (IV) and (V) above include many species of the genus Thiobacillus. Specifically, the microorganisms which can be employed to convert thiocyanate into sulfide and cyanate in accordance with reaction schematic (VI) include *Thiobacillus thiocyanoxidans*.

If cyanide is present as a contaminant also in the wastewater, by using appropriate microorganisms capable of acting upon the cyanide and converting such into cyanate, cyanide as a contaminant can be removed from the wastewater in accordance with the following schematic (VII):

$$\text{CN}^- + \tfrac{1}{2} \text{O}_2 \text{(aq)} \xrightarrow[\text{Aerobic conditions}]{\text{Cyanide acting microorganisms}} \text{CNO}^- \quad \text{(VII)}$$

Suitable microorganisms which can be employed to convert cyanide into cyanate include various species of the Actinomycetaceae family.

It can be seen from examining the chemistry involved in schematics (VI) and (VII) above that cyanate is a reaction product produced and this can be further converted biochemically by the microorganisms indicated as a result of reaction with water to form carbon dioxide, ammonia and hydroxide ion in accordance with reaction schematic (VIII) below:

$$\text{CNO}^- + 2\text{H}_2\text{O} \longrightarrow \text{CO}_2 + \text{NH}_3 + \text{OH}^- \quad \text{(VIII)}$$

Thus it can be seen that the conversion of cyanate results in the formation of carbon dioxide and hydroxide ion, which are non-pollutants, and ammonia in reaction schematic (VIII) with the ammonia then being available for conversion to nitrite and/or nitrate and ultimately to free nitrogen, a non-pollutant, in accordance with reaction schematics (I), (II) and (III) above. Thus, this results in the removal from the system of ammonia as a contaminant in the wastewater through reactions (I), (II) and (III) discussed above and, further, as a result of interaction of organics providing a biological oxygen demand in reaction (III) above, removal of organic pollutants, by conversion of such into non-pollutants such as free nitrogen, carbon dioxide and hydroxide ion.

Further, it can be seen from an examination of the chemistry involved in the activated sludge process of this invention as a result of the conversions indicated in reaction schematics (I)–(VIII) above that ammonia as a contaminant can be removed from the wastewater and further, that additional contaminants, if present, such as thiocyanate, sulfide and cyanide can be also similarly removed and ultimately converted into non-pollutants and non-toxic materials. Further, it can be seen from examination of reaction schematic (III) above that organics present in the wastewater providing a biological oxygen demand can be removed since they interact in the conversion of the nitrite and/or nitrate to free nitrogen.

Any excess biological oxygen demand which may be present in the wastewater over that stoichiometrically required to convert the nitrite and/or nitrate to free nitrogen in reaction schematic (III) can be oxidized by the same facultative microorganisms as described above and converted into carbon dioxide and water under appropriate conditions in accordance with reaction schematic (IX) below:

$$a \text{ BOD} + b \text{ O}_2 \text{(aq)} \xrightarrow[\text{Aerobic conditions}]{\text{Facultative microorganisms}} b \text{ CO}_2 + c \text{ H}_2\text{O} \quad \text{(IX)}$$

Wastewaters which can be treated in accordance with the process of this invention include those containing ammonia as a contaminant. Further, if present, additional contaminants such as sulfide, cyanate, thiocyanate and cyanide as well as wastewaters containing organics giving rise to a biological oxygen demand and wastewaters containing suspended solids can be treated in accordance with the process of this invention. Such wastewaters can arise from industrial sources including wastewaters from industrial processes such as coal coking, petroleum refining, oil shale retorting, coal gasification and liquefaction, fertilizer manufacture, food processing, munitions manufacture, pharmaceuticals manufacture, specialty chemicals manufacture and the like. These wastewaters all contain ammonia as a contaminant and can be advantageously treated by the process of this invention, which is in particular effective in treating wastewaters containing about 500 mg/l and more generally 1000 mg/l or more of ammonia and ammonia-containing wastewaters of a concentration of even as low as 300 mg/l can be treated.

While not desiring the following to be limiting, wastewaters having the following characteristics can be suitably treated in accordance with the process of this invention.

TABLE 2

| CONTAMINANT | CONCENTRATION, PPM |
|---|---|
| Biodegradable Organic N (TKN) | 100's to 1000's |
| $NH_3$—N | |
| COD | Not Limited |
| $S^=$ | 10's to 1000's |
| $SCN^-$ | 100's |
| $CN^-$, FREE | 1's to 100's |
| $CN^-$, TOTAL | 1's to 10's |
| SUSPENDED SOLIDS | <1000's |
| Alkalinity | Not limited |

TKN = Total Kjeldahl Nitrogen

It can be seen from an examination of the reaction schematics above that an appropriate microbial population, both in terms of types of microorganisms and relative quantities thereof, is necessary to achieve the objects of this invention. The appropriate microorganism population used in this invention basically is dependent upon (1) the quantities of specific contaminant species in the wastewater to be treated, (2) the bulk reaction rates of the individual microorganisms (in term of mg of reaction per mg of microorganisms per day) responsible for the conversion of contaminants initially present and/or intermediate reaction products produced and (3) the total time allotted for reaction, i.e., the residence time of the wastewater in contact with the sludge in the activated sludge process. Typically, industrial wastewater is complex and in addition to including ammonia as a contaminant, will also include cyanide, thiocyanate, sulfide, dissolved organics, etc., with the organic contaminants giving rise to an overall biological oxygen demand. The appropriate microbial species used and the chemical reactions giving rise to and acting upon a contaminant present in the wastewater are described above and by reference to the reaction schematics shown.

To explain the appropriate microorganism population further, with a given residence time of wastewater in contact with the sludge, individual microorganism reaction rates and therefore quantities of each of the microorganisms required in the sludge, the population necessary will depend upon choice of pH, temperature and dissolved oxygen level of the sludge. In general, higher pH and temperature combined with dissolved oxygen levels just slightly above the minimum required for nitrification, or conversion of ammonia to nitrite and/or nitrate, but below levels which inhibit microorganism performance, e.g., about 27° C., in the case of Nitrobacter microorganism performance, favors increased net kinetics per unit weight of system sludge.

It has been found in this invention that in view of the slow growth rates of certain types of microorganisms, particularly nitrifying microorganisms, relative to others, e.g., facultative microorganisms, there is a need for patient development of a large microorganism population through gradual increases in the contaminant concentration of wastewater fed to the sludge. In order to develop and acclimate the microbial population and provide an appropriate microbial population for conversion of the contaminants present in the wastewater, particularly, ammonia and particularly where treating wastewaters containing high concentrations of ammonia is desired, an acclimation/development cycle on the order of up to three to four months or more may be necessary to achieve the appropriate acclimated microbial population. Sludge development preferably begins with facultative microorganisms followed by development of the appropriate nitrifying microorganism population therewith. Acclimation and achievement of an appropriate microorganism population is decribed in greater detail by reference to Example 1 thereof given hereinafter.

Further, upon examination of the reaction schematics (I), (II) and (III), shown above, it can be seen that one unit of acid ($H^+$) is produced per unit of ammonia converted using the sludge produced in accordance with this invention when essentially complete nitrification/-denitrifaction, i.e., conversion of ammonia to nitrite and/or to nitrate followed by conversion of nitrite and/or nitrate to free nitrogen, is achieved. If the wastewater being treated does not have the ability to "buffer" this excess acid formation, then an appropriate addition of alkali ($OH^-$) can be made to the sludge to maintain the mixed liquid pH, i.e., the pH of the sludge plus the wastewater in treatment, in a desired range. A particularly important advantage of the process of this invention occurs when the process is operated at appropriate parameters to achieve concomitant nitrification and denitrification, viz., one of the two acid units produced as a result of nitrification by the sludge, i.e., conversion of ammonia to nitrite in accordance with reaction schematic (I), is neutralized by the unit of alkali which is generated by the same sludge during the denitrication, i.e., conversion of nitrite and/or nitrate to free nitrogen in accordance with reaction schematic (III). The partial neutralization achieved as a result of the overall conversions occurring in the system, i.e., neutralization of one of the two units of acid produced in conversion of ammonia to nitrite by one unit of alkali produced in conversion of nitrite and/or nitrate, by interaction with the BOD, to free nitrogen is a very important advantage of the process of this invention. Thus, even if the wastewater treated has no capacity to buffer against the overall excess of acid produced as a result of consideration of the chemistry involved in the combination of the reactions shown by schematics (I), (II) and (III), it can be seen that the amount of alkali which needs to be added to neutralize the excess acid arising and thus maintain the pH of the mixed liquor in an appropriate and hospitable range for microbial conversion is half that which would be required if concomitant nitrification and denitrification in a single reactor were not achievable.

This internal neutralization is extremely important in the economics of operating the process of this invention for treatment of ammonia containing wastewater. To the extent that the wastewater being treated has any buffer capacity (alkalinity) as a result of additional components present in the wastewater fed or arising as a result of secondary reactions occurring other than the conversion of ammonia to nitrite and/or nitrate to free nitrogen, the amount of alkali overall which must be added to maintain an appropriate pH of the sludge for efficient microorganism activity is, of course, even further reduced. This means that the process of this invention is even more economically advantageous.

To treat in a single reactor with a well-mixed sludge wastewater containing ammonia as a contaminant to full nitrification and particularly to treat wastewaters to complete nitrification containing high concentrations of ammonia as a contaminant such as at levels above about 500 mg/l, as set forth previously in the process of this invention, the microbial population including nitrifying microorganisms and facultative/denitrifying microorganisms, as described above, must be appropriately grown and acclimated to the extent that the population of these microorganisms present during treatment can not only act in their respective reactions and conversions but also can achieve such in relation to the level of contaminants present.

As indicated above, the acclimation period to achieve this population may require a length of time up to three to four months or more prior to achieving the capability to treat full strength wastewater, containing in particular high levels of ammonia, or ammonia producing materials. The reason for this acclimation period is that certain types of microorganisms necessary in the population such as facultative heterotrophic microorganisms grow rapidly, particularly in a distinctively aerobic environment. In contrast, autotrophic microorganisms such as Nitrosomonas, Nitrobacter, cyanide and sulfur acting microorganisms grow much more slowly, for example, on the order of tens to hundreds of times more slowly. As a result, in the acclimation period, it is necessary a sufficiently high level of autotrophic microorganisms to provide the sludge with the ability to convert ammonia to nitrite, and optionally, nitrite to nitrate and sulfur, cyanide and thiocyanate to their respective end product species, since facultative heterotrophic microorganisms, with more rapid growth rates, can easily and readily act on both the nitrite and the nitrate produced in the presence of BOD, and convert the nitrite and nitrate to free nitrogen.

In order to achieve this microorganism population acclimation, the contaminants in the wastewater fed initially to the activated sludge system containing nitrifying and facultative/denitrifying microorganisms, as well as sulfur-acting and cyanide-acting microorganisms, are present at such a level that growth of the more slowly growing microorganisms can be enhanced and yet the system not overloaded with a contaminant level which would be inhibitory to this microorganism growth. With knowledge of microbial growth rates and the levels of wastewater which will permit the autotrophic microorganisms to grow and yet not inhibit microbial growth, the wastewater is fed to the sludge in the system and over a period of time while the level of contaminants, for example, ammonia, is increased in a gradually ascending manner. Again precautions are taken such that the level of increase of contaminants when made does not overload the system and thus the microbial population is allowed to adjust to the increased level of contaminants present in the wastewater fed to the system. This increase in the level of contaminants into the system can be in a gradual manner or can be stepwise increased over a period of time.

Parameters such as pH, contaminant concentration in the wastewater feed and treated water, water flow rate, total mixed liquor volatile solids (a measure of all microorganisms present) and the like can appropriately be monitored using conventional techniques and adjustments made using conventional procedures. These measurements can subsequently be used to estimate the changes in the proportions of the different groups of microorganisms. The monitoring of the various parameters described above can be achieved through routine sampling and chemical analysis of both wastewater feed and effluent, and measurements of wastewater feed flow rates, pH and dissolved oxygen uptake rates of the system mixed liquor can be made. Typical chemical analyses of the wastewater feed and effluent will include analyses of alkalinity, ammonia, cyanide, COD and BOD, sulfide, thiocyanate and specified organics as desired. These analytical procedures can be performed generally in accordance with the procedures specified in the *Standard Methods for Water and Wastewater Analysis*.

More specifically, with a raw wastewater to be treated without any type of pretreatment whatsoever, the level of contaminants present in the wastewater is initially determined, for example, chemically, and then the concentration of contaminants present in the wastewater to be fed to the sludge is appropriately adjusted, for example, either by initial dilution with uncontaminated water or by ammonia stripping to produce a contaminant concentration at a level at which the initial microorganism population including heterotrophic and autotrophic microorganisms will not be overloaded and rendered ineffective and further that the growth of the slow growing autotrophic microorganisms, will not be inhibited. The necessary adjustment of this initial wastewater feed contaminant level can be determined by basically monitoring the overall nature of the microbial growth, the volatile solids concentration, the dissolved oxygen uptake rate, the pH, the temperature in the system and the concentration of contaminants present in the wastewater fed to the system and in effluent removed after subjecting the wastewater to treatment by the system. For example, if by analysis of the effluent from the system it is found that ammonia as a contaminant is passing through the system unreacted, it is known that the system is overloaded and either a longer residence time of the wastewater in contact with the sludge is necessary or that the initial concentration of contaminant in the wastewater feed is too high. Appropriate adjustment can then be made based on this analysis.

Similarly, once the acclimation process has been started, the concentration of contaminants such as ammonia in the wastewater feed is slowly increased, either continuously or stepwise, again to the extent that the system is not overloaded with each incremental increase. The appropriate increase in concentration of contaminants in the wastewater fed to the system during the acclimation period can be simply achieved either by removing contaminants to an increasingly lesser extent or by diluting the raw wastewater feed containing ammonia as a contaminant to an increasingly lesser extent, as each incremental increase in contaminant concentration in the wastewater fed to the system is made. Again, the system can be continuously monitored by evaluation of effluent from the system in relation to the feed to the system (and conditions of the mixed liquor (pH and temperature)) to determine that acclimation and development of the microorganism population has been achieved for each incremental increase in a concentration of contaminant in the wastewater fed. By increasing the concentration of contaminant in the wastewater fed, for example, by simply diluting the raw wastewater desired to be treated to lesser and lesser extents over a period of time, the microorganism population of the sludge can be developed and acclimated to increasing levels of contaminants over a period of time. Ultimately, as a result of successively less dilution of the contaminated wastewater fed to the system, a feed of "full strength" wastewater for direct treatment without the necessity for any dilution as was required during the acclimation process can be achieved.

Thus, wastewaters containing high levels of ammonia as a contaminant can be treated by the process of this invention without the necessity for a prior physical or chemical treatment of the raw wastewater, as is conventionally used in the art, to reduce contaminant levels within ranges conventional technology teaches can be appropriately treated in an activated sludge process. For example, as described in FIG. 1, to treat high strength ammonia containing wastewater, conventionally an ammonia stripping step is necessary in order to reduce the level of ammonia present in the wastewater to be fed to the activated sludge process and achieve effective treatment of the ammonia contaminant in the wastewater. By acclimating the microorganism population as described in this embodiment of this invention above and utilizing the acclimated microorganism population in another embodiment of this invention, the necessity for any prior pretreatment such as ammonia stripping is eliminated and raw wastewaters containing extremely high levels of ammonia as a contaminant, such as about 500 mg/l and up to at least about 8000 mg/l, can be fed directly to the activated sludge in the process in accordance with this invention. The ability to eliminate pre-treatment steps ssuch as an ammonia stripping step and the necessity for attendant equipment to accomplish ammonia stripping demonstrates readily that the process of this invention is economically quite advantageous.

Since the process of acclimation of this invention described above is to acclimate a microorganism population to treat wastewater containing contaminants and at the levels present in the wastewater, the parameters controlled during acclimation are basically the same as those described hereinafter with control of each parameter being as hereinafter described.

A specific example of the acclimation of activated sludge is shown schematically in FIG. 2 attached hereto in which the abscissa shows the days of operation during acclimation and the ordinate on the left-hand side shows the concentration of ammonia, in percent, in the raw wastewater while the ordinate on the right-hand side shows the raw wastewater ammonia concentration, in mg/l, fed. From FIG. 2, it can be seen that with time, the concentration of ammonia in the wastewater initially fed to the system can be increased in a stepwise manner in order to permit the microorganism population present in the sludge to acclimate itself to handle increasingly higher levels of ammonia in the wastewater. As shown in FIG. 2, in a little over three months in the specific system shown, the ability of the sludge to process contaminants in the wastewater can be increased from approximately an ammonia level of 500 mg/l to approximately six times that level or 3,000 mg/l in 100 days, or just a little over three months.

It should be emphasized that FIG. 2 simply shows a representative specific example of how and at what rate the acclimation process of this invention can be conducted. In actuality, the acclimation process is limited only by ammonia concentrations and increases therein to the extent that growth of the sludge occurs up to a level of less than that ammonia concentration which would result in the system being overloaded, and microorganism growth and thereby conversion of contaminants inhibited for the microorganism population in the sludge or rendered ineffective as a result of the overload.

It should be further emphasized with respect to FIG. 2 that FIG. 2 is specific to acclimation of a particular seed sludge to a particular raw wastewater feed and at a specific system pH and temperature. The acclimation ability and time will thus be dependent upon the initial size of the individual microorganism populations, particularly nitrifying microorganisms, and those parameters which control microorganism growth and reaction rates, notably pH, temperature and dissolved oxygen levels. However, acclimation can be achieved easily by one skilled in the art even where these parameters are varied using the principles described above. For example, if for some reason the activated sludge system is to be operated at less than at an optimal temperature or pH for the microorganism population used, then longer acclimation periods and less severe incremental increases of contaminant level in the wastewater may be necessary since under these conditions of less than optimal temperature and pH, it would be expected that microorganism growth, proliferation and ability to treat and remove contaminants would be reduced. Further, if the seed sludge has lesser quantities of nitrifying microorganisms, then a longer time will have to be allowed during acclimation for the growth of nitrifying microorganisms.

Another specific example of the acclimation embodiment of the process of this invention is described in detail hereinafter in Example 1.

Once an acclimated microorganism population has been achieved appropriate to the presence of ammonia and its level in the wastewater to be fed to the system as well as appropriate to any other contaminants, if present, in the raw wastewater to be treated, this microorganism population can be appropriately used in an embodiment of the process of this invention to treat and thereby purify wastewater containing even high levels of contaminants without the necessity for any prior pretreatment of the wastewater. In treating wastewater of this character with high contaminant levels using a microorganism population acclimated as described in detail above, high strength ammonia wastewaters can be advantageously treated by converting the ammonia as a contaminant into free nitrogen as described above in reaction schematics (I), (II) and (III). In order to achieve this efficiently and concomitantly to achieve the appropriate denitrification in the same sludge as nitrification, it is essential that appropriate process parameters described below in detail be controlled in this embodiment of the process of this invention.

These essential and controlled parameters include controlling sludge wastage rate, hydraulic residence time, dissolved oxygen level, degree of sludge mixing, ratio of COD to total system nitrogen (including feed water nitrogen in all forms, e.g., $NH_4^+$, $SCN^-$, $HCN$), pH and temperature. These parameters which are controlled are described in detail below.

(1) Sludge Wastage Rate

In operating this embodiment of the process of this invention, the sludge wastage rate is controlled. This control is to the extent that for the wastewater fed during the treatment and at the conditions at which the treatment of the wastewater is operated, a steady state of microorganisms capable of converting ammonia to nitrite and/or nitrate is achieved and maintained and the inert solids level remains steady. More specifically, the sludge wastage rate is controlled to be low enough to achieve and sustain a desired microorganism population, particularly microorganisms capable of converting ammonia to nitrite and/or nitrate, yet high enough to prevent the buildup of inert solids in the sludge.

In operating the process of this invention, even more specifically the sludge wastage rate must be low enough to sustain a desired population of nitrifying and facultative microorganisms and yet high enough to prevent the buildup of inert solids in the sludge. The buildup of inert solids arises as a result of the combination of inert solids flowing in with the wastewater feed and inert solids producd within the sludge.

The maximum allowable sludge wastage rate (e.g., in lbs/day) will vary with the total quantity of sludge involved, but in all cases the maximum allowable rate is based upon the replenishment rates for various types of microorganisms (e.g., nitrifying microorganisms, facultative microorganisms in lbs/day) and the percentage of the bulk sludge represented by each type of microorganism, respectively, in accordance with the following:

Sludge Wastage Rate for Type "$X$" Microorganism (lbs/day) =   (A)

-continued
$$\frac{\text{Replenishment Rate of Type ``}X\text{''}}{\text{Microorganism (lbs/day)}}$$
$$\frac{}{\text{Fraction of Sludge}}$$
Represented by Type "X" Microorganism where the Maximum Sludge Wastage Rate is determined as the smallest of the Sludge Wastage Rates, calculated for each type microorganism present.

The minimum sludge wastage rates necessary to avoid solids buildup in the sludge is determined by establishing (a) the net rate of inert solids input (i.e., arising from feed wastewater and sludge production) and (b) the steady state concentration of inert solids in the sludge which is desired in accordance with the following:

Net Inert Solids Input (lbs/day) =             (B)
    Inert Solids in Feed Wastewater (lbs/day) +
    Inert Solids Produced by Sludge (lbs/day) −
    Inert Solids Carried Out in Wastewater Discharge (lbs/day)

Steady State Inert Solids Loading (fraction) =     (C)

$$\frac{[\text{Weight of Inert Solids in Sludge (lbs)}]}{[\text{Total Weight of Sludge (lbs)}]}$$

Minimum Sludge Wastage Rate (lbs/day) =      (D)

$$\frac{[\text{Net Inert Solids Input Rate (lbs/day)}]}{[\text{Steady State Inert Solids Loading (fraction)}]}$$

The above equations are exemplified in the English system of units but it is clear that using the principles described, sludge wastage rate calculations in other than the English system of units can be made.

It should be noted that the minimum sludge wastage rate can be decreased by increasing the steady state fraction of the sludge which is inert solids. Within the limits described above, operation at as low an actual sludge wastage rate as is possible is generally preferred, with a substantially zero actual sludge wastage rate being especially preferred, unless enhanced reaction kinetics associated with microorganism growth are desired.

Whether a steady state is achieved can be determined by determining the amount of sludge present and the amount of sludge lost or affirmatively described from the system to the extent that sludge increase as a result of microorganism population increase due to sludge growth and inert solids level increase are substantially equal to the amount of microorganisms and inert solids lost or affirmatively discharged as sludge with effluent from the system. Optimally, the system will be operated at substantially a zero actual sludge wastage rate such that (i) the growth of the microorganism population in terms of increase in number of microorganism cells is substantially equal to the loss of microorganism cells which inherently occur as a result of wastewater passed through the system during treatment and any microorganism cells affirmatively discharged and (ii) the inert solids level which arises as a result of input in the wastewater and production in situ in the sludge remains the same as a result of selecting increasing sludge concentration in the effluent discharged from the system.

The actual sludge wastage rate can be determined by monitoring various variables such as total suspended solids in the inflow of raw wastewater to the system and in the outflow of treated water effluent from the system.

The actual sludge wastage rate can be controlled by (1) measuring the suspended solids level in the wastewater feed and in discharge water from the sludge, (2) determining the average production rate of inert solids within the sludge, and (3) controlling the actual sludge wastage rate to between the Maximum and Minimum Sludge Rate as determined by equations (A) and (D) above. The replenishment rate of various types of microorganisms can be measured (directly or indirectly) from the quantity of nitrifying microorganisms and the knowledge gained after establishing their growth rate per unit weight of wastewater fed. Monitoring of suspended solids levels in the wastewater feed and discharge water from the sludge and measurement of the inert solids production rate per unit of sludge provides the necessary data to determine the inert solids flow in the sludge system.

For example with a wastewater feed flow of 200 gpm, an ammonia concentration of 2500 mg/l and an effluent suspended solids concentration of 50 mg/l, (an input of 6048 lb/N/day and 121 lb inert solids/day), the sludge population required for the conversion of ammonia to nitrogen is (a) 2520 lb VSS (volatile suspended solids) of Nitrosomonas (if Nitrosomonas specific oxidation rate is 2.4 lb N/lb VSS/day), (b) 864 lb VSS of Nitrobacter (if Nitrobacter specific oxidation rate is 7.0 lb N/lb VSS/day and (c) 100,800 lbs VSS of heterotrophic facultative/denitrifying microorganisms (if specific denitrification rate is 0.06 lb N/lb VSS/day) for a total mass population of 104,184 lb VSS. The growth rate of Nitrosomonas is 0.10 to 0.20 lb VSS per lb of existing Nitrosomonas VSS per day. Thus, the replenishment rate of Nitrosomonas for a population of 2520 lb VSS is about 378 lbs of Nitrosomonas VSS per day, and the corresponding Maximum Sludge Wastage Rate based upon Nitrosomas replenishment rate would be 15,628 lb VSS per day (as calculated and using Equation (A) above), and the Minimum Sludge Wastage Rate would be 173 lb per day (at a steady state inert solids loading of 0.7) calculated using the above Equations (B) to (D). This calculation set forth herein, of course, is for exemplification and is not to be construed as limiting this invention in any way.

As described above, the actual sludge wastage rate is an important parameter to be controlled. More specifically, above a critical sludge wastage rate, the rate of loss of one or more types of microorganisms, e.g., the slow growing nitrifying organisms, will exceed both their growth rate during sludge development and their replenishment rate in fully developed sludge. For successful sludge development and stable maintenance of sludge, this critical sludge wastage rate must not be exceeded. Critical sludge wastage rates will vary with the specific nature of the wastewater to be treated by the process of this invention since sludge pH, temperature and dissolved oxygen level all will influence the sludge growth rates. Sludge development is achieved most quickly and sludge maintenance is accomplished most smoothly by operating as closely as possible to the preferred zero actual sludge wastage rate described above.

The most preferred system operation is to utilize a substantially zero actual sludge wastage rate. The term "zero actual sludge wastage rate" as used herein defines a rate at which sludge is wasted from the system, i.e., lost or affirmatively discarded, as a result of system operation and wastewater pass through, such that a steady state of microorganisms capable of converting ammonia to nitrite and/or nitrate is achieved and a steady level of inert solids exists. However, the process of this invention can be operated successfully, advantageously and economically by operating within the Minimum and Maximum Sludge Wastage Rates as set forth above. Preferably operation is within about 20% above the minimum rate to about 20% below the maximum rate, more preferably within about 40% above the minimum rate to about 40% below the maximum rate and most preferably at an actual sludge wastage rate of substantially zero.

Thus, in the manner described above, the sludge wastage rate for operation of the process of this invention can be controlled to achieve a steady state of microorganisms capable of converting ammonia to nitrite and/or nitrate with this steady level being not only achieved but also maintained.

(2) Hydraulic Residence Time

Given a natural economic incentive to operate the process of the present invention at low hydraulic residence times (HRT), the HRT must be controlled to be (i) long enough to preserve full specified performance of the sludge given the sludge quantities and reaction rates established during microorganism population acclimation, and (ii) long enough to yield a sludge concentration with acceptable sludge/wastewater separation characteristics in relation to control of sludge wastage rates. Decreases from the HRT of initial sludge acclimation must be managed with additional sludge acclimation over that initially achieved, with this sludge acclimation being subject to all of the parameters outlined hereinbefore for sludge microorganism population acclimation.

HRT describes the contact time allowed for reaction of feed wastewater with the sludge. Given a specific wastewater feed load, dissolved oxygen level, pH and temperature, HRT is interrelated to the steady state quantity and concentration of a sludge required to accomplish the specified treatment. This relationship is illustrated schematically in FIG. 3. Although the relationship is similar for different combinations of treatment conditions, a discrete relationship exists for each specific combination of feasible values of wastewater feed load, system dissolved oxygen level, and system pH and temperature. As HRT is reduced, FIG. 3 shows for one specific example that the steady state sludge concentration must increase to complete the desired reactions in the alotted time. Increasing sludge concentration involves growing all microorganisms in the sludge, in particular slow growing nitrifying microorganisms. Growth of microorganism populations constitutes sludge acclimation and must be conducted considering the procedures described hereinbefore for sludge microorganism population acclimation. With proper attention to incremental sludge acclimation requirements, HRT can be reduced and sludge concentration correspondingly increased until the point is reached where effective sludge/wastewater separation cannot be achieved to comply with the maximum allowable sludge wastage requirement described hereinbefore. This maximum sludge concentration and associated minimum HRT is a function of the settleability characteristics (natural or induced e.g., using coagulating or flocculating agents such as polyelectrolytes and other agents which might be used for sludge conditioning (e.g., $Ca^{++}$) to include settling of the sludge) and can be expected to vary with the specific application of the process of this invention.

In general, it has been found experimentally that hydraulic residence times of about 5 days to about 35 days, preferably 5 to 20 days, preferably 5 to 10 days and most preferably 5 days or less can be suitably used in the process of this invention. To the extent that denitrification remains rate limiting in sludge performance, denitrification to an extent less than complete provides the ability to use lower hydraulic residence times.

(3) Dissolved Oxygen Level

A further parameter which needs to be controlled when operating this embodiment of the process of this invention is the dissolved oxygen level. Dissolved oxygen levels must be controlled to be sufficiently high that microbial conversion of ammonia to nitrite and nitrite and/or nitrate in accordance with reaction schematic (I) and (II) above occurs but lower than the dissolved oxygen level at which microbial conversion of nitrite and/or nitrate to free nitrogen in accordance with reaction schematic (III) above ceases to occur.

An important aspect of this embodiment of the process of this invention is the ability concomitantly to provide essentially complete aerobic nitrification and controllable amounts of anoxic denitrification from zero to essentially 100 percent using a single sludge under ostensibly aerobic conditions.

Facultative heterotrophic microorganisms are known to form what appears to be microbial cell "agglomerates". In conventional activated sludge practice, efforts are made to ensure that sufficient dissolved oxygen levels are present in the sludge to ensure that the whole of these agglomerates acts aerobically by oxygen permeation thereinto. However, as have others, the inventor of the invention described and claimed herein postulated in 1977 as described hereinbefore that at low enough dissolved oxygen levels and high enough bulk sludge concentrations, these agglomerates may exhibit anaerobic, or anoxic, behavior. It has now been found experimentally that agglomerates of some form do exist in the sludge and that agglomerates begin to form at very low bulk sludge concentrations, for example, at least as low as about 1800 mg/l. These agglomerates may grow somewhat in size and number as the bulk sludge concentration in the system increases.

Experimentally, it has further been demonstrated that these agglomerates exhibit variable degrees of anoxic behavior in the form of bulk denitrification reaction rate (e.g., in pounds of nitrite/nitrate consumption per day per pound of denitrifying microorganisms) as a function of bulk sludge concentration and sludge dissolved oxygen levels. However, in contrast to the speculation in 1977 by the inventor of the invention described and claimed herein, denitrification has been shown to occur at low sludge concentrations, at least as low as 1800 mg/l. Further, although there may be some effect of sludge concentration on sludge denitrification kinetics, experimental evidence suggests that this effect is minor. In further contrast to the inventor's 1977 observations and speculations, it has now been demonstrated experimentally that depending upon the specific sludge involved, dissolved oxygen levels substantially different from 1 mg/l may be used to achieve anoxic regions and denitrification in the sludge. Some sludges have achieved substantially complete denitrification at 1 mg/l with indications that they could sustain denitrification at higher dissolved oxygen levels, e.g., as high as 1.5 to 2.0 mg/l. Other sludges have achieved relatively low denitrification (e.g., less than 20%) even at dissolved oxygen levels as low as 0.2 to 0.3 mg/l.

Thus, in contrast to conventional approaches using sufficiently high dissolved oxygen levels that agglomerate permeation by oxygen is achieved, in the process of this invention, the dissolved oxygen level is controlled to ensure anoxic regions in the agglomerates. For those sludges which develop substantial anoxic regions and therefore substantial denitrification capacity per weight of sludge, at dissolved oxygen levels which are high enough to support effective performance of nitrifying microorganisms, continuous supply of oxygen at a controlled low level is preferred in the operation of the invention. Example 1 below illustrates this mode of operation. Where sludges achieve relatively small anoxic regions and therefore relatively low denitrification capacity per weight of sludge even at dissolved oxygen levels below which effective performance of nitrifying microorganisms is achievable, intermittent supply of oxygen at controlled levels can be used to achieve desired levels of denitrification without interference of nitrification reactions. Example 5 illustrates this mode of operation. In this mode of operation of the invention, dissolved oxygen levels are first set at the level at which the anoxic region and corresponding "aerobic" denitrification capacity of the sludge is maximized subject to the constraint that effective nitrifying microorganism activity is maintained. This will typically occur at dissolved oxygen levels of between 0.3 and 0.75 mg/l. Using the same sludge and in the same reactor, the anoxic region and corresponding denitrification capacity of the sludge is then expanded by intermittently dropping the dissolved oxygen level to zero by interrupting oxygen flow to the sludge. The number and duration of the interruptions of oxygen flow can be varied according to the level of denitrification desired subject to the constraint that substantially complete nitrification is achieved and pH control is maintained. One example of an intermittent aeration cycle involves alternating periods of oxygen on and oxygen off.

The above can be considered as producing a denitrification reaction rate per weight of sludge, which depends upon the sludge involved, the dissolved oxygen concentration imposed, and the frequency and duration of cycling of the sludge oxygen supply. Below a critical dissolved oxygen concentration, inhibition of facultative microorganism aerobic reactions within the sludge begins to develop. Correspondingly, denitrification begins to occur, with bulk denitrification rates per unit weight of sludge increasing thereafter with decreasing dissolved oxygen level as the percentage of facultative microorganisms in the sludge available for denitrification increases. In the limit which occurs during interruptions of sludge air supply, denitrification rates increase to the rate of denitrification consistent with utilization of all the facultative microorganism population in the sludge for denitrification reactions. At dissolved oxygen levels of zero, denitrification rates of 0.17 to about 0.9 mg of nitrogen per day per mg of sludge have been reported (see R. P. Michael, "Optimization of Biological Denitrification Reactors in Treating High Strength Nitrate Wastewaters" Master of Science Thesis, Department of Civil Engineering, University of Vermont, Burlington, Vt., May 1973 and R. J. Cummings, "Comparison of the Capabilities of Denitification in Anaerobic Activated Sludge and Packed Column Reactors" Master of Science Thesis, Department of Civil Engineering, University of Vermont, Burlington, Vt., 1973). At dissolved oxygen levels of about 0.3 to 0.75 mg/l needed for effective performance of nitrifying microorganisms, bulk sludge denitrification reaction rates experimentally measured are less than 0.17 to 0.9 mg/day/mg reported in Cummings, supra, and Michaels, supra. Where sludges achieve substantially complete denitrification without resort to cycling of the sludge aeration supply, denitrification rates of 0.02 to 0.06 mg of nitrogen per day per mg of sludge have been measured. For sludges that require cycling to achieve desired levels of denitrification, "aerobic" denitrification rates are less than those above. In the cycling mode of operation, combined "aerobic" and anaerobic denitrification rates can be equal to or greater than 0.02 to 0.06. Suitable cycling periods can include cycling every hour, every two hours, every four hours, etc. These cycling periods are not to be construed as limiting, however.

Thus, the present invention provides a "window" of dissolved oxygen concentration within which substantive amounts of concomitant nitrification and "aerobic" denitrification can occur in the same sludge, i.e., anoxic and aerobic reactions concomitantly occurring. Where levels of "aerobic" denitrification and/or the "aerobic" denitrification reaction rates achieved when operating effectively at strictly continuous dissolved oxygen levels are below those desired, they can be supplemented with anaerobic denitrification through on/off cycling of the oxygen supply to the sludge. This has the effect of producing a weighted average dissolved oxygen level in the sludge mixture which is low enough to accomplish additional denitrification and yet still intermittently high enough to maintain effective performance of nitrifying microorganisms. The lower limit of the "window" is the minimum oxygen level at which aerobic nitrification occurs, i.e., about 0.1 to 0.3 mg/l, while the upper limit of this "window" basically is the maximum oxygen level at which "aerobic" denitrification occurs, i.e., experimentally determined in some sludges to be at or below about 1 mg/l and more probably up to about 1.5 to 2 mg/l. Thus, the process of this invention can be operated at a dissolved oxygen level of about 0.1 mg/l to about 2 mg/l, preferably about 0.1 mg/l to about 1.5 mg/l and most preferably about 0.1 mg/l to about 1 mg/l in all cases achieved either as a dissolved oxygen level achieved on a continuous basis or as the weighted average dissolved oxygen level which results from on/off cycling of the oxygen to the sludge.

It will be clear to one skilled in the art that the dissolved oxygen concentration for the sludge and its schedule of supply will thus vary with the specific system and wastewater to be treated, to the point where the autotrophic microbial reaction rate for nitrification is severely reduced. Lower dissolved oxygen levels favor increased denitrification kinetics and correspondingly reduce the sludge requirements for denitrification.

In order to explain further the ability in this embodiment of the process of this invention controllably to achieve nitrification/denitrification or, said in another way, to achieve aerobic and anaerobic reactions concomitantly within the same bulk sludge, this aspect of the invention is described by example by way of FIG. 4.

FIG. 4 shows schematically a cross sectional view of an idealized sludge agglomerate, where in FIG. 4, A represents the sludge agglomerate, B represents an aerobic region therein, i.e., a region where the dissolved oxygen concentration is sufficiently high that aerobic reactions such as nitrification can occur, and C represents an anoxic region within the agglomerate where anoxic reactions, i.e., denitrification (or conversion of nitrite and/or nitrate to free nitrogen), occur. The vertical arrow and the horizontal arrow superimposed on the agglomerate correspond to the dissolved oxygen concentration and distance from the agglomerate center, respectively. From the plot of dissolved oxygen concentration as a function of distance into the agglomerate, it can be seen that the dissolved oxygen concentration within the agglomerate decreases as the distance from the agglomerate surface increases, falling from the dissolved oxygen concentration in the bulk liquid at the agglomerate surface to a dissolved oxygen concentration of zero at some point within the agglomerate. The point at which the dissolved oxygen level falls to zero defines the beginning of the anoxic region of the agglomerate.

Thus, in order to achieve concomitant nitrification/denitrification in accordance with this embodiment of the process of this invention, the dissolved oxygen concentration is controlled at a level to permit both nitrification and denitrification reactions to occur. The bulk dissolved oxygen level and the frequency and duration of any on/off cycling of the oxygen supply can be easily accomplished and measured using conventional techniques and the necessary oxygen to achieve an appropriate dissolved oxygen level can be added to the system simply by pumping air, oxygen enriched air, or oxygen into the system by any of a number of conventional means now employed in activated sludge processes for introduction of oxygen in a dissolved form into the system. The dissolved oxygen level and any schedule of on/off cycling of the oxygen supply can be continuously monitored and appropriately controlled within the levels described above in order to ensure desired nitrification/denitrification reactions do occur.

To explain this dissolved oxygen effect even further, attention is directed to FIGS. 5 and 6. FIG. 5 schematically illustrates the relationship between hydraulic residence time and sludge concentration for concomitant and complete nitrification and denitrification of any specified wastewater load, viz., pounds per day of nitrogen load to be treated. It shows the "window" which exists at a lower limit of bulk dissolved oxygen of about 0.1 mg/l to achieve nitrification and an upper limit to concomitantly achieve denitrification. Further, FIG. 6 schematically outlines the relationship between hydraulic residence time and sludge concentration for complete nitrification with various levels of denitrification, i.e., conversion of nitrite and/or nitrate into free nitrogen, from zero to essentially complete or 100% denitrification. The process of the present invention is applicable to all levels of denitrification in combination with substantially complete nitrification.

(4) Degree of Sludge Mixing

An additional variable which must be controlled in order to achieve the objects of this embodiment of the process of this invention is the degree of sludge mixing. The degree of sludge mixing is controlled so that (i) the degree of mixing is large enough to achieve a substantially complete contacting of sludge with fresh wastewater thereby ensuring the utilization of all sludge while avoiding stimulation of undesired incremental sludge growth to such an extent that the maximum allowable sludge wastage rate is exceeded, (ii) the degree of mixing is large enough to reduce gradients in levels of dissolved oxygen in the sludge mixture to levels consistent with desired levels of sludge denitrification, and (iii) the degree of mixing is not high enough that disruption of sludge agglomerates occurs resulting in loss of denitrification capacity due to break up of sludge agglomerates, and/or microbial cell rupture occurs resulting in deterioration of all reaction kinetics and/or significant deterioration of sludge/water settleability characteristics occur.

Basically, since slow growing nitrifying microorganisms are present in fully acclimated sludge used in this embodiment of the present invention in quantities just sufficient for feed nitrogen consumption, the feed wastewater and sludge must be continuously and completely mixed or incomplete nitrification of feed wastewater will occur. Incomplete wastewater/sludge mixing will also result in a stimulation of sludge growth. This creates a situation which forces increased sludge wastage rates, and at some point of incremental sludge production and wastage, results in a net decline in nitrifying microorganism population and the corresponding failure of sludge performance. Various types of conventional agitators or mixing devices can be used to achieve necessary levels of sludge/wastewater mixing. Nitrification performance is a direct measure of the adequacy of mixing of a fully acclimated sludge. The degree of mixing is therefore increased until, by measurement of ammonia levels in feed wastewater to and discharge water from the sludge, nitrification is essentially complete.

Further, since techniques for dissolution of oxygen into the wastewater/sludge mixture all result in a gradient in dissolved oxygen levels between levels which can rise to saturation at the point of air or oxygen addition and targeted dissolved oxygen levels in the surrounding bulk mixture, the proportion of the sludge/wastewater mixture experiencing this gradient to the total amount of sludge/wastewater present is controlled by the degree of mixing of sludge and wastewater.

Techniques for oxygen addition include use of surface aerators which create dissolved oxygen gradients from the surface downward into the mixture and submerged diffusers which create dissolved oxygen gradients in the region surrounding each diffuser. Techniques for mixing include mechanical agitators and devices which use the buoyancy effects of the injected air or oxygen. In general, the degree of mixing required to control dissolved oxygen gradients decreases as the number of point sources of oxygen addition increases and the degree of mixing increases as the proportion of the sludge/wastewater mixture to the total mixture present permitted to experience a gradient decreases.

Both nitrification and denitrification performance serve as individual measures of the adequacy of mixing. Direct monitoring of dissolved oxygen levels throughout the sludge and wastewater mixture provides another source of measurement. Assuming that bulk dissolved oxygen concentrations achieved are both high enough to sustain complete nitrification yet low enough to establish anoxic regions in the sludge (and therefore the capacity for denitrification by the sludge), overall sludge denitrification rates will vary as the proportion of sludge exposed to dissolved oxygen gradients varies. Decreasing the proportion of the sludge exposed to oxygen gradients (through increases in sludge/wastewater mixing) will result in higher overall sludge denitrification rates and therefore improved overall sludge denitrification performance.

Further, since mixing exposes the sludge to shearing forces, the severity of mixing, i.e., total induced shearing forces, must be controlled to avoid both excessive breakup of sludge agglomerates and the irreversible rupturing of microbial cell structures. Denitrification performance of the sludge serves as one measure of the onset of excessive shear mixing forces.

As discussed hereinbefore with respect to the dissolved oxygen level, in order to achieve concomitant nitrification and denitrification, the bulk dissolved oxygen concentration is appropriately controlled to the extent that, within sludge agglomerates which are formed in the system and are present in the system, aerobic and anoxic regions in the agglomerates exist. As a result, extensive break up of sludge agglomerates can result in a destruction of anoxic regions in the sludge agglomerates. It has been found during the operation of this embodiment of the process of this invention, that as a result of mixing and shear forces arising, sludge agglomerates do break up but these breakups are not irreversible, i.e., it has been found that even with sludge mixing rates sufficiently high that on a microscopic scale, break up of the sludge agglomerate occurs, these particles of the agglomerates substantially immediately reform into agglomerates with basically no substantial effect on the anoxic behavior arising from the sludge agglomerate. As long as the degree of mixing does not cause excessively frequent break up of the agglomerates and a break up of the sludge agglomerates to the extent that reformation of the agglomerates is markedly delayed or is not possible, in a relatively short period of time, then this is an acceptable sludge mixing rate from this standpoint.

To the extent that irreversible breakdown of the structure of sludge agglomerates occurs, it will result in loss of activity of the sludge and therefore loss of the denitrification capacity of the sludge. Mixing shearing forces can be increased until measurement indicates the onset of a distinct decline in sludge denitrification performance, all other conditions being equal. Nitrification performance of the sludge also serves as one measure of the onset of destructive shearing forces, since nitrifying as well as denitrifying microorganisms can be expected to be ruptured. Mixing shearing forces can be increased until measurement indicates the onset of a distinct decline in sludge nitrification performance, all other things being equal.

A suitable sludge mixing rate can generally range from a mixing rate which achieves compliance with the maximum sludge wastage rate to one allowing about 80% of the maximum sludge wastage rate to the maximum sludge wastage rate, about 60% to less than 80% of the maximum sludge wastage rate, and 40% to less than 60% of the maximum sludge wastage rate to even one of substantially zero sludge wastage rate in the process of this invention.

(5) Biological Oxygen Demand

Also, in this embodiment of the process of this invention, the biological oxygen demand (BOD), which is biodegradable, is controlled during treatment. Basically, the biological oxygen demand during treatment is controlled such that at least the stoichiometric amount of biological oxygen demand required to achieve a specified level of denitrification conversion of nitrite and/or nitrate to nitrogen during treatment at a particular ammonia concentration of wastewater fed for treatment is present. BOD can be supplied as either or both aqueous BOD and the BOD represented by the microorganisms and available for reaction through endogenous respiration.

As can be seen from an examination of reaction schematic (III) above, organics (expressed in the form of biological oxygen demand) are required for denitrification of the nitrified feed wastewater, more specifically, for the conversion of nitrite and/or nitrate to free nitrogen. In this conversion, microbial action on the biological oxygen demand occurs, where nitrite and/or nitrate serve as the terminal electron acceptor in the metabolic reactions involving the BOD with the resulting formation of free nitrogen. Reduced biological oxygen demand requirements for denitrification are favored by high sludge concentration and low dissolved oxygen levels because the lower dissolved oxygen levels will establish greater anoxic regions for BOD metabolism.

The appropriate biological oxygen demand for conversion of nitrite and/or nitrate to free nitrogen microbially can arise in the system basically in two ways. The wastewater feed may have sufficiently high levels of biological oxygen demand in the form of dissolved organics and system microorganisms that, at the desired system reaction rate, at least a stoichiometric quantity of the biological oxygen demand in relation to the nitrite and/or nitrate to be converted is present. Alternatively, supplemental biological oxygen demand can be provided by affirmatively adding appropriate quantities of essentially any watersoluble organic material at concentrations up to the limit of their water solubility. For example, aliphatic alcohols such as methanol, aromatic alcohols such as phenols and cresols, aromatics such as benzene, toluene, and xylenes, carbohydrates such as molasses, and the like can be used. These specific examples of organic materials are given solely for exemplification and are in no way to be construed as limiting. Denitrification reaction rates can be expected to vary as a function of the type of organic comprising the biological oxygen demand.

Basically, in the conversion of nitrite and/or nitrate to free nitrogen, the biological oxygen demand is believed to be provided by a combination of endogenous respiration of microorganisms in the anoxic region of sludge agglomerates and by permeation of organic material into the anoxic region of sludge agglomerates where, due to the lack of oxygen present, the oxidation of the organic material in a microbial manner occurs as a result of the utilization of the nitrite and/or nitrate ion as a terminal electron acceptor. This thereby results in a microbial consumption of a combination of microbial and aqueous BOD with conversion of the nitrite and/or nitrate to free nitrogen. Bulk sludge BOD reaction rates with nitrite and/or nitrate will vary as a function of the nature of the organic material comprising the BOD, due to a combination of differing organic material diffusion rates and microbial reactivities with types of organic material and the degree of endogenous respiration taking place since this rate is inherently much slower than aqueous organic rates. Although the process of this invention can be operated basically at the stoichiometric level of biological oxygen demand consistent with the amounts of nitrite and nitrate present for total conversion of nitrite and/or nitrate to free nitrogen, preferably it is desirable to have an excess biological oxygen demand to ensure that the desired conversion of nitrite and nitrate to free nitrogen, by the facultative microorganisms is achieved.

Another reason for a preference of excess biological oxygen demand in this system over that stoichiometrically required for conversion of nitrite and/or nitrate to free nitrogen is that other microorganisms may well be, and generally are, present to oxidize the biological oxygen demand to produce carbon dioxide and water as an aerobic reaction. Since to some extent oxidation of the BOD with dissolved oxygen will occur in the aerobic region of the sludge agglomerate, this represents a competing reaction to that which occurs in the anoxic region. Thus, the BOD present must be at least large enough to satisfy simultaneously denitrification requirements and competing demands for BOD consumption through reaction with dissolved oxygen. It is preferred that the BOD be present in net excess of demand in the feed up to but not exceeding the point of inducing incremental sludge quantities which cannot be adequately separated from wastewater and therefore result in sludge wastage rates in excess of the maximum allowable rate.

For complete denitrification, stoichiometric ratios of BOD to nitrogen must be controlled to be at least between about 1.7:1 for nitrite nitrogen and about 2.8:1 for nitrate nitrogen. The specific level is dependent upon the form of the nitrogen involved in the denitrification, nitrite or nitrate, respectively. If any BOD is consumed through oxidation with dissolved oxygen, rather than with nitrite or nitrate present, then correspondingly additional BOD must be added and the above BOD/N ratios may well be larger as a result. Biologically reactive quantities of BOD present in the wastewater above those required for denitrification are converted to $CO_2$ and $H_2O$ through direct oxidation with dissolved oxygen.

As described hereinbefore, BOD is required for the reduction of nitrification products, produced from ammonia in the wastewater, to free nitrogen. The amount of BOD required for denitrification depends upon the form of the nitrogen to be denitrified, viz., nitrite or nitrate. Nitrogen in nitrite is in a lower oxidation state than that in nitrate and therefore less reducing agent in the form of BOD is required for conversion of nitrite to free nitrogen. Approximately 1.7 mg of BOD are required for the reduction of one mg of nitrite nitrogen while about 2.8 mg of BOD are required for the reduction of one mg of nitrate nitrogen. Thus, in practice, the required BOD/N ratios for complete denitrification can be expected to vary between 1.7:1 and 2.8:1 depending upon the ratio of nitrite nitrogen to nitrate nitrogen present in the system. Fractional amounts of denitrification, i.e., where less than complete denitrification results, require correspondingly lower ratios than 1.7:1 to 2.8:1 BOD/N. To the extent that direct oxidation of BOD with dissolved oxygen occurs in the system, it can be seen that total BOD/N requirements are increased.

As set forth above, the preferred source of BOD for denitrification is dissolved organic material present directly in the ammonia-containing wastewater to be treated. If this source is insufficient for the desired level of denitrification, additional BOD can be affirmatively added in the form of any organic material having sufficient solubility in water to insure its availability to the microorganisms in the anoxic regions of the sludge.

In the actual practice of this invention, BOD/N requirements are established basically experimentally. Sludge is acclimated and initially operated on feed wastewater having a BOD/N ratio at least high enough to achieve desired levels of denitrification assuming that all the nitrogen to be denitrified is present in the form of nitrite rather than nitrate and that at least about the first 1.7:1 units of BOD per unit of nitrogen react with nitrite rather than dissolved oxygen. Thus, if 50 percent denitrification is desired, a BOD/N ratio of at least about 0.85:1 is required in the initial feed wastewater. If less than this amount is present naturally in the wastewater feed, additional BOD must be added to bring the ratio to a value of about 0.85:1 to achieve 50 percent denitrification. In actual operation, this BOD/N requirement (e.g., 0.85:1 for 50 percent denitrification) may prove insufficient for two reasons. First, a portion of the nitrite may be converted by Nitrobacter microorganisms before denitrification occurs, thus increasing the BOD demand per unit of nitrogen conversion from 1.7:1 to 2.8:1. Secondly, a portion of the feed BOD may be microbially oxidized in the presence of dissolved oxygen in the wastewater rather than due to nitrite and nitrate, thereby increasing total wastewater feed BOD/N requirements for any desired level of denitrification. The extent to which these two factors will vary is dependent on the actual operation of the process of this invention, but can be easily and routinely determined using the above principles.

Thus for complete denitrification, the stoichiometric amount of BOD to N will be at least about 1.7:1 to 2.8:1 and more preferably above about 2.8:1 to ensure sufficient BOD for denitrification of both nitrate as well as nitrite species present. Appropriate ratios will be proportionally less where less than complete denitrification is desired, i.e., about 75% thereof for 75% denitrification, about 50% thereof for 50% denitrification, and about 25% thereof for 25% denitrification. Where no denitrification is desired the BOD needed is not interrelated to nitrite/nitrate nitrogen.

(6) pH

An even further parameter of the process of this invention which is controlled is the pH. Specifically, pH and its range of variation in operation is controlled to provide preferred reaction kinetics within the constraints that (i) the pH lies within a range hospitable to growth and reaction of all the microorganisms involved, (ii) the pH does not induce free ammonia levels in the system which are inhibitory to microorganism activity, (iii) the pH does not result in nitrous acid levels in the system inhibitory to microorganism activity and (iv) sludge microorganism activity is preserved at a sufficiently high level that significant amounts of contaminant species do not build up and leave the sludge unreacted, particularly at levels which are high enough to induce inhibitions to microorganism activity.

As to free ammonia ($NH_3$) level, beyond certain concentration limits, it has been found experimentally that free ammonia in solution, as opposed to $NH_4^+$ in solution, significantly affects autotrophic microorganism reaction rates (see Anthonisen et al "Inhibition of Nitrification by Ammonia or Nitrous Acid" *Vour. Water Pollution Control Federation*, 48, 835–852, (1976)). The free ammonia concentration levels in sludge are thermodynamically determined by a combination of total ammonia concentration ($NH_3$ and $NH_4^+$) in the sludge, sludge pH and sludge temperature. Inhibition of microorganism activity by nitrous acid is also seen experimentally.

FIG. 7 shows schematically Nitrosomonas microorganism inhibition by free ammonia and Nitrobacter microorganism inhibition by free ammonia and nitrous acid as a function of pH at a specified temperature. In FIG. 7, the abscissa shows increasing pH while the left-hand ordinate shows the logarithm of nitrite-nitrogen concentration ($NO_2^-$ concentration) while the right-hand ordinate shows the logarithm of total ammonia ($NH_3$ plus $NH_4^+$) nitrogen. Zone 1 shows the area in which free ammonia inhibits Nitrobacter and Nitrosomonas microorganisms. Zone 2 shows free ammonia inhibition to Nitrobacter. Zone 4 shows free nitrous acid inhibition to Nitrobacter while Zone 3 is an area in which complete nitrification can occur. Conventionally, it has been thought that microbial inhibition is prevented by maintaining sludge conditions within Zone 3 as shown in FIG. 7. Further, as to facultative microorganisms capable of converting nitrite and/or nitrate to free nitrogen present, it has been experimentally found that the level of free nitrous acid also needs to be controlled since levels greater than about 0.13 to 0.2 mg/l of nitrous acid inhibit the activity of facultative microorganisms. As a result control of the level of nitrous acid by use of pH and temperature, as described below, will avoid inhibition of this type as well as inhibition of Nitrobacter and Nitrosomonas.

Specific sludge maintenance actions to avoid levels of free ammonia and nitrous acid which result in inhibition, for example, pH adjustment through controlled additions of alkali, will vary, based upon the nature of the wastewater to be treated and the applications to which the process of this invention is directed.

Control of free ammonia and nitrous acid to levels below which nitrifying microorganism growth and/or treatment of waste is inhibited can be achieved by any conventional means wherein free dissolved ammonia and nitrous acid in an aqueous system can be controlled. For example, ammonia concentration can be appropriately controlled by adding water for dilution, the pH can be appropriately controlled by the addition of an amount of acid necessary to reduce the free ammonia concentration below the inhibitory level, or the temperature can be changed. By using either of these approaches for controlling the free ammonia level, the equilibrium between the free ammonia in the system and the ammonia as ammonium ion can thereby directed. The free ammonia concentration should, for a particular pH and temperature be controlled to be no greater than that as shown within the limits of Zone 3 in FIG. 7. From the limits of Zone 3 of FIG. 7 and based on the fraction of free ammonia present in solution as shown in Table 3 below, the concentration of free ammonia can be calculated at the system pH and temperature with knowledge of the total amount of ammonia present. Similarly, adjustments can be made to control the nitrous acid level. The nitrous acid level should, for a particular pH and temperature, also be controlled to be no greater than that as shown within the limits of Zone 3 in FIG. 7. From the limits of Zone 3 of FIG. 7 and based on the fraction of nitrous acid shown in Table 3 below, the concentration of nitrous acid can be calculated at the system pH and temperature with knowledge of the amount of nitrite present. To avoid inhibition the limits of Zone 3 of FIG. 7 for free ammonia and nitrous acid must be met.

TABLE 3

| Temperature (°C.) | pH 6.0 | 6.5 | 7.0 | 7.5 | 8.0 |
|---|---|---|---|---|---|
| FRACTION OF FREE AMMONIA IN SOLUTION | | | | | |
| 10 | 0.0002 | 0.0007 | 0.002 | 0.007 | 0.022 |
| 15 | 0.0003 | 0.0010 | 0.003 | 0.010 | 0.032 |
| 20 | 0.0005 | 0.0015 | 0.0048 | 0.015 | 0.048 |
| 25 | 0.0007 | 0.0022 | 0.0068 | 0.021 | 0.068 |
| 30 | 0.0010 | 0.0031 | 0.0097 | 0.030 | 0.091 |
| 35 | 0.0014 | 0.0043 | 0.0136 | 0.042 | 0.124 |
| FRACTION OF NITROUS ACID IN SOLUTION | | | | | |
| 10 | 0.011 | 0.0035 | 0.0011 | 0.00035 | 0.00011 |
| 15 | 0.010 | 0.0031 | 0.0010 | 0.00031 | 0.00010 |
| 20 | 0.008 | 0.0027 | 0.0008 | 0.00027 | 0.00008 |
| 25 | 0.007 | 0.0023 | 0.0007 | 0.00023 | 0.00007 |
| 30 | 0.0065 | 0.0021 | 0.00065 | 0.00021 | 0.000065 |
| 35 | 0.0057 | 0.0018 | 0.0006 | 0.00018 | 0.00006 |

Since the nitrification reaction results in the production of two units of acid per unit of ammonia converted, and the denitrification reaction results in the production of only one unit of alkali per unit of nitrite and/or nitrate nitrogen converted, regular and direct control of pH through alkali addition to achieve the above objects is necessary in general. The quantity of alkali addition required is a function of the degree of denitrification to be achieved and the natural alkalinity of the feed wastewater. Where the natural alkalinity in the feed wastewater exceeds the alkalinity demand created by nitrification and denitrification, acid addition may be required to control the pH. Actual alkalinity (or acid) requirements are determined by measuring the alkalinity ("alkalinity credits") in the feed wastewater, measuring the amount of biologically available nitrogen in the feed wastewater and establishing the net quantity of acid ("acid debits") produced from this nitrogen given a specified level of nitrification and denitrification, and then taking the difference between feed alkalinity credits and reaction acid production debits. Residual acid (or alkali) must be balanced through alkali (or acid) addition. The nature and form of alkali or acid addition is not critical to the process of this invention and any alkaline or acidic material, such as acids, bases, acidic salts or basic salts can be employed. Two acceptable forms of alkali addition are caustic (sodium hydroxide) and sodium carbonate. Other materials conventionally employed for pH adjustment in activated sludge processing can also be used.

Up to the point of formation of inhibitory levels of free ammonia or nitrous acid in the system as defined by FIG. 7 or loss of sludge performance, a pH range of about 6 to about 8 is preferred with a more preferred range of 6.5 to 7.5 and a most preferred range of about 6.8 to 7.3.

Since control of pH in activated sludge processing is a conventional technique, one skilled in the art will easily know how the pH of the system can be monitored and know the necessary amount of alkali (or acid) to add to the system to control or adjust the pH within the above-described ranges providing avoidance of free ammonia and nitrous acid and a hospitable range for the microorganism population activity.

(7) Temperature

An even further parameter of the process of this invention which is controlled is the temperature. Specifically, temperature and its range of allowable variation is controlled to provide preferred reaction kinetics within the constraints that the temperature is within a range hospitable to the growth and reaction of all microorganisms, particularly nitrifying microorganisms, present, and the temperature does not induce free ammonia levels or nitrous acid levels in the system which are inhibitory to microorganism activity such that it is preserved within a hospitable range that significant amounts of contaminant species do not build up and leave the sludge unreacted, particularly at levels which are high enough to induce inhibitions to microorganism activity.

Nitrobacter microorganisms are deleteriously affected by temperature in excess of about 27° C. and this temperature therefore constitutes the upper bound of acceptable processing temperatures if an active Nitrobacter microorganism population is desired. Temperatures at which inhibitory levels of free ammonia or nitrous acid can occur will vary with the specific application of the process of this invention and is determined thermodynamically in conjunction with specifics on total nitrogen in the system and system pH, as can be seen from Table 3 above.

Within the noninhibitory range of temperatures for any specific application, reaction rate decreases with decreasing temperature. The preferred temperature range for reaction is about 5° to 35° C. with a more preferred range of about 10° to 35° C. and a most preferred range of about 15° to 25° C.

By controlling the individual parameters set forth above, the process of this invention provides an integrated one-stage, one-step, single reactor process for treatment of wastewaters containing ammonia as a contaminant, as well as other contaminants if present, the latter simply being by inclusion of appropriate microorganism species through appropriate acclimation to achieve action on other contaminants such as sulfide, thiocyanate, etc. The process of this invention is quite economically advantageous for the reasons set forth above. The integration into a single one-stage, one reactor process whereby wastewater with ammonia as a contaminant, even in an extremely high levels not hereinbefore thought possible to treat, can now be treated with the concomitant nitrification/denitrification using a single sludge as described herein. While it must be recognized that concomitant and complete nitrification/denitrification is one preferred approach for the process of this invention, by appropriately controlling the parameters described hereinbefore, other preferred approaches involving various controlled degrees of denitrification in relation to nitrification can also be achieved. For example, if it is either only necessary or desirable to achieve nitrification with less than complete denitrification or perhaps even no denitrification, the parameters described above can be modified and specified appropriately such that any desired level of denitrification, even to no denitrification, is achieved. More specifically, where no denitrification is desired, the upper limit on the dissolved oxygen concentration to achieve anoxic regions in the agglomerates present in the sludge is not a limitation. It is only necessary for the minimum dissolved oxygen level of about 0.1 mg/l as described hereinbefore be present. Further, the necessity for at least a stoichiometric amount of biological oxygen demand in relation to the amount of nitrogen present in feed wastewater is not a concern if less than 100% or even no denitrification is desired. For example, use of only 50% of the ratio of 1.7:1 to 2.8:1 BOD to N can be expected to give rise to less than complete denitrification, e.g., on the order of only 50% denitrification, the actual percentage denitrification depending on the relative ratio of nitrite nitrogen to nitrate nitrogen present. Also, the necessity to minimize or eliminate gradients in dissolved oxygen levels is not a limitation. In this situation, it is only necessary that an assimilable source of carbon, organic or inorganic, be present. This source of carbon can be provided by dissolved organic materials or inorganic carbon containing salts such as carbonates and can even be provided by carbon dioxide in air blown through the sludge.

Thus, the process of this invention provides the ability to acclimate a microorganism population to treat specifically wastewaters containing ammonia as a contaminant and at high levels of concentration in an advantageous manner.

The process of this invention is illustrated in even greater detail by reference to the following examples which are provided as being merely exemplary and are not to be construed as limiting the scope of this invention. Unless otherwise indicated herein, all percentages, parts and ratios are by weight.

EXAMPLE 1

This example illustrates a fully integrated embodiment of the process of the present invention and describes the acclimation and operation of a sludge developed to treat full strength, without any dilution or pretreatment, a coke plant flushing liquor of the composition shown in Table 4 below.

TABLE 4

| COKE PLANT FLUSHING LIQUOR COMPOSITION | |
|---|---|
| Component | Concentration (ppm) |
| $NH_3$—N | 2912 |
| COD | 5318 |
| $NO_x$—N | 0 |
| Phenolics | 971 |
| Free HCN | 5.6 |
| Total HCN | 8.2 |
| Sulfide | 6.3 |
| Thiocyanate | 255 |
| Suspended Solids | 0 |
| Alkalinity | 7520 |

Seed sludge, as a starting sludge, from an operating commercial-scale coke plant activated sludge system, operating with lime-based $NH_3$-stripper pretreatment and sludge conditioning as conventionally employed in the art, was placed in a 17-liter biological reactor at an initial mixed liquor volatile suspended solids (MLVSS) sludge concentration of approximately 3700 mg/l and an inerts level of about 20% by weight. The temperature, pH, and dissolved oxygen levels in the biological reactor were set at 20° C., 7 and 1.0, respectively. pH and dissolved oxygen were controlled manually with variations of approximately ±1 unit in each. At the beginning of the acclimation of the sludge, raw coke plant flushing liquor diluted with water to a level of 15 percent liquor was fed to the reactor at a flow rate of 0.0417 liters per hour, a rate corresponding to a hydraulic residence time of 17 days.

Actions taken, sludge development, and sludge performance during the subsequent period of sludge acclimation are outlined graphically in FIGS. 8A to 8F, in increments of 25 day periods. Inlet ammonia concentrations in mg/l, reactor sludge concentrations (MLVSS, mixed liquor volatile suspended solids) in mg/l, and outlet ammonia sludge concentrations in mg/l, are plotted as a function of reactor acclimation time in days.

During the first 25-day interval of sludge acclimation, feed wastewater strengths were increased in two steps to approximately 25 percent of the full strength of the liquor with corresponding ammonia conversions of greater than 90 percent and reactor exit ammonia levels of less than 50 mg/l. During the second 25-day interval of sludge acclimation, feed wastewater strengths were increased in four large steps to approximately 75% of the full strength liquor. As can be seen from the data at the third 25-day interval, the rate of increase of ammonia loads to the reactor during the second 25-day interval clearly exceeded the acclimation rate of the sludge, more specifically the population and growth rate of nitrifying microorganisms, with the resultant significant breakthrough of untreated ammonia in the reactor effluent.

To compensate for this overloading of the reactor with ammonia, the flow to the reactor was temporarily decreased to zero to allow a reduction in reactor ammonia concentration through reaction, an increment of sludge, from the same source as the seed sludge, enriched in nitrifying microorganisms was added to provide a reactor (MLVSS) sludge loading of about 6500 mg/l. Then the flow to the reactor was reestablished at a somewhat reduced feed ammonia level corresponding to approximately 55 percent of full strength liquor. Reactor performance during the fourth 25-day interval of acclimation shows that a balance has been restored between sludge population/activity and wastewater feed ammonia load, residual ammonia levels in the reactor returning to levels of less than 40 mg/l. During the fourth 25-day interval, feed wastewater strength was increased from 55 to 100 percent of the full strength liquor. Reactor performance during the fifth 25-day interval demonstrates that the sludge has been successfully acclimated to operate on full strength flushing liquor in a period of approximately 100 to 150 days of acclimation.

Steady state sludge performance on full strength flushing liquor is summarized in Table 5 below, showing contaminant levels in the wastewater feed, contaminant levels in the effluent and percentage of reduction in contaminant level.

TABLE 5

STEADY STATE PERFORMANCE OF SLUDGE ON FULL STRENGTH COKE PLANT FLUSHING LIQUOR

| Component | Concentration, ppm | | |
|---|---|---|---|
| | Influent | Effluent | % Removal |
| COD | 5318 | 442 | 91.7 |
| $NH_3$ — N | 2912 | <5 | 99.8 |
| $NO_x$ — N | — | ~14 | — |
| Phenolics | 971 | <0.05 | >99.9 |
| $CN^-$ FREE | 5.6 | 0.24 | 95.7 |
| $CN^-$ TOTAL | 8.2 | 3.7 | 54.9 |
| $S^=$ | 6.3 | 0.9 | 85.7 |
| $SCN^-$ | 255 | 1.7 | 99.3 |
| TSS | — | 51 | — |
| pH | 9.6 | 7.0 | — |

TSS = total suspended solids

At this steady state condition, the sludge wastage rate was 50 mg/l, all as carryover with the treated wastewater discharge. The reactor sludge performance and sludge population remained constant for a steady state test run period of several months and this is direct evidence that the sludge wastage rate was less than the maximum allowable wastage rate. Hydraulic residence time was controlled at 17 days, producing a steady state sludge concentration of about 7000 mg/l, a value which gave a sludge with excellent settleability for sludge/wastewater separation. The dissolved oxygen level in the reactor was controlled at about 1 ppm, a level which demonstrably permitted full nitrification while also providing sufficient anoxic regions in the sludge for significant denitrification. Free ammonia and $HNO_2$ levels in the reactor were controlled through a combination of pH, temperature and feed rate control of ammonia in the wastewater to lie clearly within Zone 3 of FIG. 7, the region of negligible microbial inhibition. At 100 rpm mixing with a two-inch blade mixer, the degree of mixing provided was large enough to ensure full utilization of the sludge nitrifying microorganism population as evidenced by high nitrification performance, yet small enough to preserve strong sludge denitrification activity and clearly low enough to avoid the rupturing of microbial cells. The BOD to nitrogen ratio in the flushing liquor was about 1.58:1, somewhat less than the 1.71:1 necessary for complete denitrification. The BOD of the flushing liquor was 4,621 mg/l (feed COD of 5,318 mg/l minus inorganic COD in the influent of 255 mg/l minus the refractory COD level of the effluent of 442 mg/l). The pH was controlled at 7 through the addition of approximately 2390 mg of alkali per liter of full strength flushing liquor fed to the reactor. This amount of alkali reflected the net alkalinity demand created by the combined nitrification and denitrification of the feed wastewater after deductions for the alkalinity level of the feed. The temperature of the reactor was held constant at 20° C., the temperature established during sludge acclimation.

EXAMPLE 2

Example 2 illustrates the applicability of the process of the present invention to industrial wastewater with a moderate ammonia concentration (1000 mg/l), a BOD/N ratio in the wastewater of approximately 2.6:1 BOD=3000 mg/l minus 125 mg/l of thiocyanate and 300 mg/l COD; $NH_3$—N=1,000 mg/l), a thiocyanate level of 125 mg/l, and essentially no suspended solids. The sludge was acclimated to this feed according to the procedures outlined for the present invention and illustrated explicitly in Example 1. At a dissolved oxygen level of about 1 ppm, a pH of 6.5 to 7.3, a temperature of 20° C., a hydraulic residence time of 10 days, and a sludge concentration (expressed as mixed liquor volatile suspended solids) of 2000 to 2500 mg/l, the performance of acclimated sludge on the above wastewater is shown in Table 6 below.

TABLE 6

| WASTEWATER COMPOSITION | | | |
|---|---|---|---|
| | Concentrations, mg/l | | |
| Component | Influent | Effluent | % Removal |
| $NH_3$—N | 1000 | <10 | >99 |
| COD | 3000 | ~300 | 90 |
| $SCN^-$ | 125 | <1 | >99 |
| $NO^-_3$—N | 0 | 450 | ~55%* |
| TSS | 0 | ~40 | — |

*Denitrification

These results show that nitrification was essentially complete. Further, it can be seen that BOD was reduced to refractory levels, i.e., the limits of biological degradation (~300 mg/l), even though the BOD/N ratio was in excess of the 1.7:1 to 2.8:1 level required for complete denitrification. This demonstrates that BOD in excess of that required for denitrification was converted by direct oxidation with dissolved oxygen as the source of microbial oxygen. The denitrification was 55 percent rather than 99 percent complete, an expected result in view of the combination of a low HRT (10 days) and a low sludge concentration (2000 to 2500 mg/l). At these conditions, and with a dissolved oxygen level of 1 ppm, the kinetics of denitrification were such that either more sludge or more residence time would be required to achieve any higher level of denitrification.

EXAMPLE 3

Example 3 illustrates the applicability of the process of the present invention to industrial wastewater with a high ammonia concentration (3000 mg/l), a high sulfide concentration (3000 mg/l), a BOD/N ratio in the wastewater of about 0.85:1 (BOD=3,000 mg/l minus 150 mg/l minus 300 mg/l; $NH_3$—$N$=1,000 mg/l), a thiocyanate concentration of 150 mg/l, and essentially no suspended solids. The sludge was acclimated to this feed according to the procedures outlined for the present invention and illustrated explicitly in Example 1. At a dissolved oxygen level of about 1 to 2 ppm, a pH of 6.8 to 7.5, a temperature of 20° C., a hydraulic residence time of 17 days, and a sludge concentration (expressed as mixed liquor volatile suspended solids) of 7500 mg/l, the performance of acclimated sludge on the above wastewater is shown in Table 7 below.

TABLE 7

| WASTEWATER COMPOSITION | | | |
|---|---|---|---|
| | Concentrations, mg/l | | |
| Component | Influent | Effluent | % Removal |
| $NH_3$—N | 3000 | 15 | 99.5 |
| COD | 3000 | 500 | 83.3 |
| Sulfide | 3000 | ~1 | 99.9 |
| $SCN^-$ | 150 | <1 | 99.3 |
| $NO^-_3$—N | 0 | 1500 to 1800 | 40 to 50 |
| TSS | 0 | 40 | — |

These results show essentially complete nitrification was achieved. Similarly, essentially complete conversion of feed sulfide to sulfate was achieved. The denitrification was 40 to 50 percent rather than 99 percent complete, an expected result in view of the combination of dissolved oxygen, HRT, sludge concentrations, and BOD/N ratio involved. At a BOD/N ratio in the feed of about 0.85:1, the best denitrification that could be achieved under any circumstances was about 0.85:1.7 or about 50 percent. The denitrification can be seen to fluctuate from 40 to 50 percent. This fluctuation is attributable to fluctuations in the level of dissolved oxygen. At an HRT of 17 days, a sludge concentration of 7500 mg/l, and a dissolved oxygen concentration of 1 ppm, denitrification kinetics and the quantity of denitrification microorganisms were more than adequate to react all of the available BOD, resulting in the maximum achievable degree of denitrification, viz., 50 percent. At higher dissolved oxygen concentrations, denitrification kinetics decreased until at some level, the quantity of sludge available and the hydraulic residence time for wastewater reaction with this sludge were not sufficient for the completion of denitrification reactions. In the present example, dissolved oxygen levels fluctuated high enough to reduce denitrification reaction kinetics and in turn denitrification efficiency to as low as 40 percent.

EXAMPLE 4

Example 4 illustrates the application of the process of the present invention to industrial wastewater with a high ammonia concentration (2900 mg/l), a feed BOD/N ratio of about 1.58:1 (BOD=5,320 mg/l minus 490 mg/l minue 225 mg/l; $NH_3$—$N$=2900 mg/l), a thiocyanate level of 255 mg/l, and essentially no suspended solids. The sludge was acclimated to this feed according to the procedures outlined for the present invention and illustrated explicitly in Example 1. At a dissolved oxygen level of about 1 ppm, a pH of 6.5 to 7.5, a temperature of 20° C., a hydraulic residence time of 5 days, and a sludge concentration (expressed as mixed liquor volatile suspended solids) of 10,000 mg/l, the performance of the acclimated sludge on the above wastewater is shown in Table 8 below.

TABLE 8

| WASTEWATER COMPOSITION | | | |
|---|---|---|---|
| | Concentrations, mg/l | | |
| Component | Influent | Effluent | % Removal |
| $NH_3$—N | 2900 | 10 | 99.7 |
| COD | 5320 | 490 | 90.8 |
| $SCN^-$ | 255 | <1.0 | 99.6 |
| $NO^-_3$—N | 0 | ~17 | — |
| TSS | 0 | 92 | — |

It can be seen from the above that nitrification and denitrification were both essentially complete at a BOD/N ratio of about 1.58:1, indicating that in this case, nitrite rather than nitrate was the major form of bound nitrogen entering into the denitrification reaction.

EXAMPLE 5

Example 5 illustrates the application of the process of the present invention to the treatment of industrial wastewater where on/off cycling of the aeration supply is performed to accomplish desired levels of denitrification. A seed sludge from a coke plant was acclimated to the following feed according to procedures outlined for the present invention and illustrated explicitly in Example 1: ammonia concentration, 610 mg/l; COD concentration, 2020 mg/l; phenol concentration, 350 mg/l; thiocyanate concentration, 35 mg/l; and cyanide concentration, 1.5 mg/l. At the completion of sludge acclimation performed at an HRT of 6 days, the sludge mixed liquor volatile suspended solid level was about 5700 mg/l with an additional inerts content of about 10%. At continuous dissolved oxygen levels of 0.3 to 0.5 mg/l, and an HRT of 6 days, sludge denitrification performance was less than about 20%. FIGS. 9A, 9B, and 9C present a time record of the effects on sludge performance of a shift from continuous dissolved oxygen supply to varying schedules of on/off cycling of the air supply. Reactor dissolved oxygen levels reported are the weighted average levels that result from intermittent on/off cycling of a dissolved oxygen supply at 0.5 mg/l. On/off cycling was employed for the first 58 days reported in FIG. 9. Variable levels of continuous dissolved oxygen were employed for the remainder of the 75 days reported.

As can be seen from FIGS. 9A, 9B, and 9C, denitrification performance increased from less than 20% to greater than 83 percent as a result of reducing the weighted average dissolved oxygen level in the sludge mixture from 0.5 to 0.167 mg/l. Attempts to lower the weighted average dissolved oxygen level to 0.05 mg/l (starting on day 51) resulted in excessive ammonia breakthrough (i.e., loss of nitrifying microorganism activity). Return to a continuous supply of dissolved oxygen initially at 0.15 mg/l (day 58) and eventually 0.3 mg/l (day 71) resulted in a distinct and continuing loss of sludge denitrification.

It should be noted that (1) fluctuating levels of $NO_2^-$ occurred in the sludge mixture throughout the 75 days of the test and (2) that levels of unreacted COD in the effluent from the sludge mixture followed closely the pattern of $NO_2^-$ levels in the sludge mixture. This follows logically from the fact that $NO_2$ contributes to the COD reading by the chemical nature of the COD test. When the chemical contribution of $NO_2$ to effluent COD is subtracted out (i.e., 1.14 times effluent $NO_2$ concentration is subtracted from gross effluent concentration), net effluent COD's are seen to remain fairly stable and reflect high percentage reactor COD conversions. From day 75 through day 125, no effort was made to maintain $NO_2^-$ concentrations at low levels while feed concentrations of $NH_3$ and COD were increased to 1800 and 3000 mg/l, respectively, and continuous dissolved oxygen concentrations were increased to 0.9 mg/l. The record of the effect of these changes on sludge performance is presented in FIG. 10. $NO_2^-$ levels are seen to rise sharply in the sludge mixture with a corresponding sharp rise in the level of unreacted COD in the effluent from the sludge. However, when deductions are made for $NO_2$, net effluent COD's are largely stable and reflective of high reactor COD conversion.

While the invention has been described in detail and with respect to various embodiments thereof, it is apparent that various changes and modifications may be made therein without departing from the spirit and scope thereof.

What is claimed is:

1. An activated sludge process for treating wastewater containing ammonia as a contaminant and further other wastewater contaminants, if present, including cyanide, thiocyanate, sulfide and/or organic materials, to achieve substantially complete nitrificiation of said ammonia into nitrite and/or nitrate and substantially complete denitrification of said nitrite and/or nitrate into free nitrogen, said process comprising microbially treating the wastewater in an activated sludge process in the presence of a microorganism population acclimated to the wastewater contaminants and their levels in the wastewater and including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, under the following conditions:

(1) controlling the sludge wastage rate to the extent that, for the wastewater fed during the treatment and at the conditions at which the treatment is operated, the sludge wastage rate
   (i) is low enough to provide and maintain a steady state population of microorganisms capable of converting ammonia to nitrite and/or nitrate and yet
   (ii) is high enough to prevent buildup of inert solids in the sludge;

(2) controlling the hydraulic residence time of the wastewater in treatment such that the hydraulic residence time is
   (i) long enough to produce a sludge concentration that can be water/solid separated at the sludge wastage rate of (1) above, and
   (ii) long enough to achieve substantially full sludge performance;

(3) maintaining a dissolved oxygen level on a continuous or weighted average basis,
   (i) sufficiently high that microbial conversion of ammonia to nitrite and/or nitrate occurs but
   (ii) lower than the dissolved oxygen level at which microbial conversion of nitrite and/or nitrate to free nitrogen ceases to occur;

(4) mixing the sludge
   (i) to the extent that the sludge mixing rate achieves utilization of sludge present during treatment so as to avoid causing a sludge growth rate which would result in exceeding the maximum allowable sludge wastage rate of (1) above, and
   (ii) to the extent that the sludge mixing rate is large enough to reduce gradients in levels of bulk dissolved oxygen to a level consistent with the denitrification desired for the wastewater treatment, yet
   (iii) to the extent that the sludge mixing rate is below the rate at which microbial cell rupture occurs, irreversible breakup of agglomerates of sludge occurs, and/or sludge/water settleability characteristics are not deteriorated;

(5) controlling the biological oxygen demand during treatment such that at least the stoichiometric amount of biological oxygen demand required to achieve denitrification by microbial conversion of nitrite and/or nitrate to free nitrogen during treatment at a particular concentration of ammonia in the wastewater fed for treatment is present;

(6) controlling the pH of the treatment
   (i) in a range in which the level of free ammonia inhibitory to microorganism activity during the treatment is avoided, and
   (ii) in a range in which the level of free nitrous acid inhibitory to microorganism activity during treatment is avoided, yet
   (iii) in a hospitable range for microorganism growth and effective waste treatment of waste in the wastewater; and (7) controlling the temperature of the treatment
   (i) in a range in which the level of free ammonia inhibitory to microorganism activity during the treatment is avoided, and
   (ii) in a range in which the level of free nitrous acid inhibitory to microorganism activity during the treatment is avoided, yet
   (iii) in a hospitable range for microorganism action on and effective treatment of the waste in the wastewater.

2. The activated sludge process of claim 1, wherein said nitrifying microorganisms capable of converting ammonia to nitrite are Nitrosomonas microorganisms, said nitrifying microorganisms capable of converting nitrite to nitrate are Nitrobacter microorganisms and said facultative microorganisms are microorganisms of the genera Pseudomonas, Achromobacter, Bacillus, Micrococcus or mixtures thereof.

3. The activated sludge process of claim 1, wherein said microorganism population additionally includes sulfur acting microorganisms and cyanide acting microorganisms.

4. The activated sludge process of claim 1, wherein said controlling of the sludge wastage rate comprises controlling the sludge wastage rate within the range of (a) a Minimum Sludge Wastage Rate and (b) a Maximum Sludge Wastage Rate, said Minimum Sludge Wastage Rate and said Maximum Sludge Wastage Rate being defined in accordance with equations (A) to (D) below:

Sludge Wastage Rate for Type $X$ Microorganism = (A)

$$\frac{\text{Replenishment Rate of Type } X \text{ Microorganism}}{\text{Fraction of Sludge Represented by Type } X \text{ Microorganism}}$$

where the Maximum Sludge Wastage Rate is the smallest of the Sludge Wastage Rates for all of the types of microorganisms present, Net Inert Solids Input = Inert Solids in Feed Wastewater + (B)
Inert Solids Produced by Sludge −
Inert Solids Carried Out In Wastewater Discharge Steady State Inert Solids Loading = (C)

$$\frac{[\text{Weight of Inert Solids in Sludge}]}{[\text{Total Weight of Sludge}]}$$

Minimum Sludge Wastage Rate = (D)

$$\frac{[\text{Net Inert Solids Input Rate}]}{[\text{Steady State Inert Solids Loading}]}$$

5. The activated sludge process of claim 4, wherein said controlling of the sludge wastage rate is within about 20% above said Minimum Sludge Wastage Rate (a) to about 20% below said Maximum Sludge Wastage Rate (b).

6. The activated sludge process of claim 5, wherein said controlling of the sludge wastage rate is within about 40% above said Minimum Sludge Wastage Rate (a) to about 40% below said Maximum Sludge Wastage Rate.

7. The activated sludge process of claim 6, wherein said controlling of the sludge wastage rate is to substantially a zero sludge wastage rate.

8. The activated sludge process of claim 1, wherein said controlling of the hydraulic residence time is to a hydraulic residence time of about 5 days to about 35 days.

9. The activated sludge process of claim 8, wherein said controlling of the hydraulic residence time is to a hydraulic residence time of about 5 days to about 20 days.

10. The activated sludge process of claim 9, wherein said controlling of the hydraulic residence time is to a hydraulic residence time of about 5 days to about 10 days.

11. The activated sludge process of claim 10, wherein said controlling of the hydraulic residence time is to a hydraulic residence time of 5 days or less.

12. The activated sludge process of claim 1, wherein said controlling of the dissolved oxygen level is to a dissolved oxygen level of about 0.1 mg/l to about 2 mg/l, achieved on a continuous or weighted average basis.

13. The activated sludge process of claim 12, wherein said controlling of the dissolved oxygen level is to a dissolved oxygen level of about 0.1 mg/l to about 1.5 mg/l, achieved on a continuous or weighted average basis.

14. The activated sludge process of claim 13, wherein said controlling of the dissolved oxygen level is to a dissolved oxygen level of about 0.1 mg/l to about 1 mg/l, achieved on a continuous or weighted average basis.

15. The activated sludge process of claim 1, wherein the pH and temperature are maintained such that the free ammonia concentration and the nitrous acid concentration at the temperature of the treatment is no greater than the equivalent free ammonia concentration and nitrous acid concentration as defined by the limits of Zone 3 in FIG. 7 at 20° C.

16. The activated sludge process of claim 15, wherein the nitrous acid concentration is about 0.2 mg/l or less.

17. The activated sludge process of claim 4, wherein said mixing of the sludge is to a mixing rate allowing about 80% of said Maximum Sludge Wastage Rate to said Maximum Sludge Wastage Rate.

18. The activated sludge process of claim 17, wherein said mixing of the sludge is to a mixing rate allowing about 60% to less than about 80% of the Maximum Sludge Wastage Rate.

19. The activated sludge process of claim 18, wherein said mixing of the sludge is to a mixing rate allowing about 40% to less than about 60% of the Maximum Sludge Wastage Rate.

20. The activated sludge process of claim 19, wherein said mixing of the sludge is to a mixing rate allowing substantially a zero sludge wastage rate.

21. The activated sludge process of claim 1, wherein said controlling of the biological oxygen demand is to an extent that the BOD to N ratio is at least about 1.7:1 to about 2.8:1 or more.

22. The activated sludge process of claim 21, wherein said controlling of the biological oxygen demand is to an extent that the BOD to N ratio is at least about 2.8:1 or more.

23. The activated sludge process of claim 1, wherein said controlling of the pH is to a pH range of about 6 to about 8.

24. The activated sludge process of claim 23, wherein said controlling of the pH is to a pH range of about 6.5 to about 7.5.

25. The activated sludge process of claim 24, wherein said controlling of the pH is to a pH range of about 6.8 to about 7.3.

26. The activated sludge process of claim 1, wherein said controlling of the temperature is to a temperature of about 35° C. or below.

27. The activated sludge process of claim 26, wherein said controlling of the temperature is to a range of about 5° C. to about 35° C.

28. The activated sludge process of claim 27, wherein said controlling of the temperature is to a range of about 10° C. to about 25° C.

29. The activated sludge process of claim 28, wherein said controlling of the temperature is to a range of about 15° C. to about 25° C.

30. The activated sludge process of claim 1, wherein said wastewater microbially treated has an ammonia concentration of about 300 mg/l or higher.

31. The activated sludge process of claim 30, wherein said wastewater microbially treated has an ammonia concentration of about 500 mg/l or higher.

32. The activated sludge process of claim 30, wherein said wastewater microbially treated has an ammonia concentration of about 1000 mg/l or higher.

33. The activated sludge process of claim 30, wherein said wastewater microbially treated has an ammonia concentration of about 3000 mg/l or higher.

34. An activated sludge process for treating wastewater containing ammonia as a contaminant and further other wastewater contaminants, if present, including cyanide, thiocyanate, sulfide and/or organic materials to achieve complete nitrification of said ammonia into nitrite and/or nitrate and less than complete denitrification of said nitrite and/or nitrate into free nitrogen, said process comprising microbially treating the wastewater in an activated sludge process in the presence of a microorganism population acclimated to the wastewater contaminants and their levels in the wastewater and including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, under the following conditions:

(1) controlling the sludge wastage rate to the extent that, for the wastewater fed during the treatment and at the conditions at which the treatment is operated, the sludge wastage rate (i) is low enough to provide and maintain a steady state population of microorganisms capable of converting ammonia to nitrite and/or nitrate, yet (ii) is high enough to prevent buildup of inert solids in the sludge;

(2) controlling the hydraulic residence time of the wastewater in treatment such that the hydraulic residence time is (i) long enough to produce a sludge concentration that can be water/solid separated at the sludge wastage rate of (1) above, (ii) long enough to achieve substantially full sludge performance;

(3) maintaining a dissolved oxygen level, on a continuous or weighted average basis, sufficiently high that microbial conversion of ammonia to nitrite and/or nitrate and of biological oxygen demand if present, to carbon dioxide and water occurs;

(4) mixing the sludge (i) to the extent that the sludge mixing rate achieves utilization of sludge present during treatment so as to avoid causing a sludge growth rate which would result in exceeding the maximum allowable sludge wastage rate of (1) above, (ii) to the extent that the sludge mixing rate is large enough to reduce gradients in levels of bulk dissolved oxygen to a level consistent with the level of denitrification desired for the wastewater treatment, yet (iii) to the extent that the sludge mixing rate is below the rate at which microbial cell rupture occurs, irreversible breakup of agglomerates of sludge occurs and/or sludge/water settleability characteristics are not deteriorated;

(5) controlling the biological oxygen demand during treatment such that (i) at least the stoichiometric amount of biological oxygen demand required to achieve a specified level of denitrification by microbial conversion of nitrite and/or nitrate to free nitrogen during treatment at a particular concentration of ammonia in the wastewater fed for treatment is present; and (ii) in the case of substantially no denitrification, controlling the treatment so as to simply provide a source of assimilable carbon for the microorganism population present;

(6) controlling the pH of the treatment (i) in a range in which the level of free ammonia inhibitory to microorganism activity during the treatment is avoided, yet (ii) in a range in which the level of free nitrous acid inhibitory to microorganism activity, during treatment is avoided, yet (iii) in a hospitable range for microorganism growth and effective treatment of waste in the wastewater; and (7) controlling the temperature of the treatment (i) in a range in which the level of free ammonia inhibitory to microorganism activity during the treatment is avoided, and (ii) in a range in which the level of free nitrous acid inhibitory to microorganism activity during the treatment is avoided, yet (iii) in a hospitable range for microorganism action on and effective treatment of the waste in the wastewater.

35. The activated sludge process of claim 34, wherein said nitrifying microorganisms capable of converting ammonia to nitrite are Nitrosomonas microorganisms, said nitrifying microorganisms capable of converting nitrite to nitrate are Nitrobacter microorganisms and said facultative microorganisms are microorganisms of the genera Pseudomonas, Achromobacter, Bacillus, Micrococcus or mixtures thereof.

36. The activated sludge process of claim 34, wherein said microorganism population additionally includes sulfur acting microorganisms and cyanide acting microorganisms.

37. The activated sludge process of claim 34, wherein said controlling of the sludge wastage rate comprises controlling the sludge wastage rate within the range of (a) a Minimum Sludge Wastage Rate and (b) a Maximum Sludge Wastage Rate, said Minimum Sludge Wastate Rate and said Maximum Sludge Wastage Rate being defined in accordance with equations (A) to (D) below:

$$\text{Sludge Wastage Rate for Type } X \text{ Microorganism} = \frac{\text{Replenishment Rate of Type } X \text{ Microorganism}}{\text{Fraction of Sludge Represented by Type } X \text{ Microorganism}} \quad (A)$$

where the Maximum Sludge Wastage Rate is the smallest of the Sludge Wastage Rates for all of the types of microorganisms present, Net Inert Solids Input = Inert Solids in Feed Wastewater +    (B)
Inert Solids Produced by Sludge −
Inert Solids Carried Out In Wastewater Discharge Steady State Inert Solids Loading =    (C)

$$\frac{[\text{Weight of Inert Solids in Sludge}]}{[\text{Total Weight of Sludge}]}$$

Minimum Sludge Wastage Rate =    (D)

$$\frac{[\text{Net Inert Solids Input Rate}]}{[\text{Steady State Inert Solids Loading}]}$$

38. The activated sludge process of claim 37, wherein said controlling of the sludge wastage rate is within about 20% below said Minimum Sludge Wastage Rate (a) to about 20% below said Maximum Sludge Wastage Rate (b).

39. The activated sludge process of claim 38, wherein said controlling of the sludge wastage rate is within about 40% above said Minimum Sludge Wastage Rate (a) to about 40% below said Maximum Sludge Wastage Rate.

40. The activated sludge process of claim 39, wherein said controlling of the sludge wastage rate is to substantially a zero sludge wastage rate.

41. The activated sludge process of claim 34, wherein said controlling of the hydraulic residence time is to a hydraulic residence time of about 5 days to about 35 days.

42. The activated sludge process of claim 41, wherein said controlling of the hydraulic residence time is to a hydraulic residence time of about 5 days to about 20 days.

43. The activated sludge process of claim 42, wherein said controlling of the hydraulic residence time is to a hydraulic residence time of about 5 days to about 10 days.

44. The activated sludge process of claim 43, wherein said controlling of the hydraulic residence time is to a hydraulic residence time of 5 days or less.

45. The activated sludge process of claim 34, wherein said controlling of the dissolved oxygen level is to a dissolved oxygen level of at least about 0.1 mg/l, on a continuous or weighted average basis.

46. The activated sludge process of claim 34, wherein the pH and temperature are maintained such that the free ammonia concentration and the nitrous acid concentration at the temperature of the treatment is no greater than the equivalent free ammonia concentration and nitrous acid concentration as defined by the limits of Zone 3 in FIG. 7 at 20° C.

47. The activated sludge process of claim 46, wherein nitrous acid concentration is about 0.2 mg/l or less.

48. The activated sludge process of claim 37, wherein said mixing of the sludge is to a mixing rate allowing about 80% of the Maximum Sludge Wastage Rate to said Maximum Sludge Wastage Rate.

49. The activated sludge process of claim 48, wherein said mixing of the sludge is to a mixing rate allowing about 60% to less than about 80% of the Maximum Sludge Wastage Rate.

50. The activated sludge process of claim 49, wherein said mixing of the sludge is to a mixing rate allowing about 40% to less than about 80% of the Maximum Sludge Wastage Rate.

51. The activated sludge process of claim 50, wherein said mixing of the sludge is to a mixing rate allowing substantially a zero sludge wastage rate.

52. The activated sludge process of claim 34, wherein said source of assimilable carbon is an inorganic carbon source or an organic carbon source.

53. The activated sludge process of claim 52, wherein said source of assimilable carbon is carbon dioxide.

54. The activated sludge process of claim 34, wherein said controlling of the pH is to a pH range of about 6 to about 8.

55. The activated sludge process of claim 54, wherein said controlling of the pH is to a pH range of about 6.5 to about 7.5.

56. The activated sludge process of claim 55, wherein said controlling of the pH is to a pH range of about 6.8 to about 7.3.

57. The activated sludge process of claim 34, wherein said controlling of the temperature is to a temperature of about 35° C. or below.

58. The activated sludge process of claim 57, wherein said controlling of the temperature is to a range of about 5° C. to about 35° C.

59. The activated sludge process of claim 58, wherein said controlling of the temperature is to a range of about 10° C. to about 25° C.

60. The activated sludge process of claim 59, wherein said controlling of the temperature is to a range of about 15° C. to about 25° C.

61. The activated sludge process of claim 34, wherein said process achieves substantially complete nitrification of said ammonia and about 75% to less than substantially complete denitrification of said nitrite and/or nitrate.

62. The activated sludge process of claim 34, wherein said process achieves substantially complete nitrification of said ammonia and about 50% to less than about 75% denitrification of said nitrite and/or nitrate.

63. The activated sludge process of claim 34, wherein said process achieves substantially complete nitrification of said ammonia and about 25% to less than 50% denitrification of said nitrite and/or nitrate.

64. The activated sludge process of claim 34, wherein said process achieves substantially complete nitrification of said ammonia and substantially no denitrification of said nitrite and/or nitrate.

65. The activated sludge process of claim 34, wherein said wastewater microbially treated has an ammonia concentration of about 300 mg/l or higher.

66. The activated sludge process of claim 34, wherein said wastewater microbially treated has an ammonia concentration of about 500 mg/l or higher.

67. The activated sludge process of claim 34, wherein said wastewater microbially treated has an ammonia concentration of about 1000 mg/l or higher.

68. The activated sludge process of claim 34, wherein said wastewater microbially treated has an ammonia concentration of about 3000 mg/l or higher.

69. A process for producing an acclimated population of microorganisms for treating wastewater containing ammonia as a contaminant, and further other contaminants, if present, including cyanide, thiocyanate, sulfide and/or organic materials, to achieve substantially complete nitrification of said ammonia into nitrite and/or nitrate and substantially complete denitrification of said nitrite and/or nitrate into free nitrogen, said process comprising introducing the wastewater into an activated sludge process containing a microorganism population including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, and allowing the nitrifying microorganisms capable of converting ammonia to nitrite, nitrifying microorganisms capable of converting nitrite to nitrate, if present, and facultative microorganisms, each having a different growth rate, to grow and become acclimated to the level of ammonia, and other contaminants if present, by feeding the wastewater to the activated sludge system and microorganisms population at a rate sufficiently high to a stimulate microbial cell division but at a rate insufficiently high that an inhibitory level of ammonia, and other contaminants if present, in the wastewater is not reached, thereby causing the nitrifying microorganisms capable of converting ammonia to nitrite, nitrifying microorganisms capable of converting ammonia to nitrite to nitrate, if present, and facultative microorganisms to grow relatively such that the microorganism population becomes acclimated to the wastewater contaminants and their levels in the wastewater.

70. The acclimation process of claim 69, wherein said acclimation process is conducted under the following conditions:

(1) controlling the sludge wastage rate to the extent that, for the wastewater fed during the treatment and at the conditions at which the treatment is operated, the sludge wastage rate
  (i) is low enough to provide and maintain a steady state population of microorganisms capable of converting ammonia to nitrite and/or nitrate and yet
  (ii) is high enough to prevent buildup of inert solids in the sludge;

(2) controlling the hydraulic residence time of the wastewater in treatment such that the hydraulic residence time is
  (i) long enough to produce a sludge concentration that can be water/solid separated at the sludge wastage rate of (1) above, and
  (ii) long enough to achieve substantially full sludge performance;

(3) maintaining a dissolved oxygen level, on a continuous or weighted average basis,
  (i) sufficiently high that microbial conversion of ammonia to nitrite and/or nitrate occurs but
  (ii) lower than the dissolved oxygen level at which microbial conversion of nitrite and/or nitrate to free nitrogen ceases to occur;

(4) mixing the sludge
  (i) to the extent that the sludge mixing rate achieves utilization of sludge present during treatment so as to avoid causing a sludge growth which would result in exceeding the maximum allowable sludge wastage rate of (1) above, and
  (ii) to the extent that the sludge mixing rate is large enough to reduce gradients in levels of bulk dissolved oxygen to a level consistent with the denitrification desired for the wastewater treatment, yet
  (iii) to the extent that the sludge mixing rate is below the rate at which microbial cell rupture occurs, irreversible breakup of agglomerates of sludge occurs, and/or sludge/water settleability characteristics are not deteriorated;

(5) controlling the biological oxygen demand during treatment such that at least the stoichiometric amount of biological oxygen demand required to achieve denitrification by microbial conversion of nitrite and/or nitrate to free nitrogen during treatment at a particular concentration of ammonia in the wastewater fed for treatment is present;

(6) controlling the pH of the treatment
  (i) in a range in which the level of free ammonia inhibitory to microorganism activity during the treatment is avoided, and
  (ii) in a range in which the level of free nitrous acid inhibitory to microorganism activity during treatment is avoided, yet
  (iii) in a hospitable range for microorganism growth and effective waste treatment of waste in the wastewater; and (7) controlling the temperature of the treatment
  (i) in a range in which the level of free ammonia inhibitory to microorganism activity during the treatment is avoided, and
  (ii) in a range in which the level of free nitrous acid inhibitory to microorganism activity during the treatment is avoided, yet
  (iii) in a hospitable range for microorganism action on and effective treatment of the waste in the wastewater.

71. The acclimation process of claim 70, wherein said nitrifying microorganisms capable of converting ammonia to nitrite are Nitrosomonas microorganisms, said nitrifying microorganisms capable of converting nitrite to nitrate are Nitrobacter microorganisms and said facultative microorganisms are microorganisms of the genera Pseudomonas, Achromobacter, Bacillus, Micrococcus or mixtures thereof.

72. The acclimation process of claim 70, wherein said microorganism population additionally includes sulfur acting microorganisms and cyanide acting microorganisms.

73. The acclimation process of claim 70, wherein said controlling of the sludge wastage rate comprises controlling the sludge wastage rate within the range of (a) a Minimum Sludge Wastage Rate and (b) a Maximum Sludge Wastage Rate, said Minimum Sludge Wastage Rate and said Maximum Sludge Wastage Rate being defined in accordance with equations (A) to (D) below:

$$\text{Sludge Wastage Rate for Type } X \text{ Microorganism} = \frac{\text{Replenishment Rate of Type } X \text{ Microorganism}}{\text{Fraction of Sludge Represented by Type } X \text{ Microorganism}} \quad (A)$$

where the Maximum Sludge Wastage Rate is the smallest of the Sludge Wastage Rates for all of the types of microorganisms present, $$\text{Net Inert Solids Input} = \text{Inert Solids in Feed Wastewater} + \text{Inert Solids Produced by Sludge} - \text{Inert Solids Carried Out In Wastewater Discharge} \quad (B)$$

$$\text{Steady State Inert Solids Loading} = \quad (C)$$

$$\text{Minimum Sludge Wastage Rate} = \frac{[\text{Weight of Inert Solids in Sludge}]}{[\text{Total Weight of Sludge}]} \quad (D)$$

$$\frac{[\text{Net Inert Solids Input Rate}]}{[\text{Steady State Inert Solids Loading}]}$$

74. The acclimation process of claim 73, wherein said controlling of the sludge wastage rate is within about 20% above said Minimum Sludge Wastage Rate (a) to about 20% below said Maximum Sludge Wastage Rate (b).

75. The acclimation process of claim 74, wherein said controlling of the sludge wastage rate is within about 40% above said Minimum Sludge Wastage Rate (a) to about 40% below said Maximum Sludge Wastage Rate.

76. The acclimation process of claim 75, wherein said controlling of the sludge wastage rate is to substantially a zero sludge wastage rate.

77. The acclimation process of claim 70, wherein said controlling of the hydraulic residence time is to a hydraulic residence time of about 5 days to about 35 days.

78. The acclimation process of claim 77, wherein said controlling of the hydraulic residence time is to a hydraulic residence time of about 5 days to about 20 days.

79. The acclimation process of claim 78, wherein said controlling of the hydraulic residence time is to a hydraulic residence time of about 5 days to about 10 days.

80. The acclimation process of claim 79, wherein said controlling of th hydraulic residence time is to a hydraulic residence time of 5 days or less.

81. The acclimation process of claim 70, wherein said controlling of the dissolved oxygen level is to a dissolved oxygen level of about 0.1 mg/l to about 2 mg/l, achieved on a continuous or weighted average basis.

82. The acclimation process of claim 81, wherein said controlling of the dissolved oxygen level is to a dissolved oxygen level of about 0.1 mg/l to about 1.5 mg/l, achieved on a continuous or weighted average basis.

83. The acclimation process of claim 82, wherein said controlling of the dissolved oxygen level is to a dissolved oxygen level of about 0.1 mg/l to about 1 mg/l, achieved on a continuous or weighted average basis.

84. The acclimation process of claim 83, wherein the pH and temperature are maintained such that the free ammonia concentration and the nitrous acid concentration at the temperature of the treatment is no greater than the equivalent free ammonia concentration and nitrous acid concentration as defined by the limits of Zone 3 in FIG. 7 at 20° C.

85. The activated sludge process of claim 84, wherein the nitrous acid concentration is about 0.2 mg/l or less.

86. The acclimation process of claim 70, wherein said mixing of the sludge is to a mixing rate allowing about 80% of the Maximum Sludge Wastage Rate to said Maximum Sludge Wastage Rate.

87. The acclimation process of claim 86, wherein said mixing of the sludge is to a mixing rate allowing about 60% to less than about 80% of the Maximum Sludge Wastage Rate.

88. The acclimation process of claim 87, wherein said mixing of the sludge is to a mixing rate allowing about 40% to less than about 60% of the Maximum Sludge Wastage Rate.

89. The acclimation process of claim 70, wherein said controlling of the biological oxygen demand is to an extent that the BOD to N ratio is at least about 1.7:1 to about 2.8:1 or more.

90. The acclimation process of claim 89, wherein said controlling of the biological oxygen demand is to an extent that the BOD to N ratio is at least about 2.8:1 or more.

91. The acclimation process of claim 70, wherein said controlling of the pH is to a pH range of about 6 to about 8.

92. The acclimation process of claim 91, wherein said controlling of the pH is to a pH range of about 6.5 to about 7.5.

93. The acclimation process of claim 92, wherein said controlling of the pH is to a pH range of about 6.8 to about 7.3.

94. The acclimation process of claim 70, wherein said controlling of the temperature is to a temperature of about 35° C. or below.

95. The acclimation process of claim 94, wherein said controlling of the temperature is to a range of about 5° C. to about 35° C.

96. The acclimation process of claim 95, wherein said controlling of the temperature is to a range of about 10° C. to about 25° C.

97. The acclimation process of claim 96, wherein said controlling of the temperature is to a range of about 15° C. to about 25° C.

98. A process for producing an acclimated population of microorganisms for treating wastewater containing ammonia as a contaminant, and further other contaminants, if present, including cyanide, thiocyanate, sulfide and/or organic materials, to achieve substantially complete nitrification of said ammonia into nitrite and/or nitrate and less than complete denitrification of said nitrite and/or nitrate into free nitrogen, said process comprising introducing the wastewater into an activated sludge process containing a microorganism population including nitrifying microorganisms capable of converting ammonia to nitrite, optionally, nitrifying microorganisms capable of converting nitrite to nitrate, and facultative microorganisms capable of denitrifying nitrite and/or nitrate by oxidizing organic material and converting nitrite and/or nitrate to free nitrogen, and allowing the nitrifying microorganisms capable of converting ammonia to nitrite, nitrifying microorganisms capable of converting nitrite to nitrate, if present, and facultative microorganisms, each having a different growth rate, to grow and become acclimated to the level of ammonia, and other contaminants if present, by feeding the wastewater to the activated sluge system and microorganism population at a rate sufficiently high to stimulate microbial cell division but at a rate insufficiently high that an inhibitory level of ammonia, and other contaminants if present, in the wastewater is not reached, thereby causing the nitrifying microorganisms capable of converting ammonia to nitrite, nitrifying microorganisms capable of converting nitrite to nitrate, if present, and facultative microorganisms to grow relatively such that the microorganism population becomes acclimated to the wastewater contaminants and their levels in the wastewater.

99. The acclimation process of claim 98, wherein said acclimation process is conducted under the following conditions:

(1) controlling the sludge wastage rate to the extent that, for the wastewater fed during the treatment and at the conditions at which the treatment is operated, the sludge wastage rate
  (i) is low enough to provide and maintain a steady state population of microorganisms capable of converting ammonia to nitrite and/or nitrate, yet
  (ii) is high enough to prevent buildup of inert solids in the sludge;
(2) controlling the hydraulic residence time of the wastewater in treatment such that the hydraulic residence time is
  (i) long enough to produce a sludge concentration that can be water/solid separated at the sludge wastage rate of (1) above,
  (ii) long enough to achieve substantially full sludge performance;
(3) maintaining a dissolved oxygen level, on a continuous or weighted average basis, sufficiently high that microbial conversion of ammonia to nitrite and/or nitrate and of biological oxygen demand if present, to carbon dioxide and water occurs;
(4) mixing the sludge
  (i) to the extent that the sludge mixing rate achieves utilization of sludge present during treatment so as to avoid causing a sludge growth rate which would result in exceeding the maximum allowable sludge wastage rate of (1) above,
  (ii) to the extent that the sludge mixing rate is large enough to reduce gradients in levels of bulk dissolved oxygen to a level consistent with the level of denitrification desired for the wastewater treatment, yet
  (iii) to the extent that the sludge mixing rate is below the rate at which microbial cell rupture occurs, irreversible breakup of agglomerates of sludge occurs and/or sludge/water settleability characteristics are not deteriorated;
(5) controlling the biological oxygen demand during treatment such that
  (i) at least the stoichiometric amount of biological oxygen demand required to achieve a specified level of denitrification by microbial conversion of nitrite and/or nitrate to free nitrogen during treatment at a particular concentration of ammonia in the wastewater fed for treatment is present; and
  (ii) in the case of substantially no denitrification, controlling the treatment so as to simply provide a source of assimilable carbon for the microorganism population present;
(6) controlling the pH of the treatment
  (i) in a range in which the level of free ammonia inhibitory to microorganism activity during the treatment is avoided, yet
  (ii) in a range in which the level of free nitrous acid inhibitory to microorganism activity, during treatment is avoided, yet
  (iii) in a hospitable range for microorganism growth and effective treatment of waste in the wastewater; and
(7) controlling the temperature of the treatment
  (i) in a range in which the level of free ammonia inhibitory to microorganism activity during the treatment is avoided, and
  (ii) in a range in which the level of free nitrous acid inhibitory to microorganism activity during the treatment is avoided, yet
  (iii) in a hospitable range for microorganism action on and effective treatment of the waste in the wastewater.

100. The acclimation process of claim 98, wherein said nitrifying microorganisms capable of converting ammonia to nitrite are Nitrosomonas microorganisms, said nitrifying microorganisms capable of converting nitrite to nitrate are Nitrobacter microorganisms and said facultative microorganisms are microorganisms of the genera Pseudomonas, Achromobacter, Bacillus, Micrococcus or mixtures thereof.

101. The acclimation process of claim 98, wherein said microorganism population additionally includes sulfur acting microorganisms and cyanide acting microorganisms.

102. the acclimation process of claim 99, wherein said controlling of the sludge wastage rate comprises controlling the sludge wastage rate within the range of (a) a Minimum Sludge Wastage Rate and (b) a Maximum Sludge Wastage Rate, said Minimum Sludge Wastage Rate and said Maximum Sludge Wastage Rate being defined in accordance with equations (A) to (D) below:

$$\text{Sludge Wastage Rate for Type } X \text{ Microorganism} = \frac{\text{Replenishment Rate of Type } X \text{ Microorganism}}{\text{Fraction of Sludge Represented by Type } X \text{ Microorganism}} \quad (A)$$

where the Maximum Sludge Wastage Rate is the smallest of the Sludge Wastage Rates for all of the types of microorganisms present, $$\text{Net Inert Solids Input} = \text{Inert Solids in Feed Wastewater} + \text{Inert Solids Produced by Sludge} - \text{Inert Solids Carried Out In Wastewater Discharge} \quad (B)$$

$$\text{Steady State Inert Solids Loading} = \frac{[\text{Weight of Inert Solids in Sludge}]}{[\text{Total Weight of Sludge}]} \quad (C)$$

$$\text{Minimum Sludge Wastage Rate} = \frac{[\text{Net Inert Solids Input Rate}]}{[\text{Steady State Inert Solids Loading}]} \quad (D)$$

103. The acclimation process of claim 102, wherein said controlling of the sludge wastage rate is within about 20% above said Minimum Sludge Wastage Rate (a) to about 20% below said Maximum Sludge Wastage Rate (b).

104. The acclimation process of claim 103, wherein said controlling of the sludge wastage rate is within about 40% above said Minimum Sludge Wastage Rate (a) to about 40% below said Maximum Sludge Wastage Rate.

105. The acclimation process of claim 104, wherein said controlling of the sludge wastage rate is to substantially a zero sludge wastage rate.

106. The acclimation process of claim 99, wherein said controlling of the hydraulic residence time is to a hydraulic residence time of about 5 days to about 35 days.

107. The acclimation process of claim 106, wherein said controlling of the hydraulic residence time is to a hydraulic residence time of about 5 days to about 20 days.

108. The acclimation process of claim 107, wherein said controlling of the hydraulic residence time is to a hydraulic residence time of about 5 days to about 10 days.

109. The acclimation process of claim 108, wherein said controlling of the hydraulic residence time is to a hydraulic residence time of 5 days or less.

110. The acclimation process of claim 99, wherein said controlling of the dissolved oxygen level is to a dissolved oxygen level of at least about 0.1 mg/l, on a continuous or weighted average basis.

111. The acclimation process of claim 99, wherein the pH and temperature are maintained such that the free ammonia concentration and the nitrous acid concentration at the temperature of the treatment is no greater than the equivalent free ammonia concentration and nitrous acid concentration as defined by the limits of Zone 3 in FIG. 7 at 20° C.

112. The activated sludge process of claim 111, wherein the nitrous acid concentration is about 0.2 mg/l or less.

113. The acclimation process of claim 99, wherein said mixing of the sludge is to a mixing rate allowing about 80% of the Maximum Sludge Wastage Rate to said Maximum Sludge Wastage Rate.

114. The acclimation process of claim 113, wherein said mixing of the sludge is to a mixing rate allowing about 60% to less than about 80% of the Maximum Sludge Wastage Rate.

115. The acclimation process of claim 114, wherein said mixing of the sludge is to a mixing rate allowing about 40% to less than about 60% of the Maximum Sludge Wastage Rate.

116. The acclimation process of claim 99, wherein said source of assimilable carbon is an inorganic carbon source or an organic carbon source.

117. The acclimation process of claim 116, wherein said source of assimilable carbon is carbon dioxide.

118. The acclimation process of claim 99, wherein said controlling of the pH is to a pH range of about 6 to about 8.

119. The acclimation process of claim 118, wherein said controlling of the pH is to a pH range of about 6.5 to about 7.5.

120. The acclimation process of claim 119, wherein said controlling of the pH is to a pH range of about 6.8 to about 7.3.

121. The acclimation process of claim 99, wherein said controlling of the temperature is to a temperature of about 35° C. or below.

122. The acclimation process of claim 121, wherein said controlling of the temperature is to a range of about 5° C. to about 35° C.

123. The acclimation process of claim 122, wherein said controlling of the temperature is to a range of about 10° C. to about 25° C.

124. The acclimation process of claim 123, wherein said controlling of the temperature is to a range of about 15° C. to about 25° C.

125. The acclimation process of claim 98, wherein said acclimation is to achieve substantially complete nitrification of said ammonia and to achieve about 75% to less than substantially complete denitrification of said nitrite and/or nitrate.

126. The acclimation process of claim 98, wherein said acclimation is to achieve substantially complete nitrification of said ammonia and to achieve about 50% to less than about 75% denitrification of said nitrite and/or nitrate.

127. The acclimation process of claim 98, wherein said acclimation is to achieve substantially complete nitrification of said ammonia and to achieve about 25% to less than 50% denitrification of said nitrite and/or nitrate.

128. The acclimation process of claim 98, wherein said acclimation is to achieve substantially complete nitrification of said ammonia and to achieve substantially no dentrification of said nitrite and/or nitrate.

* * * * *